United States Patent
Rhodes

Patent Number: 6,120,809
Date of Patent: Sep. 19, 2000

[54] SYSTEM AND METHOD FOR MAKING ENHANCED CHEESE

[76] Inventor: Ken Rhodes, 2010-1 Silver Hawk Dr., Diamond Bar, Calif. 91765

[21] Appl. No.: 09/181,293

[22] Filed: Oct. 28, 1998

Related U.S. Application Data

[60] Provisional application No. 60/063,990, Oct. 29, 1997.

[51] Int. Cl.[7] .................. A23C 19/032; A23C 19/055; A23C 19/06; A23C 19/064
[52] U.S. Cl. .................. 426/36; 426/38; 426/334; 426/468; 426/519; 426/557; 426/582; 426/583; 426/613; 426/650; 426/654
[58] Field of Search .................. 426/582, 36, 583, 426/38, 654, 334, 650, 613, 519, 468

[56] References Cited

U.S. PATENT DOCUMENTS

| | | |
|---|---|---|
| T990,005 | 1/1980 | Iaconelli . |
| 3,642,492 | 2/1972 | Arndt . |
| 3,840,996 | 10/1974 | Grindstaff et al. . |
| 3,873,751 | 3/1975 | Arndt . |
| 3,922,374 | 11/1975 | Bell et al. ............... 426/582 |
| 4,161,552 | 7/1979 | Melachouris . |
| 4,259,363 | 3/1981 | Lauck et al. . |
| 4,279,939 | 7/1981 | Cho . |
| 4,297,382 | 10/1981 | Hosaka . |
| 4,321,860 | 3/1982 | Hazen . |
| 4,339,468 | 7/1982 | Kielsmeier . |
| 4,392,801 | 7/1983 | Meyer . |
| 4,399,164 | 8/1983 | Lauck et al. . |
| 4,497,836 | 2/1985 | Marquardt et al. . |
| 4,518,616 | 5/1985 | Czulak . |
| 4,597,972 | 7/1986 | Taylor ............... 426/582 |
| 4,617,861 | 10/1986 | Armstrong . |
| 4,661,364 | 4/1987 | Campbell . |
| 4,898,745 | 2/1990 | Zamzow et al. . |
| 4,902,523 | 2/1990 | Fritchen et al. . |
| 5,082,681 | 1/1992 | Barlow et al. . |
| 5,146,845 | 9/1992 | Pittleko . |
| 5,209,943 | 5/1993 | Pittelko . |
| 5,395,630 | 3/1995 | Gamay . |
| 5,413,804 | 5/1995 | Rhodes . |
| 5,480,666 | 1/1996 | Lindgren . |
| 5,549,916 | 8/1996 | Gamay . |
| 5,567,464 | 10/1996 | Barz et al. . |
| 5,572,925 | 11/1996 | Van Pay et al. . |
| 5,914,143 | 6/1999 | Carroll, Jr. ............... 426/582 |

FOREIGN PATENT DOCUMENTS

| | | |
|---|---|---|
| 694169A | 5/1978 | U.S.S.R. . |
| 96/25051 | 8/1996 | WIPO . |

OTHER PUBLICATIONS

American Dairy Review, "Complete Cheese Processing System"., 37(10) 24H–24I. (abstract), 1975.

*Primary Examiner*—Helen Pratt
*Attorney, Agent, or Firm*—Morriss, Bateman, O'Bryant & Compagni

[57] ABSTRACT

A system and method for making an enhanced cheese product includes a milk processing system for developing cheese curd, and a mixing means which mixes the cheese curd and the enhancing agent. By applying negative pressure to a mixture of cheese curd and enhancing agent, the enhancing agent can be drawn into the cheese curds. The enhancing agent may include whey protein to increase product. Likewise, probotics, fat substitute, enzymes and flavorings may be added to the cheese curds to produce cheese products with reduced spoilage, decreased fat, accelerated ripening or new flavors.

147 Claims, 14 Drawing Sheets

Supply an enzyme selected to provide a desired flavor
associated with a ripened/aged cheese

Cool the enzyme

Add cheese curds

Mix the enzyme and cheese curds

Heat mixture of enzyme and cheese curds

Subject mixture of enzyme and cheese curds to negative
pressure to cause the enzyme to be absorbed by cheese curds

Form enzyme impregnated cheese curds into desired form

*Fig. 8*

Supply an enzyme selected to provide a desired flavor associated with a ripened/aged cheese

Form a cheese concentrate by infiltrating cheese with the enzyme

Repeatedly cycle the cheese concentrate to maximize flavoring

Heat cheese concentrate to inactivate the enzyme if desired

Cool the cheese concentrate

Add cheese curds

Mix the cheese concentrate and cheese curds

Heat mixture of cheese concentrate and cheese curds

Subject mixture of cheese concentrate and cheese curds to negative pressure to cause the cheese concentrate to be absorbed by the cheese curds

Form cheese concentrate impregnated cheese curds into desired form

*Fig. 9*

Supply any enhancing agents such as those selected to promote stretch or melting

Pasteurize the enhancing agent if necessary

Add cheese curds

Mix the enhancing agent and cheese curds

Subject mixture of enhancing Agent and cheese curds to negative pressure to cause the enhancing agent to be absorbed by the cheese curds

Subject cheese curds to cold gas to form solidified curds

*Fig. 12*

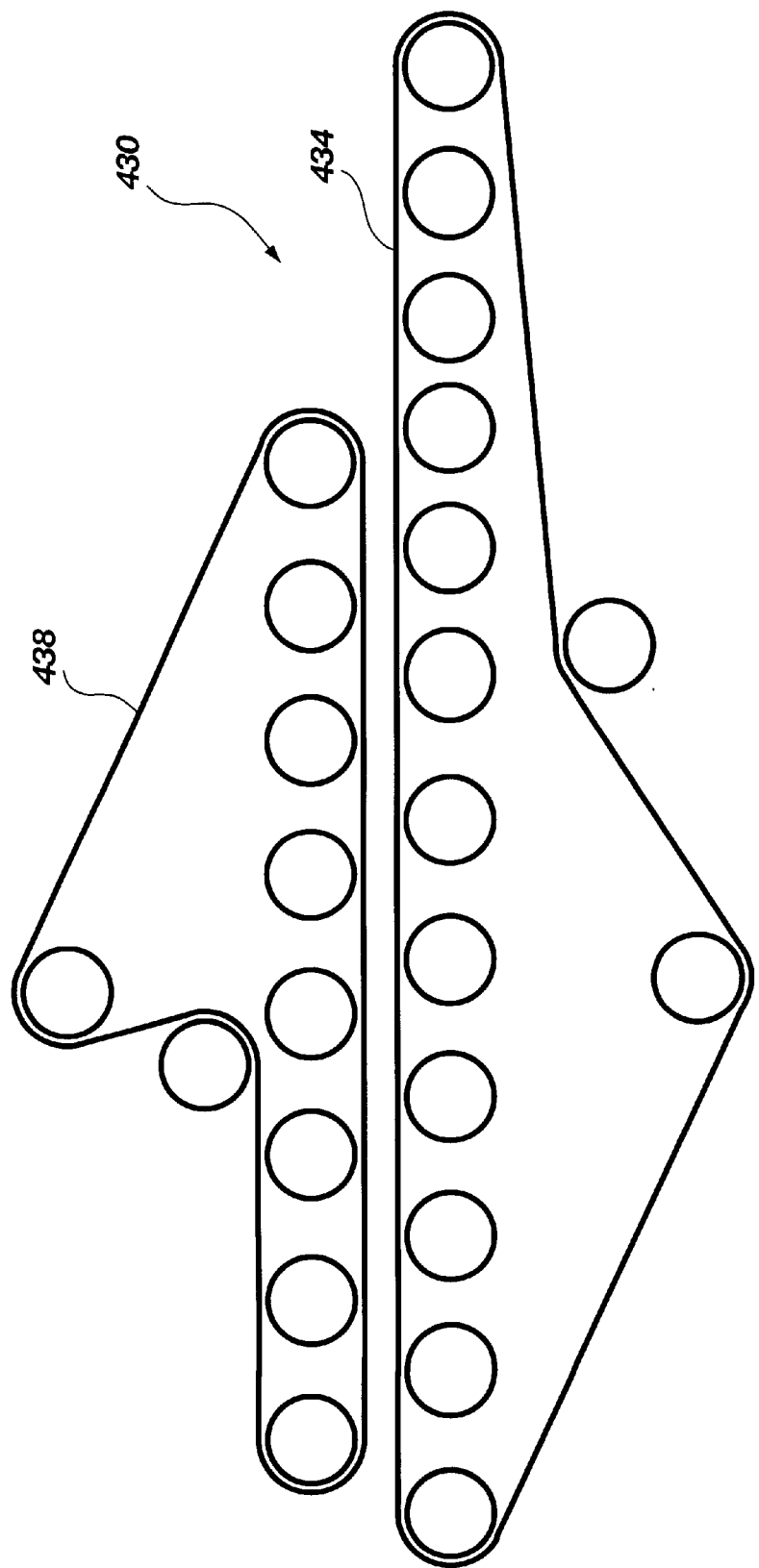

SYSTEM AND METHOD FOR MAKING ENHANCED CHEESE

This application claims the benefit of U.S. Provisional application No. 60/063,990 filed Oct. 29, 1997.

BACKGROUND OF THE INVENTION

1. Field of the Invention

The present invention relates to systems, processes, and methods for making cheese products. More particularly, the present invention relates to a system and method for making cheese products which are enhanced to have a particular characteristic, such as increased yield, recovery of whey cream, desired protein content, water content, flavor, resistance to spoilage, accelerated ripening, or reduced, light, low fat, or fat free cheese, and Instant Quick Frozen Pizza cheese.

2. State of the Art

The making of cheese is generally a labor-intensive process that requires large quantities of milk to develop any of the many popular varieties. Typically, cheese yields range from 6% to 12% depending upon the variety and moisture content of cheese. The remainder of the milk forms by-products. Whey is the single largest product from the milk during the cheesemaking process and, prior to the present invention, has often been viewed as a negative by-product.

Numerous steps are required to turn milk into cheese having the desired characteristics of color, body, texture and organoleptic properties. Many of these steps are highly labor intensive and limit the speed and cost at which cheese can be produced. Additionally, success or failure in the market place is often determined by a company's ability to create cheese with the proper body, texture and organoleptic properties at the most competitive price. Because of the highly competitive nature of the cheese making industry, price differences of less than one cent per pound can provide significant advantages in the market place.

One significant concern that must be addressed for a cheese maker to be profitable is disposal of the by-products created during the cheese making process. For example, the formation of some types of cheese requires that the cheese be soaked in a brine solution. The brine solution quickly becomes contaminated with the cheese and the resulting breakdown products, primary free fatty acids and proteins. The resulting breakdown products of the cheese promote bacterial growth in the brine, which leads to contamination of the finished cheese. Further, the salt brine dissolves some of the cheese that leads to loss of yield.

Once the bacterial growth has reached certain levels, the contaminated brine solution must be discarded. The contaminated brine solution, however, must be specially handled in such a manner that it will not contaminate water supplies and or cause other environmental damage. Disposal of the brine solution is currently a major problem in the mozzarella industry and has forced some plants to close due to environmental concerns. Other cheeses that typically are brined include Brick, Romano, Parmesan, Blue, Swiss, etc. Disposal of the brine solution causes considerable problems in these portions of the cheese industry as well.

Another significant concern that must be addressed by nearly all cheese makers is disposal of cheese whey that is released during the cheese making process. As mentioned above, cheese whey is the largest product of the cheese making process. Cheese whey is a watery substance that contains large amounts of whey protein and lactose, which cannot be coagulated out of milk by typical coagulating enzymes or acid precipitants. Cheese whey contains approximately 0.9 percent whey protein and 5 percent lactose. About 25 percent of the total protein in milk is whey protein. Thus, disposal of cheese whey can be a significant problem.

Numerous attempts have been made to reintroduce the whey protein into cheese to eliminate disposal concerns and to enhance the protein content of the cheese and the yield. For example, in accordance with one method, whey protein extracted from one batch of milk during the cheese making process is returned to a subsequent batch of milk in an attempt to coagulate the whey protein with the cheese curds. Such attempts, however, have been relatively unsuccessful. Typically no more than about 18 percent of the whey protein reintroduced into the milk will precipitate out with the cheese curds. Several methods and procedures have been developed and patented over the years that primary utilize denatured whey protein in combination with caseins to form co-precipitates that have a propensity to precipitate out of the vat milk with the cheese curd. The efficiency of these processes and the effect upon the finished cheese is varied and none has achieved desired levels of whey precipitation. Thus, the remaining whey protein must be used for other purposes or disposed of in an appropriate manner.

One major problem with denaturing whey protein to the degree that it needs to be in order to precipitate out with the casein and fat is the whey proteins' effect upon the body and texture of the finished cheese. The denaturing process itself changes the whey protein conformation such that it materially affects the body and texture of the finished cheese. The physical chemistry involved in the coagulation of milk to form cheese is very complex and not fully understood. Anything from simple vibration to the type denatured whey protein will materially affect the coagulation and hence, the yield, as well as the body and texture of the finished cheese.

One solution to handling the cheese whey has been the making of alternate products. Ultra filtration has been tried and has been successful for making a pre-cheese that has been set with rennet to make cheese. Some cheeses have been made this way for over twenty years with market acceptance in various parts of the world. However, when Ultra filtration was used to make mozzarella in the United States, the resulting cheese would not melt and stretch satisfactorily. Thus, the ability to use the cheese whey to develop other cheese products or increase yield has been limited.

The whey protein which cannot be used within the cheese making process must be dried or otherwise processed to remove it from the liquid whey. A commercial whey drier typically costs between about 5 and 10 million U.S. dollars and consumes a significant amount of space and energy. Numerous other systems are also available for separating the whey protein from liquid cheese whey. For example, various mechanisms for separating the whey from the liquid are disclosed in U.S. Pat. Nos. 3,642,492; 3,840,996; 3,873,751; 4,297,382; 4,497,836 and 4,617,861, to name a few. Of course, several such systems may be used in conjunction with one another to separate and dry the whey protein.

Disposal of the whey is difficult because the high protein concentration and high BOD can quickly contaminate wells and local streams and rivers. The high protein concentration can cause algae blooms in surface waters, and can render ground water unusable for many purposes.

While the high protein concentration of the whey has been found to be desirable for use in health drinks and other nutritional snacks, the market are generally insufficient to keep whey protein prices higher than the cost of production. This is due, in part, to the properties of the whey protein. Thus, while cheese solids in mozzarella are currently worth about $2.40–$3.60 (U.S.) per pound, the whey protein sells for about $0.58 (U.S.) per pound. When the costs associated with drying and handling are figured in, the cheese producer usually sells its whey protein at a loss.

In response to this ongoing problem, numerous new products have been developed to utilize the whey protein. For example, U.S. Pat. Nos. 3,642,492 and 3,873,751 teach a method for making a simulated skim milk. Likewise, U.S. Pat. Nos. 4,161,552 and 4,259,363 disclose the use of whey solids in place of non-fat dry milk for making comminuted meats. These products, however, have not been sufficiently successful to create a significant market for the whey protein.

Other companies have specially engineered proteins that are synthesized from the whey proteins. While such specialty proteins make the handling of whey protein profitable, there is a limited demand for such proteins, and the proprietary rights of certain companies limit who may produce the products.

Thus, there is a need for a system that can more effectively utilize whey protein obtained during the cheese making process to thereby increase profitability. Such a system should have little or no negative environmental impacts and should be relatively easy to use. Thus, with the cheese market at $1.80 (U.S) per pound, the most profitable return for whey protein would be to return it to the cheese thereby increasing yield.

In addition to brine and whey protein, ten percent of the butterfat is lost to the whey and is recovered as whey cream. Whey cream is sold as a by-product at a low return. This process returns the whey to the curd for a high return and increased yield.

In addition to brine, whey protein and whey cream, there are several other concerns that limit the profitability of cheese makers. For example, spoilage of cheese is a common problem. As cheese sits in warehouses or on store shelves, mold and/or bacteria can grow on the cheese, thereby making the cheese unfit for consumption. This is especially problematic for fresh cheeses.

It is well known that there are several acids and metabolics of bacteria that interfere with growth of bacteria and the like on cheeses. These substances, include, but are not limited to nisin, MICROGUARD and MICROGUARD PLUS (available from Rhoda, Madison, Wis.), NIPISAN (available from Aplin and Barrett, Beaminster, England), and the ALTA series (produced by Quest International of Hoffman Estates, Ill.). These items are typically referred to as probotic metabolites. By interfering with bacterial growth, the probotic metabolites serve as a shelf life extender and decrease losses due to spoilage. While probotics have been used in other food products, there has been a general inability to effectively add probotics to cheese products. This is because the probotics interfere with the growth of the cheese culture. Currently, the probotics are applied to the surface of the cheese, but no mechanism has been found to infiltrate the cheese to provide consistent improvement in shelf life. Thus, there is a need for a method of manufacturing cheese by which probotics and the like can be added to the cheese products to effectively reduce spoilage.

In addition to providing a mechanism for reintroduction of whey protein into cheese to reduce or eliminate disposal concerns, the method of the present invention enables the probotics to be added after the culture has preformed its necessary functions. Thus, the probotics afford the ability to prevent further culture growth along with the prevention of other growth by spoilage or contaminating bacteria. Contaminating bacteria typically produce off flavors or texture defects such as gassing in cheese. The specially introduced probotics, however, can substantially reduce or eliminate such concerns.

Related to the concern of spoilage is the need for refrigeration. In order to market cheese, the cheese must be maintained at a sufficiently low temperature to prevent spoiling. The costs of electricity alone can be substantial when dealing with high volumes. However, by using probotics in accordance with the present invention, the requirement that cheese be refrigerated can be reduced or even eliminated. If the levels of probotics are sufficient, the only need for refrigeration of cheese comes from the need to maintain the cheese below high temperatures (such as about 90 degrees Fahrenheit) wherein the fats in the cheese start "oiling off".

Yet another problem which has faced the cheese making industry for many years is the desire of many people to purchase low fat or fat free cheeses which have substantially the same body, texture and organoleptic properties as the tradition product. The protein matrix formed by casein in cheese entraps both the moisture and fat globules. The physical structure of the fat prevents the protein from contracting into a hard brittle matrix. However, when fat is removed from cheese, the protein matrix continues to contract during aging and the resulting body and texture does not resemble the fat containing cheese.

In addition to the ability to reintroduce whey protein and add probotics, the present invention allows the infusion of materials into the protein matrix such that the protein web like structure will not contract. If the infused particles resemble the mouth feel and lubricity of fat, then the cheese texture will resemble that of the original cheese product. The fat molecule, however, is critical both to the texture and taste of the cheese product. Currently, most reduced fat cheeses are rubbery and tough and lack the taste of traditional cheese. In light of the increasing demand for low fat foods, it is desirable to develop a system for enhancing cheese which enables the production of low fat cheese which has the body, texture and organoleptic properties of regular cheese.

Still another challenge faced by the cheese industry is the limited ability to produce cheese having selected flavors. Currently there is widespread demand for food products which are both high in nutrition and which have a pleasing flavor. Many of the top selling treats are fruit flavored snacks in which fruit extracts are used. While attempts have been made at developing novelty cheeses having a variety of nontraditional flavors, such have been unsuccessful because cheese will not normally adopt flavors or colors in a consistent manner. Thus, while a flavor may be added to cheese, it may be much stronger in some areas of the cheese than in other areas. This invention allows the incorporation of fruit solids, flavors, and sweeteners into the cheese mass in a consistent manner to thereby facilitate the use of a variety of flavors.

In addition to novelty flavors, there are many cheeses that require prolonged aging or ripening to obtain the desired flavor. Traditionally, penetration of the cheese by the enzymes that ripen the cheese has taken months. Current technology allows the cheese maker to accelerate the ripening of cheese by incorporating the cheese with known enzymes while the cheese is on the finishing table. The enzymes, however, are extremely expensive (i.e. up to seven hundred dollars U.S. per pound) and 25 to 40 percent of the enzymes are lost to the whey. Additionally, uniform distribution of the cheese with the enzymes remains a significant problem. Conversely, defects known as modeling are common with the use of enzymes in the above manner.

A closely related problem with accelerated ripening of cheese is the inability to control the aging process. Once an enzyme has been introduced, the aging/flavor change of the cheese continues. Thus, the cheese continues to age the longer it is on the shelf and eventually becomes too strong for most consumers. Thus, there is a need for a method by which improved control is provided for accelerated aging. The present invention provides the cheese maker with improved control of the accelerated ripening technique on several fronts. First, the method of the present invention allows for improved penetration of the cheese curds with the enzyme used for accelerated ripening. Second, the method of the present invention allows for the same day production of aged cheese by the use of a cheese/enzyme concentrate that is prepared independent of the cheese. Third, in accordance with the principles of the present invention, it has been found that selective inactivation of the enzyme used for accelerated ripening can be used to inhibit over ripening of cheese products made by an accelerated ripening method.

Still yet another problem associated with the manufacture of cheeses is the labor involved in the production. This is especially true for cheeses that are formed, cooled and then grated or shredded into small pieces of cheese. Such is common for cheese that is used by commercial establishments on pizzas. The small cheese particles melt more rapidly on the pizza and prevent excessive browning. However, to form Pizza cheese, the cheese curds are usually formed in the pasta filata process, passed through brine solution to cool, and then grated or shredded. A significant saving could be achieved by reducing the amount of labor, equipment, and waste to form the Pizza cheese particles. This invention only uses one piece of equipment and one process to produce Instant Quick Frozen (IQF) Pizza cheese. Furthermore, the improved Pizza cheese has increased yield and maintains the excellent and controllable properties over the entire shelf life of the cheese.

SUMMARY OF THE INVENTION

It is an object of the present invention to provide a system and a system and method for manufacturing an enhanced cheese product having a desired characteristics.

It is an object of the one aspect of the present invention to provide a system and method for reintroducing whey protein concentrate into cheese curds so as to increase the amount of cheese to be produced by a given quantity of milk.

It is an object of the one aspect of the present invention to provide a system and method for reintroducing whey cream into cheese curds so as to increase the amount of cheese to be produced by a given quantity of milk.

It is an object of one aspect of the present invention to introduce whey protein into cheese curds to enhance the protein content of the curds.

It is an object of another aspect of the present invention to provide a system and method for enhancing the shelf life of cheese products and/or reducing the need for refrigeration.

It is an object of another aspect of the present invention to provide a system and method for production of low fat or nonfat cheese having improved body, texture and organoleptic properties.

It is an object of yet another aspect of the present invention to prove an improved system and method for adding flavorings and/or colorings to cheese.

In is an object of still another aspect of the present invention to provide an improved system and method for accelerated aging of cheese products.

It is an object of still yet another aspect of the present invention to provide an improved system and method for controlling the aging process of cheese products.

It is another object of the present invention to provide an improved system for making mozzarella cheese, Pizza cheese and other pasta filata cheeses.

The above and other objects of the invention not specifically enumerated are realized in specific illustrated embodiments of a system and method for producing an enhanced cheese product. Milk is processed so as to produce cheese curds. An enhancing agent is then added to the cheese curds and the two are mixed together and subjected to negative pressure. The negative pressure causes the cheese curds to draw in the enhancing agent. The enhanced cheese curds are then processed in a conventional manner or other manner to form blocks of cheese or some other desired cheese product. Typically, this process is referred to as knitting.

In accordance with one aspect of the present invention, the enhancing agent is whey protein. Preferably, the whey protein is in the form of an eighty-percent whey protein concentrate, although other forms or concentrations may also be used. The whey protein is mixed with the cheese curds and subjected to negative pressure. This causes the whey protein to be absorbed into the cheese curds. It has been found that a substantial part, if not the entire amount, of whey protein produced as a by-product of a batch of cheese can be reintroduced into the cheese curds. Thus, the disposal problem of the whey protein is virtually eliminated. Additionally, the resulting cheese product has an equal or superior taste to traditional cheese. The cheese also has a higher protein concentration, lower fat concentration and a higher water concentration, making it more nutritious. Furthermore, utilizing the process of the present invention results in approximately 25 percent more cheese product per gallon of milk than is produced in accordance with the traditional methods of making cheese. Thus, the cheese maker is able to produce cheese that is healthier to consume and which lowers the cost per pound significantly.

In accordance with another aspect of the present invention, the whey portion of the mixture can be provided in a variety of different ways. For example, one can select cheese whey and lower the pH by adding an acidulating agent, such as vinegar or citric acid. The mixture is then heated to about 190 degrees (typically by direct steam injection) and the whey protein precipitate that floats to the top is recovered. The whey protein precipitate is then subjected to high sheer (i.e. mixing or high-pressure homogenization) to reduce precipitate particle size. Once the particle size is below a defined size (i.e. about 8 microns, and preferably of a mean size of 1 micron), the whey protein is added to the cheese curds and mixed under negative pressure.

In accordance with another aspect of the present invention, it has been learned that an enhancing agent in the form of a preserving agent, such as a probotic, can be mixed with the cheese curds (and whey protein concentrate if desired) and subjected to negative pressure. The negative pressure causes the cheese curds to absorb the preserving agent. Because the preserving agent is absorbed by the cheese curds, the resulting cheese product is less susceptible to spoiling and the shelf life of the cheese product is lengthened. Additionally, the use of appropriate amounts of probotics can also reduce or eliminate the need to refrigerate the cheese. Thus, probotics can be used to make cheese which only requires sufficient refrigeration to avoid oiling off in extremely warm weather.

In accordance with another aspect of the present invention, it has been learned that an enhancing agent in the form of a fat substitute can be mixed with the cheese curds. The mixture can then be subjected to negative pressure in such a manner that the fat substitute infiltrates the cheese curd and produces a reduced fat cheese having similar body, texture and organoleptic properties as traditional cheese. If desired, the cheese curd can be processed prior to mixture to form low fat or nonfat cheese curds. By adding the fat substitute to the low fat or nonfat cheese curds, the cheese manufacturer is able to provide a cheese which has significantly less fat (or even no fat) while maintaining the body, texture and organoleptic properties of regular cheese.

In accordance with still yet another aspect of the present invention, it has been learned that flavorings and/or colorings can be mixed with cheese curds and subjected to negative pressure in such a manner that the flavoring and/or coloring is spread through cheese product. Thus, cheeses of novelty flavors such as strawberry, banana, chocolate, etc. can be produced with a significant improvement in flavor consistency. For snack food type cheeses, such as string mozzarella, the ability to add novelty flavors enables the sale of the cheese product at candy prices-prices well above those traditionally charged for cheese.

In accordance with still yet another aspect of the present invention, enzymes that are used to accelerate the ripening of cheeses are mixed with the cheese curds. Because the enzymes are absorbed by the cheese curds, the infiltration of the cheese curds is more consistent and considerably less enzyme must be used to provide the desired aging—further reducing costs.

In accordance with another aspect of the present invention, the enzymes can be placed in a small amount of cheese and then processed in such a manner as to optimize the catalytic effect of the enzyme to thereby obtain an aged cheese product having a very concentrated flavor in a very short amount of time. The aged cheese product or cheese/enzyme concentrate is then mixed with cheese crurs to impart the desired flavor to a larger amount of cheese. By optimizing the enzyme's catalytic effect to form a cheese/enzyme concentrate and then mixing the cheese product with cheese curds, a desired flavor can be achieved within a small fraction of the time traditionally required for the flavor to develop in the cheese.

In accordance with still another aspect of the present invention, the enzyme which is used to promote accelerated aging of the cheese may be controlled by applying heat or some other controller to inactivate the enzyme once a desired aging has been achieved. For example, if a cheese/enzyme concentrate is processed to provide the flavor of a cheese that has been aged for two years, the concentrated cheese product can be subjected to sufficient heat to substantially terminate further propagation of the enzyme. Because the enzyme has been inactivated, the cheese product formed by mixing the cheese curds and the cheese/enzyme concentrate under negative pressure continues to age at a much slower rate than normal. Thus, the cheese product will have a much greater shelf life as being aged "two years", while a conventionally aged cheese will continue to age and will continue to become sharper, etc.

Thus, a very uniform aged cheese can be produced in a very short amount of time.

Still another aspect of the present invention is the infusion of hydrocolloids, starch, and/or milk protein derived stabilizers. These in gredients or any other water controlling agents can be infused into the curd to prevent syneresis. Syneresis of whey off is caused by the presence of additional water beyond the ability of the casein and/or whey protein binding capacity. Hence, the addition of hydrocolloids or protein s will allow for the incorporation of greater moisture thereby enhancing the quality of low fat or nonfat cheeses. Furthermore, additional bound moisture improves the meltability of cheeses such as mozzarella.

Still yet another aspect of the present invention relates to the preparation of small particles of cheese, such as a grated or shredded Pizza cheese, while reducing labor costs and environmental hazards. Forming the cheese curds into blocks and floating the block through a brine solution typically forms Pizza cheese. The block is cooled and allowed to age for a sufficient period to develop a slight salt taste to penetrate the cheese. The sodium ion replaces the calcium ion bound to the protein and allows the pasta filata cheese to produce the typical stretch and smooth homogenous melt associated with this cheese. The cheese is then grated or shredded into small particles and shipped to pizzerias and the like.

The present invention avoids the labor intensity and environmental problems of the method discussed above by infusing salt or a salt solution into the cheese curds. The cheese curds are then quick frozen by carbon dioxide or nitrogen injection and are ready for shipment. The curds have a similar flavor to those produced by the conventional process while substantially reducing handling, loses of cheese solids to cooker water and brine, labor costs, and environmental concerns such as brine disposal. The cheese curds may also be enhanced to increase yield, provide other characteristics such as flavor or color, or provided with melting enhancers such as phosphates or citrates, and body builders or texturizers such as starch, and enzymes to enhance stretch, etc. Thus, this invention provides a one step process for manufacturing an improved pasta filata cheese with substantially improved yield and performance characteristics. The improved performance characteristics will remain stable for the entire shelf life of the cheese. Further, performance characteristics can be tailored to a specific end use and will not change during the shelf life of the cheese.

BRIEF DESCRIPTION OF THE DRAWINGS

The above and other objects, features and advantages of the invention will become apparent from a consideration of the following detailed description presented in connection with the accompanying drawings in which:

FIG. 8 shows a flow chart of the steps of a preferred method for enhancing cheese curds by accelerated ripening/aging to produce a ripened/aged cheese in a reduced amount of time;

FIG. 9 shows a flow chart of the steps of a preferred method for producing an aged cheese having a highly stable flavor;

FIG. 12 shows a flow chart for making instant quick freeze Pizza cheese in accordance with the present invention;

FIG. 15 shows a side view of a double dewhey belt that can be used in the method of the present invention.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
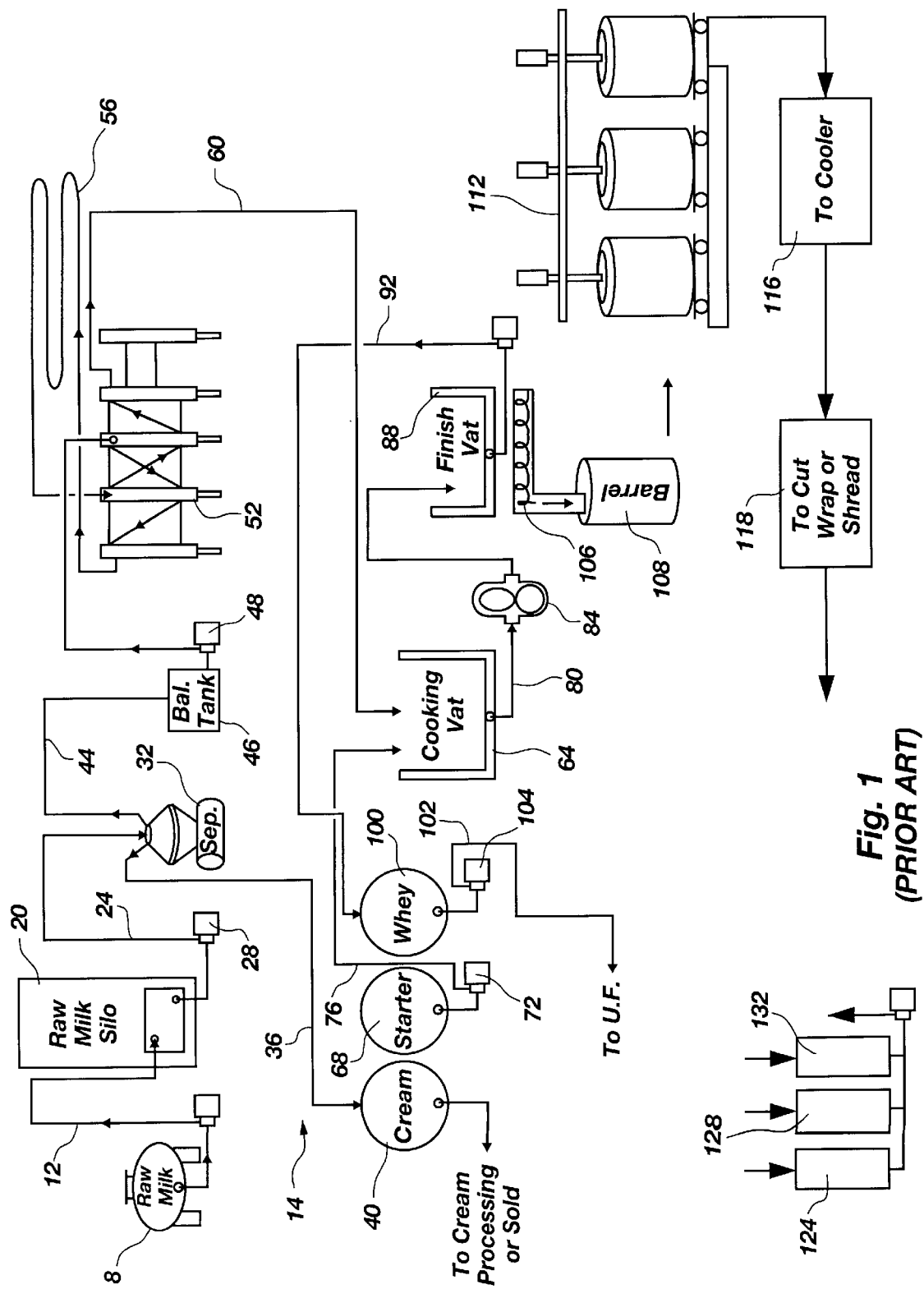
FIG. 1 shows a simplified flow diagram of a system for making cheese products in accordance with the teachings of the prior art.

Referring to FIG. 1, there is shown a simplified flow diagram of a system for making cheese products in accordance with the teachings of the prior art. The cheese making system, generally indicated at 4, initially receives milk from a milk delivery truck 8. The milk is drawn through a conveying line 12 by a pump 16 and delivered to a raw milk silo 20. Milk is drawn from the raw milk silo 20 through another conveying line 24 by a pump 28, and sent to a separator 32. The separator 32 separates the milk into cream and skim milk. The cream is pumped through a conveying line 36 to a creme storage unit 40. From the cream storage unit 40, the cream may be further processed, or may be sold.

The milk that remains after the cream has been removed is drawn through conveying line 44 and into tank 46. The milk is then moved by pump 48 and released into a pasteurizer 52 and holding tube 56. A conveying line 60 carries the milk from the pasteurizer 52 to a cheese vat 64. A starter culture is stored in starter supply unit 68, and pumped by pump 72 through the conveying line 76 to the cooking vat 64. In the cheese vat, the milk and starter are set with rennet and then allowed to sit until the milk solids coagulate to form a gelatin like mass. The mass is then cut with cheese knifes and cooked to express the whey. The curds and whey are then pumped through conveying line 80 by pump 84 and released into a finish vat 88.

In the finish vat 88, the curds are separated from the whey. The cheese whey is drawn out through drain line 92 and pumped by pump 96 to a whey storage unit 100. After the initial cheese whey is released, the remaining cheese curds are salted to release additional whey, which is also sent to the whey storage unit 100.

From the whey storage unit 100, the whey is drawn through conveying line 102 by a pump 104 and sent to a separating means, such as an Ultra filtration unit and a dryer, to isolate the whey protein for use, sale, or disposal. As was mentioned in the background section, the inability to sell whey protein at a commercially advantageous price is a significant limiting factor on the profitability of processing cheese.

The cheese curd in the finishing vat 88 is moved by an auger 106 or other mechanism into a cheese molding device 108. The cheese molding device 108 may be a barrel or, more commonly, a hoop that is configured to form a forty pound block of cheese. The cheese curd is loaded into the barrel or hoop and then placed in a press 112. The press 112 applies pressure to the cheese curds to form them into a solid block of cheese. From the press 112, the blocks of cheese curds are sent to a cooler 116 where they are cooled to a desired temperature to maintain the desired form. The exact temperature, of course, is dependent on the type of cheese.

After the cheese has been in the cooler 116, it is sent to a cutter, a wrapper, or a shredder, depending on the desired end product. The cheese is then shipped to the store for sale.

In order to clean the system 4, a clean-in-place (C.I.P.) system is provided with an acid supply tank 124, a caustic supply tank 128, and a rinse supply tank 132. The clean-in-place system automatically cleans all of the lines and most of the equipment.

While the system shown herein successfully produces cheese products, the drawbacks to the system have created a significant need for a new system and method for making cheese products.

Figure 2:
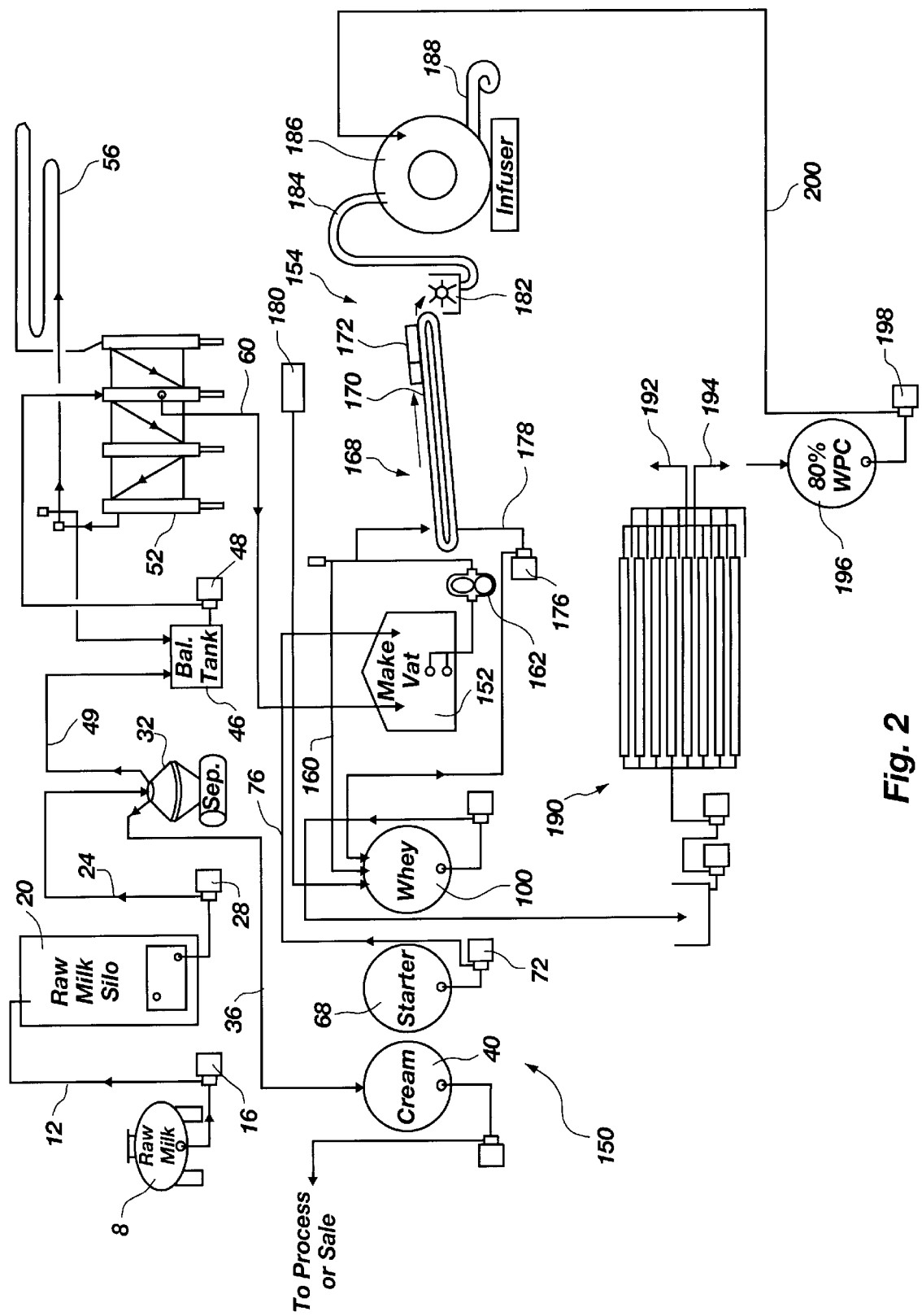
FIG. 2 shows a simplified flow diagram of a system for making enhanced cheese products in accordance with the teachings of the present invention.

Turning now to FIG. 2, there is shown a simplified flow diagram of one embodiment of a system utilizing aspects of the teachings of the present invention. The system, generally indicated at 150, has many components that are substantially the same as those discussed in detail in FIG. 1 and are therefore numbered accordingly.

Milk is supplied by a delivery truck 8 and drawn through conveying line 12 by the pump 16. From the raw milk silo 20, the pump 28 sends the milk through the conveying line 24 and into the separator 32. The cream is sent through conveying line 36 to the cream storage unit 40, and the milk is sent through conveying line 44, tank 46 and pump 48 to the pasteurizer and holding line 56. From the pasteurizer 52, the milk is sent through the conveying line 60.

Rather than requiring the use of a cooling vat 64 and a finish vat 88 as shown in FIG. 1, the present invention is able to use a single make vat 152. (Of course two vats could be used if desired). In the make vat 152, the milk is mixed with a starter culture which is stored in a starter storage unit 68 and moved through conveying line 76 by the pump 72. In the make vat 152, the mixture is renneted and allowed to coagulate into a gelatin-like mass in a similar manner to the conventional system. The gelatin-like mass is then separated into curds and then heated to express the whey form the curds. Part of the whey is pre-drawn form the make vat. The curd and remaining whey is moved through conveying line 160 by pump 162, and the curds are moved through a curd processing system 154.

The curd processing system includes a curd dewhey and press system 168 which helps to remove excess whey from the curds. While numerous mechanisms may be used, a conveyer belt 170 which is screened to allow draining of the whey, and a pressing plate 172 can be used to ensure that excess whey is removed. The whey removed in the dewhey and press system 168 is pumped by pump 176 through conveying line 178 to the whey storage unit 100. If additional whey is required, a supplemental whey storage unit 180 may also be disposed in communication with the whey storage unit 100.

From the dewhey and press system 168, the curds are passed through a shredder 182, to cut the curds into small pieces. The small pieces of curds are then sent through a curd hose 184 and into an infuser 186, which is typically in the form of an infuser. The infuser 186 is connected to a vacuum means 188 for developing a negative pressure within the infuser. As will be discussed in additional detail below, an enhancing agent is also fed into the infuser, and the curds and the enhancing agent are tumbled to form a mixture. While the infuser rotates, the mixture of cheese curds and enhancing agent are subjected to a negative pressure, thereby causing the enhancing agent to infiltrate the curds.

FIG. 2 represents a system in accordance with the present invention when the enhancing agent is whey protein. Rather than disposing of the cheese whey or trying to reintroduce whey protein into the milk before coagulation (as has been tried with limited success in the prior art), the present system 150 sends the whey through an Ultra filtration system 190 which separates the whey protein from the lactose and other components of whey. The whey protein concentrate is sent through conveying line 194 to a concentrated whey protein storage tank 196, while the other components of the whey are sent via line 192 to a permeate tank.

While a wide variety of whey protein concentrations may be used, it is presently believed that a protein concentration of about 80 percent is ideal. The concentrated whey protein is moved by pump 198 through the conveying line 200 to the infuser 186. In the infuser 186, a mixture is formed between the concentrated whey protein and the cheese curds. As the curds and whey protein are subjected to negative pressure, and preferably to an elevated temperature, the concentrated whey protein coats the cheese curds and is drawn into the cheese curds. The resulting cheese product has a higher percentage of protein due to the whey protein. The product also has been found to lack the peculiar taste that commonly accompanies whey products. Thus, by the present method, the whey protein can be reintroduced into the cheese product, making a healthier product and virtually eliminating the problem of how to dispose of the whey protein.

The most significant advantage of the present invention is the increase in product produced. Using the conventional system shown in FIG. 1, a maker of mozzarella cheese would typically obtain approximately eight pounds of cheese for every hundred pounds of milk which are processed. Using the system and method of the present invention, however, a cheese maker can obtain a little more than 10 pounds of cheese from the same quantity of milk. This approximate twenty-five percent increase in product yield dramatically changes the financial aspects of the very competitive cheese market.

The infuser 186 is preferably equipped with load cells and the moisture of the cheese can be rapidly determined via CEM microwave or another rapid method. As indicated by the examples below, moisture can be added back to the cheese mass to maximize yield. Most of the cheese standards have the maximum moisture content specified. If the cheese maker exceeds the maximum amount, the cheese is out of standard and results in a loss. Using the infuser 186 to standardize moisture to the maximum allowable limit, the cheese maker can maximize his profit.

While the system described with respect to FIG. 2 is configured for utilizing whey protein, it has been learned that the principles of the present invention can also be readily adapted for other enhancing agents or combinations of enhancers. These other enhancing agents may be used in place of or in addition to the whey protein. For example, it is highly desirable to extend the shelf life of cheese products to reduce waste. It has been known for a considerable amount of time that certain acids and metabolics of bacteria, commonly referred to as probotics, can be used to extend shelf life. However, the ongoing problem in the cheese industry has been how to economically use the products in cheeses. When applied to the surface of the cheese curds, there is a lack of penetration that provides inconsistency in final product. Additionally, a substantial amount of the probotic is lost.

In accordance with the principles of the present invention, it has been found that the probotic can be mixed with the cheese curds and subjected to a negative pressure, i.e. in the infuser 186, to cause the curds to be coated with and absorb the acid or probotic. The process results in a more consistent application of the probotic, and reduces the amount which must be used in the cheese product. Thus, the producer saves money both in reduced costs for the probotic and in reduced spoilage.

Another significant advantage of the system discussed above is that it can be used to make reduced fat cheese that has substantially identical texture, body and organoleptic properties as regular cheese. Not only does the addition of the whey protein reduce the fat concentration in the cheese product, fat substitutes such as inulin, OPTA brand modified corn starch (produced by Opta Food Ingredients, Bedford, Mass.), INULIN brand chicory extract, produced by Imperial Sucre of Sugarland, Texas, and SIMPLESE brand modified whey protein (NutraSweet Kelco of Deerfield, Ill.) can be added to the cheese. Those skilled in the art will be familiar with numerous other fat substitutes which may be used in accordance with the principles of the present invention.

The fat substitutes provide similar sensations in the mouth as fat, but they have been extremely difficult to use due to the inability to introduce the fat substitute into the cheese curds. Prior to the present invention, the use of fat substitutes was generally limited to highly processed cheese products that lack the texture and body of regular cheese.

In accordance with the present invention, the fat substitute is mixed with the cheese curds and then subjected to negative pressure and heat to cause the fat substitute to be absorbed into the cheese curds. Thus, the present invention enables the production of cheeses with fat reductions of about 50 percent without loss of the desired texture and body by the use of fat substitutes and whey protein.

Furthermore, it has been learned that fat can be withdrawn from the cheese curds by processing in accordance with known techniques (i.e. making a nonfat curd), and then adding fat substitutes into the cheese curds in accordance with the principles of the present invention. The fat substitute replaces the fat omitted from the cheese curds and enables formation of a low fat or nonfat cheese product with the body, texture and organoleptic properties similar to those of traditional cheese.

Likewise, the present invention enables the introduction of flavorings and colorings, if necessary, to develop novelty cheeses. By mixing the flavoring agent with the cheese curds and subjecting the mixture to heat and negative pressure, a desired flavor can be imparted to the cheese product. Thus, for example, a strawberry flavoring and a red coloring could be added to mozzarella curds to form a mixture. The mixture would be heated and subjected to a vacuum to draw the strawberry flavoring and the red coloring into the cheese curds to provide a reddish colored mozzarella with a distinctive strawberry flavor. Likewise, a bacon flavor could be added to cheddar cheese curds, or pepperoni flavoring could be added to mozzarella.

In addition to common flavorings, it has been found that the principles of the present invention can also be used to accelerate the ripening process. In place of, or in addition to, the addition of concentrated whey protein, ripening enzymes may be added to the cheese curds to form a mixture that is subjected to heat and negative pressure. The ripening enzymes are then drawn into the cheese curds where they provide a more consistent ripening of the cheese. Additionally, it has been found that approximately half to sixty percent of the traditional amount of the enzyme(s) is needed to promote the desired ripening. In that many of these enzymes cost as much as seven hundred dollars (U.S) per pound, considerable savings are obtain just in enzyme costs.

In accordance with still another aspect of the present invention, the system discussed above can also be used to more precisely control the accelerated ripening of cheeses. Rather than adding the enzyme to the cheese, the enzyme can be added to a small amount of cheese curd and processed to optimize the catalytic effect of the enzyme. After a short period of time, a cheese product with very concentrated flavor is developed. The cheese/enzyme concentrate can then be added to the cheese curds under heat and negative pressure to provide the cheese curds with the desired flavor. Thus, the method enables the production of cheese with a ripened flavor (i.e. two years) without storing or aging.

In addition to enabling the production of aged cheese without storing, additional control may be provided because the concentrated cheese product can be heated to a sufficient temperature to substantially inactivate the enzyme. Thus, when the cheese/enzyme concentrate is added to the cheese curds, the ripening process will not continue at a high rate—thereby preventing over ripening.

The advantages of this new system for making a low fat or fat free Cheddar cheese are that the fat substitutes and mimics will not precipitate out with the casein in the cheese vat. This invention allows for the use of any fat substitute to be infused or incorporated into the protein matrix of the cheese. The fact is that the fat substitute will enhance the texture of the cheese and allow the protein matrix to remain in its natural state. Normally, the protein matrix without fat will become increasingly rubbery and continue to develop a hard, brittle texture.

While the present invention is highly desirable for individual applications, such as increasing yield, providing desired flavors, or producing low fat cheese that has the texture and other organoleptic properties of regular cheese, it is even more desirable in that different combinations can be achieved. In other words, increase yield can be achieved at the same time as advanced ripening, and/or the addition of probotics. Likewise, a flavored, low fat cheese can be developed. The number of combinations that may be achieved utilizing the present invention will allow cheese makers to produce cheese at lower costs than traditionally possible, while simultaneously producing cheeses that will command much higher prices. For example, a flavored string cheese will typically sell at a premium over that of regular mozzarella.

The following are additional examples of applications of the present invention. It is important to note that such applications are only a small number of the different combinations that can be achieved.

In addition to the above, the infuser 186 described above and discussed additionally below can be used for other purposes as well. For example, when making Pizza cheese it is common to produce cheese curds and then add chemicals that are designed to facilitate stretch and melting. Once the chemicals are added, the curds are pressed into shape, subjected to brine, cooled and then ground. Such a system is labor intensive and also creates environmental concerns due to the brine solution. By utilizing the present invention, improved penetration of the chemicals can be achieved with decreased labor and without the environmentally damaging brine solution.

Figure 3:
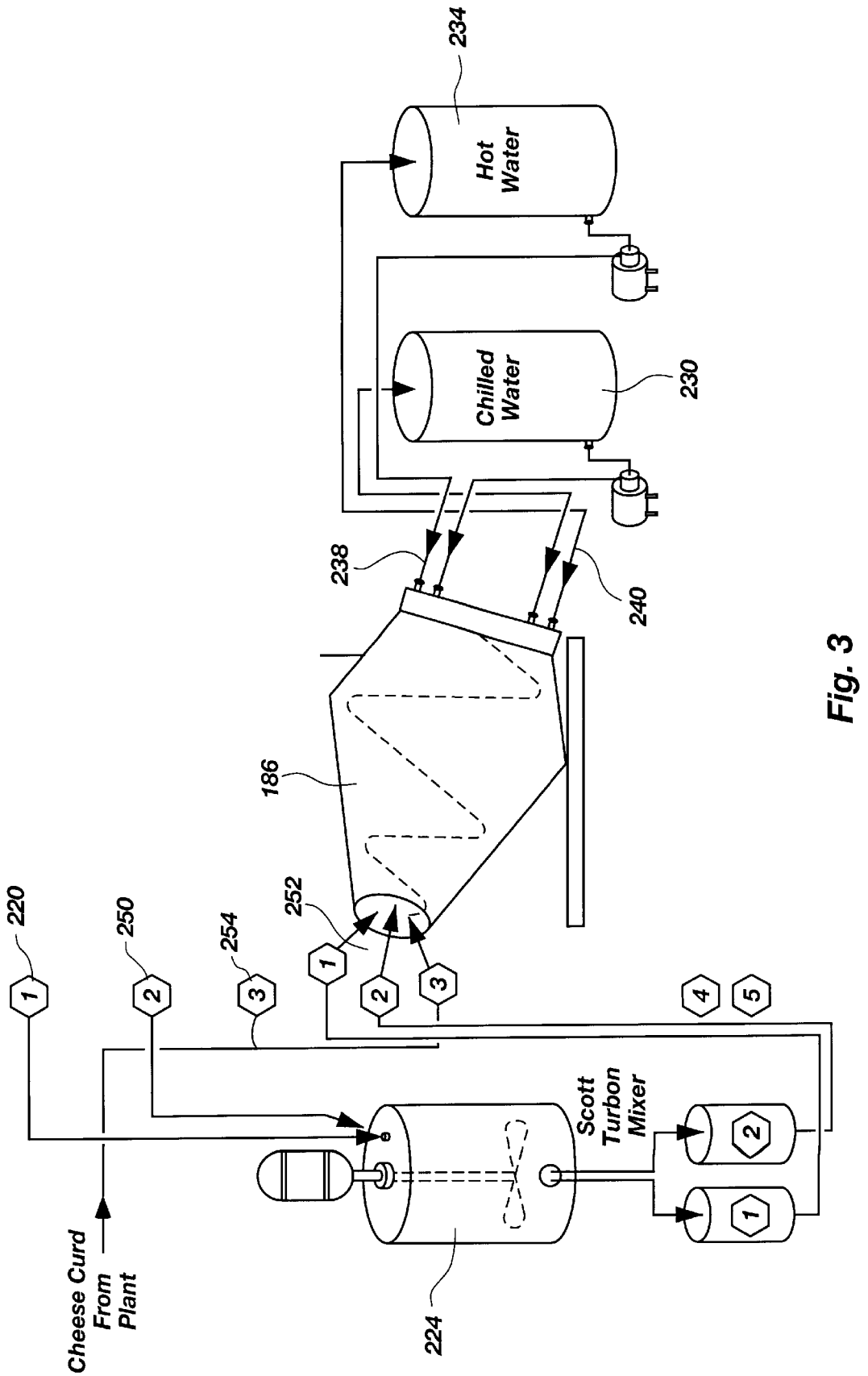
FIG. 3 shows a more detailed flow diagram of the system and method for the addition of a plurality of enhancing agents to the cheese curds in accordance with the present invention.

Returning to the drawings, the several aspects of the invention are discussed generally. In FIG. 3 there is shown a more detailed flow diagram of aspects of the system and method in which a plurality of enhancing agents are added to enhance the resulting cheese product. While the example given in FIG. 3 relates to preserving agents (i.e. probotics) and a yield enhancing agent (i.e. whey protein), those skilled in the art will appreciate that other combinations may be used. The first step, indicated at 220 is to mix one or more probotics or other preserving agents. The probotics would typically be selected from the group including nisin, which is produced by lactococcus lactus, and other culture generated probotics such as MICROGUARD, MICROGUARD PLUS, NIPISAN, and the ALTA series. The probotic(s) are mixed with water. Typically, the mixing will occur in a mixer 224 such as common in cheese production facilities. A Scott Turbo mixer works well for this purpose.

The mixture of probotics and water is heated. Preferably, the mixture is heated to between 160 degrees Fahrenheit and to approximately 190 degrees Fahrenheit if pasteurization is desired. The mixture (represented by the numeral 1 in the hexagon) is then sent to the infuser 186 and chilled while pulling a vacuum. An infuser that has been found to be particularly useful is produced by RMF Challenge of Kansas City, Missouri. Chilling of the infuser 186 is provided by water chiller 230 that preferably keeps water chilled to between 35 and 40 degrees Fahrenheit.

After the probotics have been removed from the mixer 224, whey protein concentrate and water, indicated by the numeral 2 in the hexagon and designated 250, are mixed together and heated. Preferably, the mixture is between 40 and 60 percent water, and the mixture is heated to at least 160 degrees Fahrenheit. More preferably, the mixture is heated to about 190 degrees Fahrenheit to pasteurize the mixture.

The heated mixture is then moved to the infuser 186 (as represented by the 2 in the hexagon and indicated as 252) where it is cooled while pulling a vacuum. Preferably, the mixture is cooled to between 30 and 40 degrees Fahrenheit and under a vacuum up to about 28 inches.

The probotics mixture and the whey protein mixture are disposed in the infuser 186, cheese curd, indicated at 254 as the numeral 3 inside the hexagon, is drawn from the systems shown in FIGS. 1 or 2, and disposed in the infuser. The cheese curd/probotic/whey protein mixture is then heated and repeatedly turned while drawing a vacuum. The amount of heat which is applied to the cheese curd/probotic/whey protein mixture depends, in part, on the type of cheese being produced. Typical ranges for cheeses are 104 degrees Fahrenheit for cheddar, 108 degrees Fahrenheit for jack and 132 degrees Fahrenheit for Mozzarella. Additionally, it is desirable to maintain the pH of the mixture between about 6 and 7, although other pH ranges can be used.

Heating of the infuser 186 is provided by a water heater 234 that keeps water between 100 and 160 degrees Fahrenheit depending on the type of cheese being produced. Supply lines 238 and return lines 240 connect the chiller 230 and the heater 234 to a jacket shell 242 about the infuser 186.

As the cheese curds 254 fall with each rotation of the infuser 186, the cheese curds are coated with the probotics and whey protein, and expand and absorb the probotics and whey protein with which they are mixed. After repeated turning, substantially all of the probotics and whey proteins are absorbed into the cheese curds.

As was noted above, salt is typically not used to expel whey from the cheese curd. Thus, salt may be added to the mixture during the infusing process to provide the familiar taste of the cheese. Likewise, an enzyme can be added during the infusing process if desired. Heat is then continued to be applied and a vacuum is pulled on the product to finish.

The cheese curd, infused with the probotics and whey protein (and salt and enzyme if provided), can then be treated like conventional cheese curds. Namely, the cheese curds are pressed and cooled to form blocks of cheese. While the cheese has the same body, texture and organoleptic properties of regular cheese, it has higher protein and water concentrations and has a highly consistent infusion of the whey protein, probotics, etc. Additionally, approximately 25 percent more product is produced. Thus, the present invention simultaneously enables production of a higher quality product and a greater quantity of the product from the same amount of milk.

Figure 4:
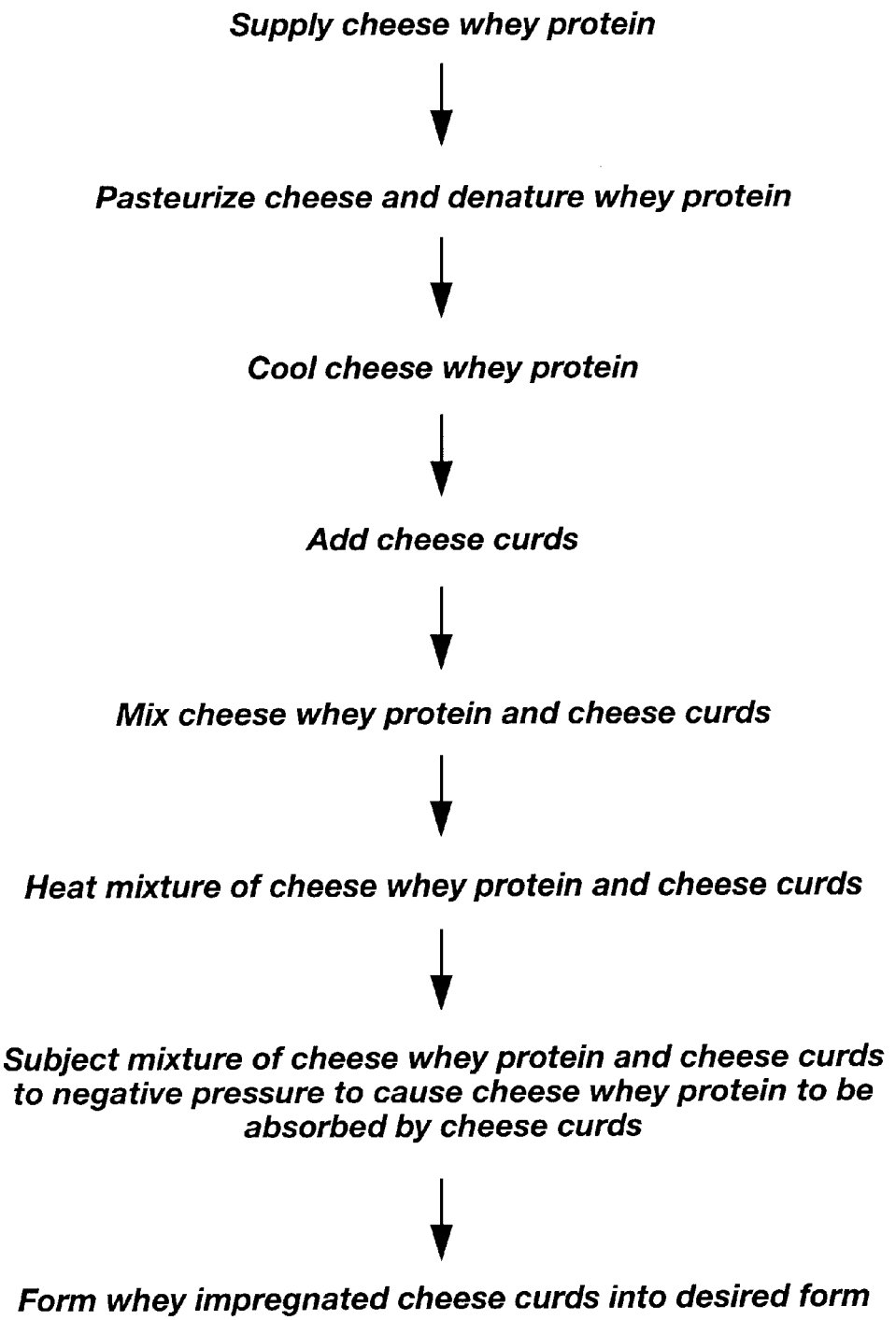
FIG. 4 shows a flow chart of the steps of a preferred method for enhancing cheese curds by the addition of whey protein to increase yield.

Turning now to FIG. 4, there is shown a flow chart of the steps of the method for enhancing cheese curds by the addition of whey protein to increase yield. The first step is to supply cheese whey protein. Preferably, this is done by mixing an 80 percent concentrate of the protein with water. The whey protein/water mixture is heated to a sufficient level to pasteurize the mixture—typically between 160 and 190 degrees Fahrenheit. Those skilled in the art will appreciate that the heating may occur prior to combining of the ingredients or after. Preferably, the concentration of whey protein to water will be between 40 to 60 percent protein, although lower concentrations can be used.

The pasteurized mixture is then cooled under negative pressure. It is presently believed that cooling the mixture to between 30 and 40 degrees Fahrenheit is preferred. Cooling can be accomplished by supplying cold water to the infuser 186 or by some other cooling means.

Once the whey protein has been cooled, cheese curds made by a traditional cheese making process or some other method are added to the whey protein. It is preferred that the cheese curds not be salted prior to mixing with the whey protein as salt tends to force the cheese curds to expel whey, and interfere with subsequent absorption of whey protein.

The cheese curds and whey protein are then heated and turned to mix the two components together. As the mixture is heated and turned, the mixture is subjected to a negative pressure. It is believed that the stronger the vacuum the better. Up to twenty-eight inches has been tried and found to work well. The negative pressure causes the whey protein to be drawn into the cheese curds. Because the whey protein is absorbed into the cheese curds, the resulting product lacks the characteristic whey taste that many people find objectionable.

As the cheese curds and whey mixture is tumbling, salt may be added to provide the proper taste for the cheese. The amount of salt which is added depends on the type of cheese.

Once the cheese curds have been infiltrated by the whey protein, the cheese curds are removed from the infuser and formed into the desired form. This may be done by common formation processes, such as dispensing the cheese curds into number 40 loops and then pressing and cooling the cheese curds. In the alternative, the cheese curds can be formed into the desired shape by a continuous cheese forming process such as that disclosed in U.S. Pat. No. 5,948,549 (patent application Ser. No. 08/919,556), which is expressly incorporated herein.

Experiments have confirmed that the cheese curds can absorb at least 25 percent of their solid weight in whey protein. Thus, all of the recoverable whey protein from the milk can be reintroduced into the final product and the problem of disposal of whey protein is virtually eliminated.

Moreover, it is presently believed that the cheese curds may be able to absorb up to about 40 percent of their solid weight in whey protein. This allows whey protein to be purchased from other cheese making facilities and introduced into the cheese product of the present invention—increasing the protein content and decreasing the fat content. Because whey protein can be purchased for about one-fourth the cost of cheese solids, adding additional whey protein would further increase profitability and decrease the disposal concerns of the whey protein.

In light of the increase in product and near elimination of the need to dispose of whey protein, it is preferred to have whey protein be at least 10 percent, and up to 40 percent by weight relative to the cheese curds. The exact amount used will depend, in part, on the type of cheese product being made. Thus, it is preferred that the ratio of cheese curds to whey protein be somewhere between 10:1 and 1.5:1.

As mentioned above, initial tests of the above method have resulted in the an increase of about 25 percent in cheese obtained from a given quantity of milk. The cheese has higher moisture content that effectively increases profitability as less cheese solids are required to make a pound of cheese. Additionally, the cheese is typically not distinguishable by taste from cheese prepared by traditional methods.

Figure 5:
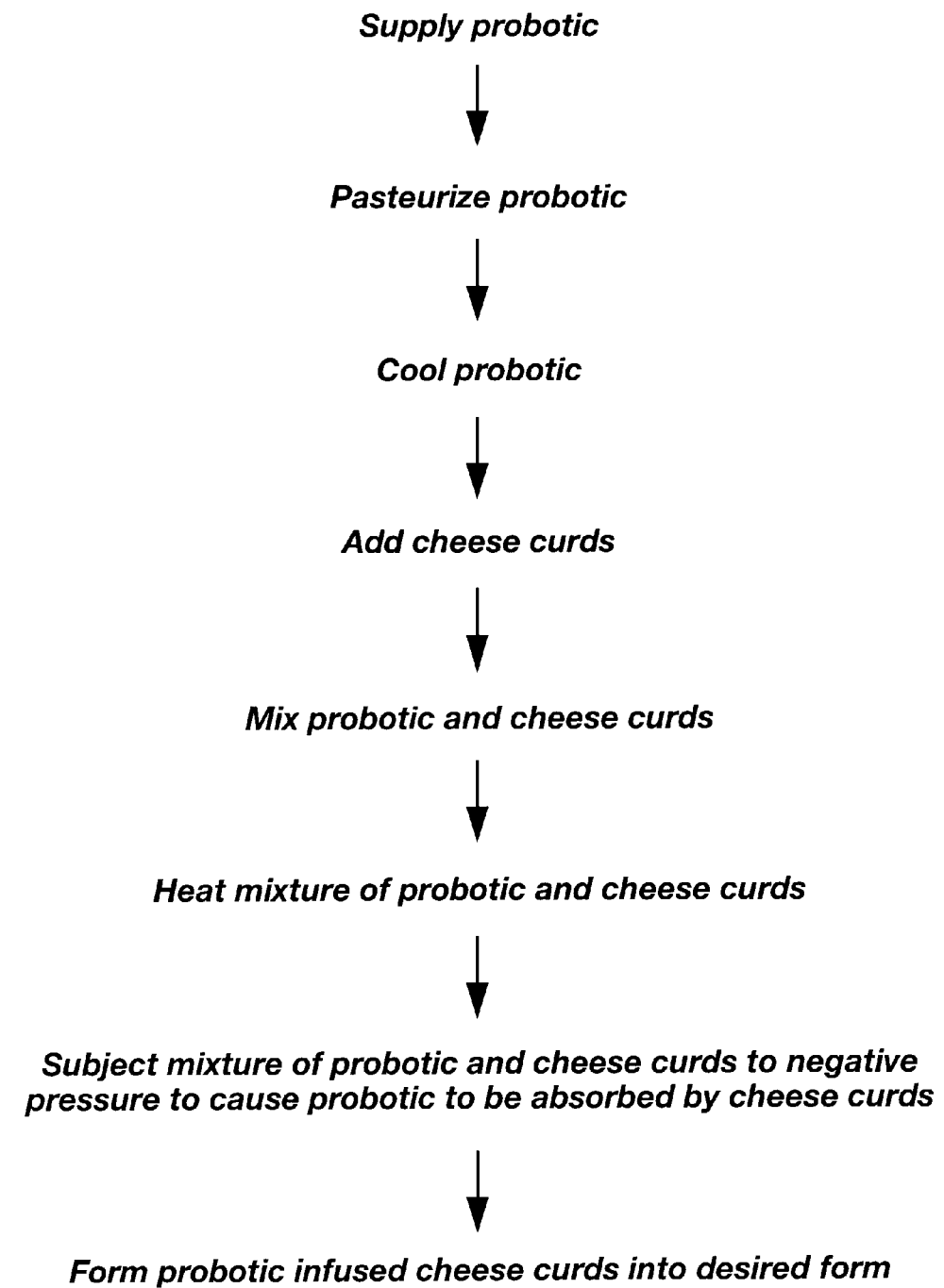
FIG. 5 shows a flow chart of the steps of a preferred method for enhancing cheese curds by the addition of a probotic to increase shelf life.

FIG. 5 shows a flow chart of the steps of a method for enhancing cheese curds by the addition of a preservative to increase shelf life. Preferably, the preservative will be an acid or metabolic material, commonly called probotics, which are know to control spoilage in cheese. However, other preserving agents may also be used.

Initially, the probotics are usually pasteurized to prevent contamination of the cheese product. This is accomplished by mixing the probotics with water and heating the probotics to between 160 and 190 degrees Fahrenheit. After pasteurizing, the probotics are added to the infuser 186 (FIGS. 2 and 3) and chilled while pulling a vacuum.

Once the probotics have been chilled, the cheese curds, which are preferably warmer than the probotics, are added to the infuser and the cheese curds and the probotics are mixed. The mixture is heated to approximately 130 degrees Fahrenheit, while pulling a vacuum—preferably about 28 inches. Preferably, the application of the heat and the vacuum occurs simultaneously with the mixing (tumbling), although this is not required. The cheese curds may also be salted during this process to provide the proper flavor without interfering with probotic absorption.

Once the infiltration of the probotics into the cheese curds is complete, the curds are removed from the infuser and formed into cheese products in a conventional manner or in accordance with new formation methods as they are developed. The resulting cheese product is thoroughly infiltrated with the probotics and therefore has a longer shelf life the cheeses made in accordance with traditional methods. Additionally, because the probotics are not lost or spread unevenly, less probotic must be used to appropriately treat a given amount of cheese.

One significant advantage of the use of probotics in accordance with the present invention is in the area of shelf stable cheeses, such as Parmesan. These cheeses are typically grated and placed in a container that is not refrigerated. To maintain shelf-life stability, the grated cheese is dried so that it has only about 16 to 17 percent moisture content. If the moisture content is higher, the cheese will spoil unless refrigerated. This raises two concerns. For the cheese producers, the low moisture content increases the amount of valuable cheese solids that must be present to fill the container. For the customer, the low moisture content minimizes the taste of the cheese, as moisture is necessary for proper taste.

By using probotics in accordance with the principles of the present invention, it has been found that the moisture content of the cheese can be as high as 32 to 36 percent. The probotics prevent spoilage of the cheese, even if the cheese is not refrigerated. The increase in moisture content reduces the amount of cheese solids that must be present to fill a given container, therefore making the cheese more profitable to produce. Additionally, the added moisture makes the cheese taste like fresh grated cheese, even if it has been on the shelf for an extended period of time.

Another area in which there is a real need for an enhanced cheese product is in the area of low fat cheese. There are numerous fat substitutes that can be used to replace the fat in cheese. The problem, however, has been the introduction of the fat substitute into the cheese curd. When fat substitutes are simply added into a mixture with the cheese curds, the resulting product is highly processed and lacks the body, texture and organoleptic properties of regular cheese. While attempts have been made to add fat substitutes to milk and then precipitate the fat substitute with the milk solids, such attempts have been generally unsuccessful.

Figure 6:
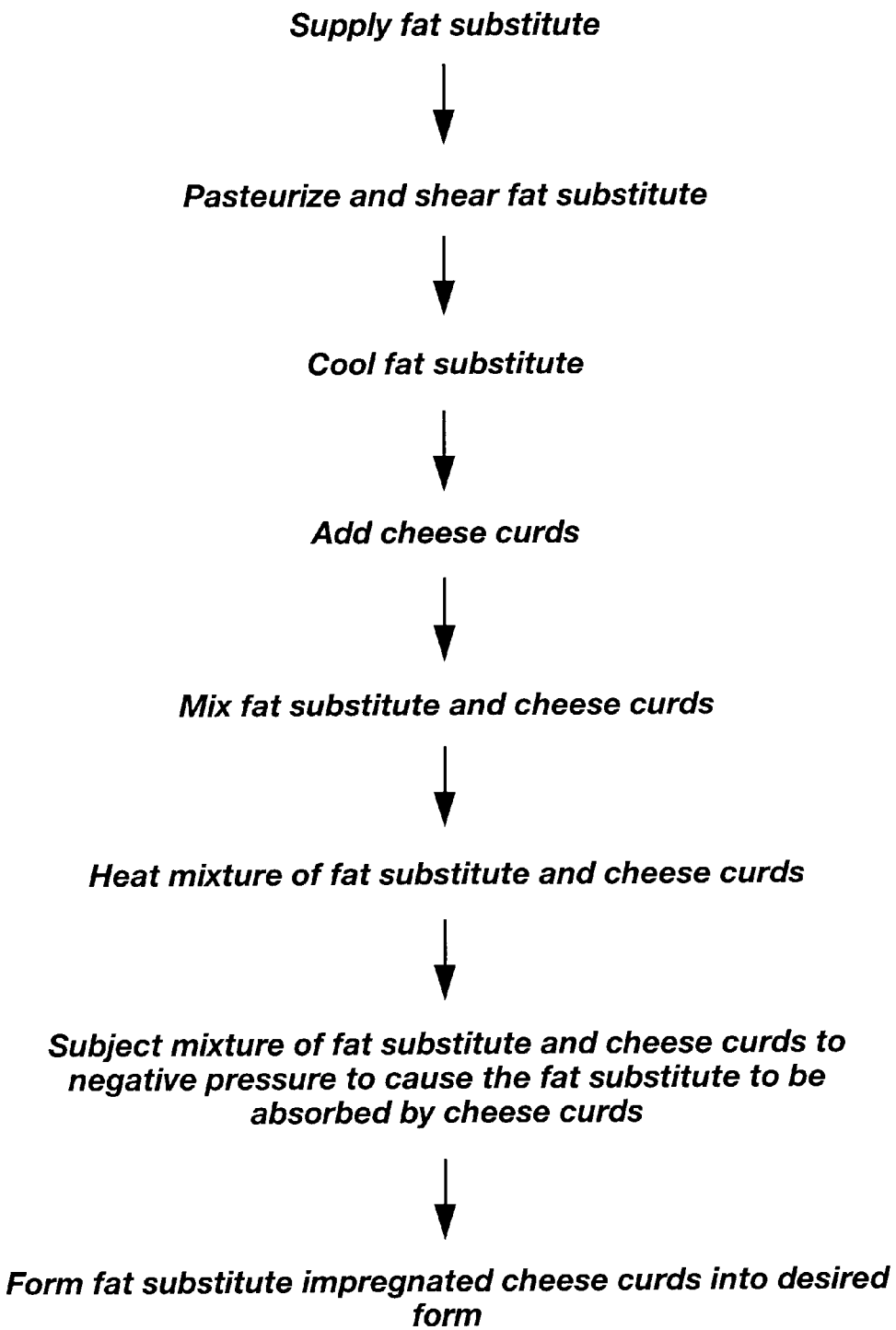
FIG. 6 shows a flow chart of the steps of a preferred method for enhancing cheese curds by the addition of a fat substitute to produce a cheese product having reduced fat content.

FIG. 6 shows a flow chart of the steps of a method for enhancing cheese curds by the addition of a fat substitute to produce a cheese product having reduced fat content while maintaining the body, texture and organoleptic properties. The fat substitute may be selected from a wide variety of known compounds, such as OPTA brand modified corn starch (produced by Opta Food Ingredients, Bedford, Massachusetts), INULIN brand chicory extract, produced by Imperial Sucre of Sugarland, Texas, and SIMPLESE brand modified whey protein, NutraSweet Kelco of Deerfield, Ill.

The compound or compounds are mixed or otherwise processed to form an appropriate fat substitute. The fat substitute may be purchased in ready-to-use form, or may be prepared on premises.

Once the fat substitute has been provided, it will typically need to be pasteurized. While pasteurization is not required to use the invention as set forth herein, it is desirable to prevent contamination of the cheese. Pasteurization is typically accomplished by heating the fat substitute to between 160 and 190 degrees Fahrenheit. Those skilled in the art will recognize, however, that some fat substitutes will not tolerate such high temperatures without degrading. Thus, other mechanisms for killing pathogens, etc., must be found. One common system used with dairy products in Europe is irradiation.

The fat substitute is then cooled under negative pressure and mixed with cheese curds of the desired type. As with the other method disclosed herein, the cheese curds will typically be warmer than the cooled fat substitute when the mixture occurs.

The mixture of cheese curds and fat substitute is heated and subjected to negative pressure. Typically the heat will vary between 110 degrees Fahrenheit and 120 degrees Fahrenheit depending on the fat substitute, and the negative pressure will be up to about 28 inches. The heat and negative pressure are preferentially applied while the mixture is tumbled so that the falling cheese curds can readily absorb the fat substitute.

Once the fat substitute has infiltrated the cheese curds, the cheese product can be withdrawn from the infuser and formed into whatever shape is desired. This can be done in accordance with any traditional forming process. Unlike traditional low fat cheeses that tend to be soft and lack texture, the cheese product has body, texture and organoleptic properties that are similar to regular cheese.

While a fat substitute may be simply provided as a supplement, the cheese curds can also be processed to remove some or all of the fat prior to mixture with the fat substitute. The fat substitute fills the structural void left by the removed fat and enables a low fat or no fat cheese to be formed which has the desired body, texture and organoleptic properties of a high fat cheese.

Figure 7:
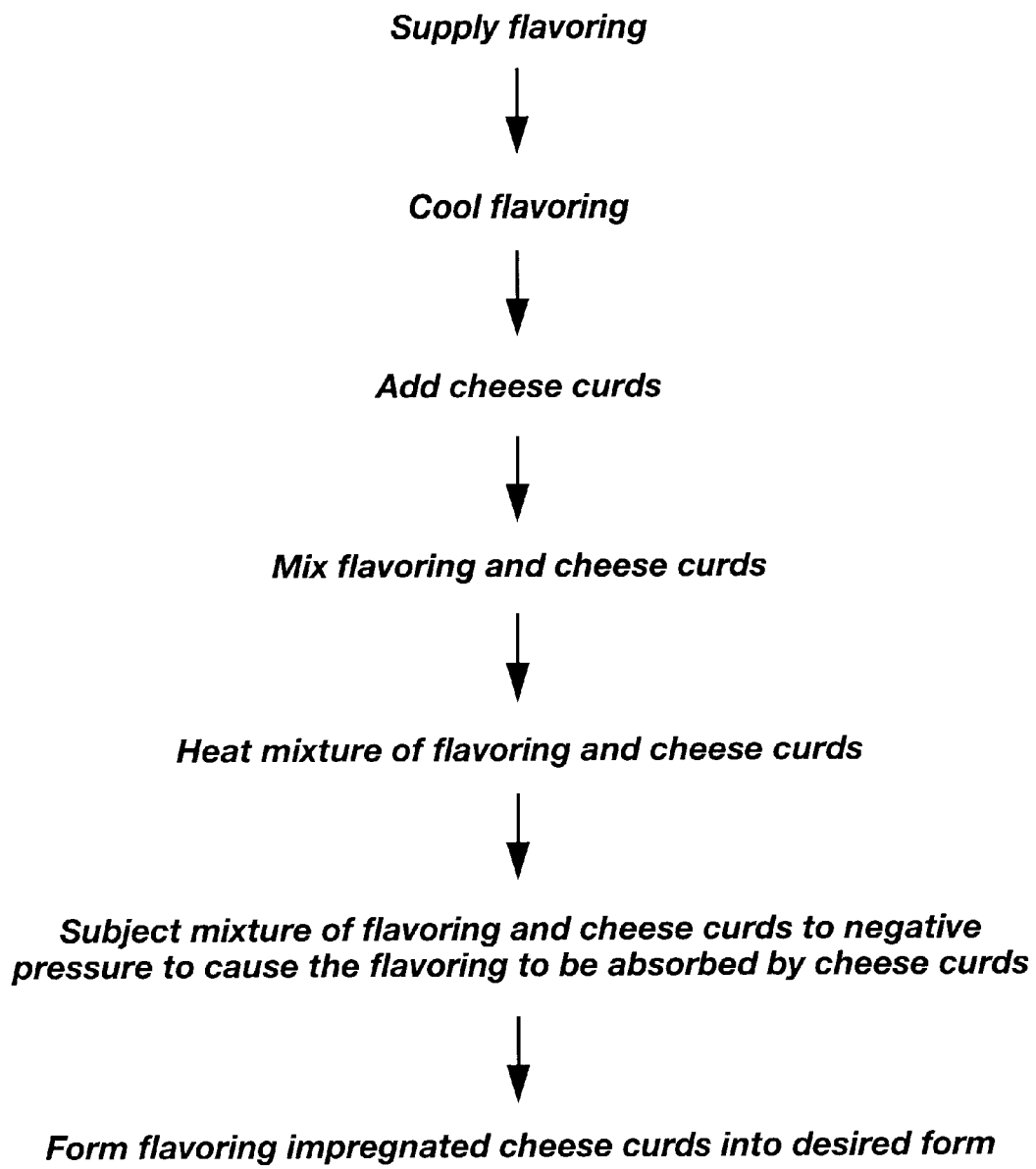
FIG. 7 shows a flow chart of the steps of a preferred method for enhancing cheese curds by the addition of flavorings and/or coloring to produce novelty cheeses.

FIG. 7 shows a flow chart of the steps of a method for enhancing cheese curds by the addition of flavorings (and/or coloring) to produce novelty cheeses. A wide variety of flavorings may be provided depending on the particular market to be addressed. For example, chocolate, banana or strawberry string mozzarella may be made as a snack item for children, while a bacon flavored cheddar cheese may be made for adult string cheese and the like.

The flavoring is selected and may be pasteurized if necessary. If the flavoring is pasteurized, it will preferentially be cooled while drawing a vacuum. If not, it may be directly mixed with the cheese curds.

The flavoring and cheese curd mixture is then heated and turned to promote mixture. The mixture is also subjected to a vacuum, preferably up to about 28 inches, to draw the flavoring into the cheese curds. Once infiltration of the flavoring is complete, the flavored cheese curds are further handled to achieve the desired form.

While FIG. 7 refers to flavorings, it will be understood by those skilled in the art that the cheese curds will typically be impregnated with a flavoring and a coloring that tends to correspond with a flavor. Thus, a strawberry flavored cheese would be tinted red, while a chocolate flavored cheese typically would be colored brown.

Turning now to FIG. 8, there is shown a flow chart of the steps of a method for enhancing cheese curds by accelerated ripening to produce a ripened cheese in a reduced amount of time. It is well known in the cheese making industry that certain enzymes (typically lipases and proteases) may be applied to cheese to produce a cheese product which has the flavor of a ripened cheese in a shorter period of time. Currently, this is accomplished by applying the enzymes to the cheese product while it is on the finishing table. Unfortunately, only about one-half of the enzyme infiltrates the cheese. The remainder of the enzyme is lost with the whey. Because these enzymes are very expensive, this method of accelerated aging is extremely expensive. Additionally, the penetration of the cheese by the enzyme is not consistent and there is a tendency to get mottling in the cheese. Additionally, different batches of cheese, and even blocks from the same batch, ripen at very different rates.

Attempts to improve application have lead to mixing of the enzymes with salt prior to application to the cheese. The salt/enzyme mixture, however, has a tendency to cause allergic reaction and any lost product must be disposed of properly.

In accordance with the present invention, it has been found that up to a 50 percent savings of enzyme can be accomplished by the use of method similar to those discussed above. Additionally, the method improves the penetration of nearly 100 percent of the enzyme into the cheese and thereby reduces costs.

The enzyme will typically be mixed in water in a ration of about 1 part enzyme to 5 to 10 parts water. The enzyme is then placed in the infuser and chilled. The cheese curds are then added to the enzyme. It is preferable for the enzyme to be chilled to below the temperature of the cheese curds.

The enzyme and cheese curds are then mixed together, heated and subjected to a negative pressure. Preferably, the negative pressure will be a vacuum of about 28 inches. The mixing, heating and application of negative pressure will usually take about 20 minutes for 1000 pounds of cheese curd.

Once the enzyme has infused into the cheese curds, the infuser is stopped and the enzyme impregnated cheese curds are formed into the desired shape by whatever process is desired. The enzyme impregnated cheese will develop the ripened flavor in about one-tenth the amount of time that would be required for a traditional cheese to ripen or age.

Furthermore, it has been found in accordance with the present invention that dramatically improved control of the enzyme's ripening process can be obtained with relatively little expense. Referring to FIG. 9, there is shown a flow chart of the steps of a method for producing an aged cheese having a highly stable flavor. In particular, it has been learned that a cheese having a ripened flavor can be produced in a very short amount of time (i.e. the same day as the production of the cheese curds), and the flavor can be controlled to prevent over ripening.

The initial step is to select an enzyme used for accelerated ripening of cheese. The enzyme is then introduced into a relatively small quantity of cheese curd that has been processed in high heat. Preferably, the cheese will have moisture content of about 60 percent.

The cheese is heated to about 190 degrees Fahrenheit to make a uniform mass and to pasteurize the cheese. The cheese is then cooled as aseptically as possible. Once the cheese product has cooled to about 90 degrees Fahrenheit, an enzyme such as RST 50, produced by Imperial Biotech of London, England is added.

By maintaining the cheese at a desired temperature, the cheese/enzyme concentrate can reach the desired flavor in anywhere from 3 to 21 days. The higher the heat, the more rapid the flavor development. It has been found however, that 18 days at 55 to 60 degrees Fahrenheit is preferred, higher temperatures tend to leave the cheese concentrate with a bitter flavor.

After 18 days at 55 to 60 degrees Fahrenheit, the cheese/enzyme concentrate forms a semi-liquid mass having the desired organoleptic properties. This semi-liquid mass may then be added to cheese curd on the day the cheese curd is formed to produce cheese that tastes as if it has been aged for two years. Such a method allows for just in time delivery of desired cheese flavors. Rather than requiring weeks or months of storage, a particular aged cheese can be obtained within hours of receiving an order. Additionally, because the cheese need not be stored for several weeks, storage costs are dramatically reduced.

Another problem which is common with aged or ripened cheeses is that the enzymes continue to work after the cheese is sent to market. The cheese continues to age and acquires an increasingly strong flavor. While a cheese which has aged two years may be highly desirable, the same cheese aged for two and one-half to three years may be too strong for some uses. Thus, if the cheese is not sold within a relatively short window, its commercial value drops dramatically.

In accordance with the principles of the present invention, it has been learned that the continuing change in flavor can be dramatically reduced by inactivating the enzyme. Instead of the cheese continuing to age or ripen, the flavor remains relatively stable for a prolonged period of time. Thus, a cheese made to simulate a cheese having been aged for two years will remain with substantially the same flavor for an extended period of time.

The enzyme will typically be inactivated by heating the cheese concentrate to about 175 degrees Fahrenheit for about 10 minutes while applying homogenization. The heat inactivates the enzyme, and the homogenization reduces particle size.

After the enzyme has been inactivated, the cheese/enzyme concentrate can be added to the infuser 186 and mixed with cheese curd. The mixture is heated and subjected to a vacuum in a similar manner as the methods discussed above. The aged cheese may then be formed into the desired configuration in accordance with traditional systems or in accordance with the embodiment disclosed herein.

Figure 10:
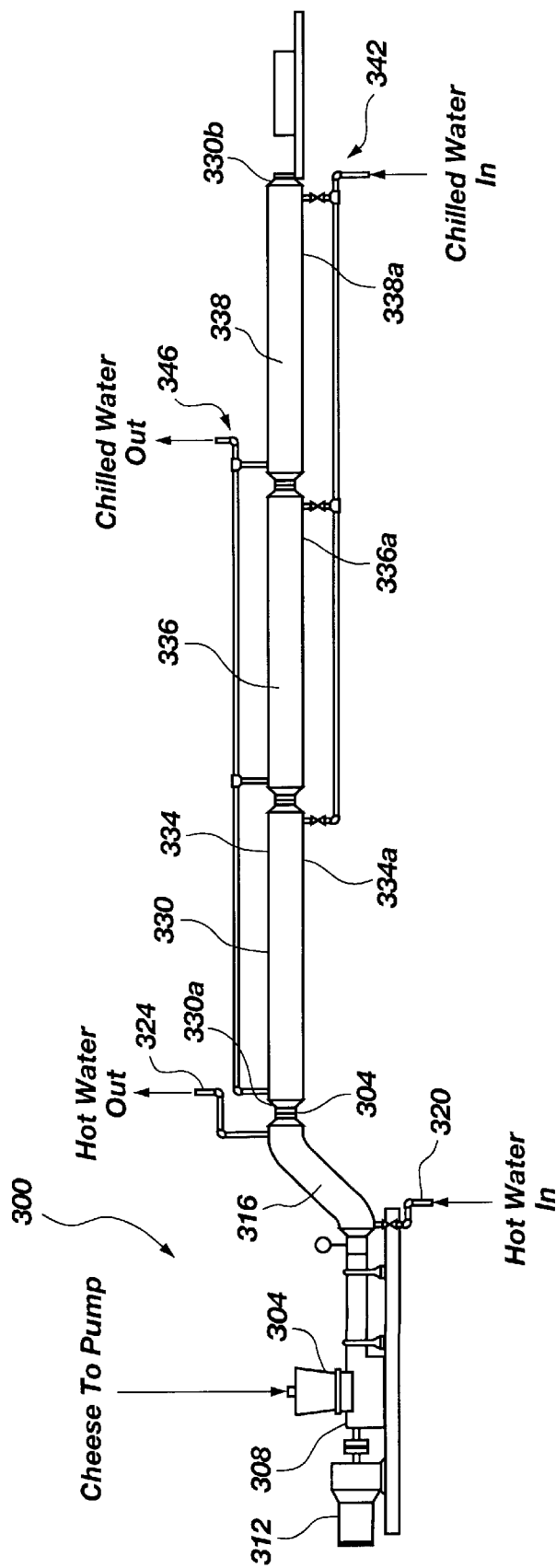
FIG. 10 shows a continuous cheese molding and chilling apparatus for forming and knitting the enhanced cheese curds into a block of cheese.

Turning now to FIG. 10, there is shown a continuous cheese molding and chilling apparatus, generally indicated at 300. The apparatus 300 includes an inlet 304 that is configured to receive cheese curds from the infuser. The inlet 304 is disposed in communication with a movement means 308 in the form of a pump 312. It is presently believed that a MARLEN pump (produced by Marlen Research of Kansas City, Mo.) is preferred for the present application, as the pump 312 must be sufficiently strong to force the cheese curds, and ultimately the solidified cheese through the apparatus 300.

The movement means 308 typically passes the warm cheese curds through a preheat/back pressure vessel 316. In the preheat/back pressure vessel 316, the cheese curds are heated sufficiently that bonding of the curds is encouraged. If the curds are too cold, they will not join properly to form a cheese product.

The upward slant of the pre-heat/back pressure vessel helps to ensure that there is sufficient back pressure that an appropriate amount of force is continuously applied to the cheese curds to both move them through the apparatus and to minimize mechanical separation in the cheese product. Thus, the combination of heat and an angle is highly advantageous.

The pre-heat/back pressure vessel 316 is warmed by hot water. Typically, a water inflow 320 will be provided adjacent the bottom of the pre-heat/back pressure vessel 316, adjacent the pump 312, and the outlet 324 will be disposed on the top of the pre-heat/back pressure vessel.

From the pre-heat/back pressure vessel 316, the cheese is forced into an elongate molding tube 330. The molding tube 330 has inlet end 330a for receiving cheese and an outlet end 330b through which a solidified block of cheese is passed. Preferably the molding tube 330 is divided into a plurality of sections which form cooling stages. While FIG. 10 shows three stages, i.e. three sections 334, 336 and 338, more stages or fewer stages may be appropriate depending on the type of cheese being produced.

Each of the sections 334, 336 and 338 has a sleeve 334a, 336a and 338a, respectively. Each sleeve 34a, 336a and 338a is disposed in communication with a coolant supply line, which is generally represented at 342. The supply line 342 provides coolant to the section 334, 336 and 338 so that the sections cool the cheese at it passes through. By disposing the supply line 342 to deliver cold water to a distal end of each section, and drawing the coolant out at the proximal end through a water waste line 346, a temperature gradient is formed in each of the sections, thereby enabling a gradual temperature drop in the cheese. Those skilled in the art will appreciate that a plurality of supply lines could be used i.e. one for each sleeve to provide increased control of each sleeve and further refine the cooling of the cheese. A more detailed description of the continuous cheese molding and chilling apparatus 300 is found in U.S. Pat. No. 5,948,549 (U.S. patent application Ser. No. 08/919,556) the entirety of which is expressly incorporated herein.

As the warm, enhancing agent impregnated cheese curds move through the molding tube 330, they gradually form a solid block of cheese similar to that formed by the conventional method for filling hoops. One distinct advantage of the apparatus 3 shown in FIG. 10 is that it enables the production of any size block, thereby eliminating repeated cutting of 40 pound blocks.

Those skilled in the art will appreciate that the present invention provides a method for resolving many problems that have faced the cheese producing industry for years. The following are actual experiments conducted utilizing the principles of the present invention to produce enhanced cheese products.

Figure 11:
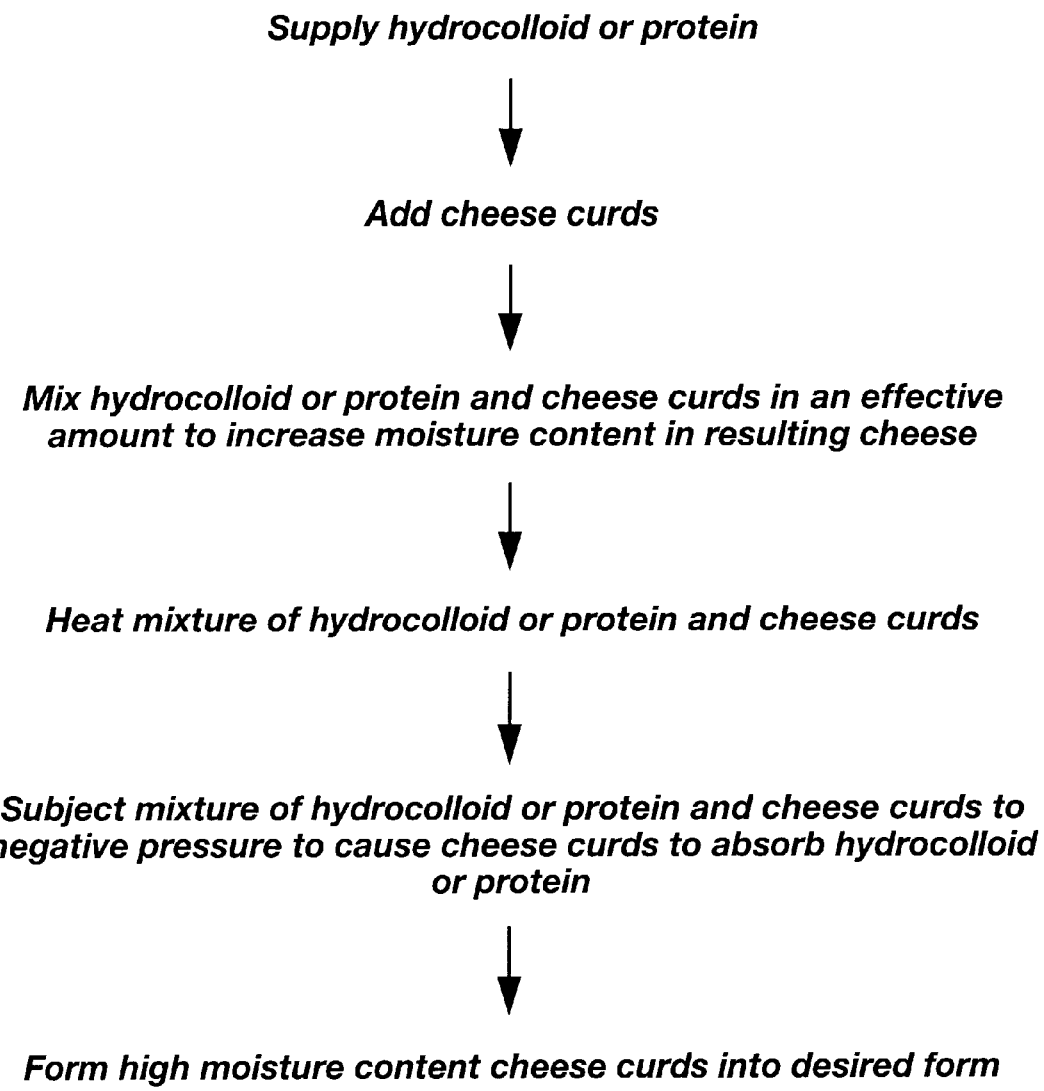
FIG. 11 shows a flow chart of the steps of a method for making cheese with enhanced moisture content.

Referring now to FIG. 11, there is shown still another aspect of the present invention, wherein the hydrocolloids and/or milk protein derived stabilizers are infused into the cheese curds. These ingredients or any other water controlling agents (i.e. starch) can be infused into the curd to prevent syneresis. Syneresis of whey off is caused by the presence of additional water beyond the ability of the casein and/or whey protein binding capacity.

The addition of hydrocolloids or proteins allows for the incorporation of greater moisture in the cheese. The greater moisture content enhances the quality of low fat or nonfat cheeses. Additionally, additional bound moisture improves the meltability of cheeses such as mozzarella.

FIG. 12 shows a flow chart for making instant quick freeze Pizza cheese in accordance with the present invention. As will be appreciated from the flow chart and example 13 below, the process for forming IQF Pizza cheese is remarkably simple. By using the frozen/solidified curds, the entire process of forming the cheese curds into a shape, brining the block of cheese, cooling the block of cheese and grinding the block of cheese are eliminated. Furthermore, the infuser 186 allows the addition of whey, salt and other agents which may enhance yield or other characteristics of the cheese. For example, the infuser could be used to add whey, melt and string enhancing agents and pepperoni flavoring to the cheese curds. Thus, the cheese maker would obtain a pepperoni flavored cheese which has highly desirable melt characteristics. Additionally, the cheese maker would obtain about 20 percent more of the cheese than would be obtained through the traditional methods of making Pizza cheese, while simultaneously reducing labor requirements.

Figure 13:
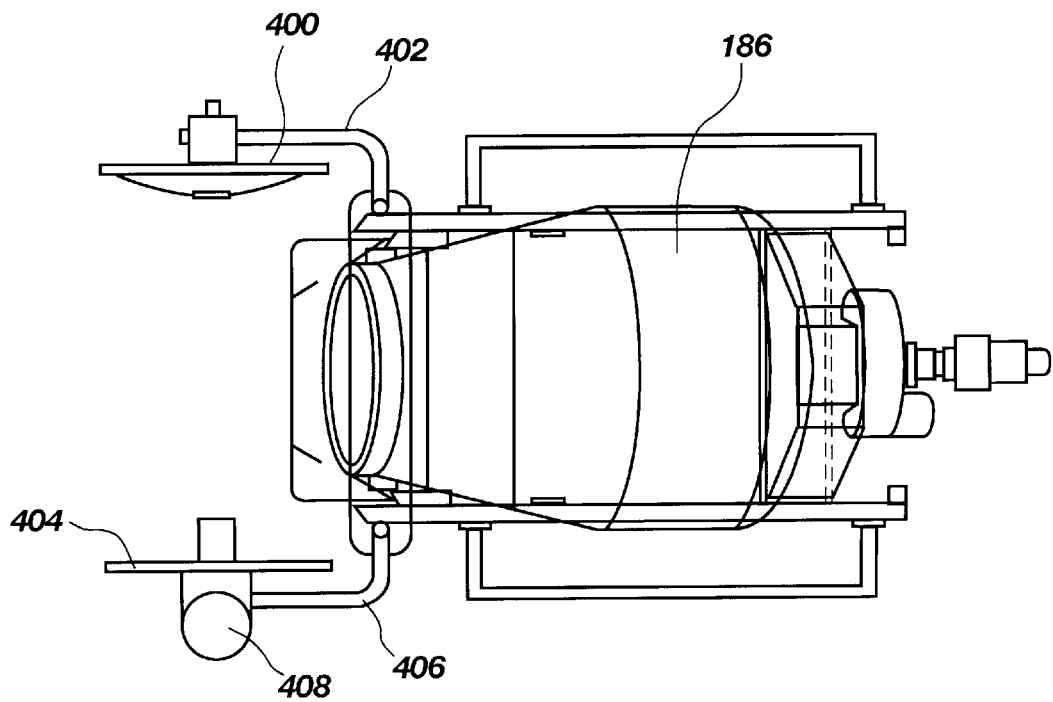
FIG. 13 shows a top view of an infuser for making instant quick freeze pizza.

FIG. 13 shows a top view of an infuser 186B for making instant quick freeze pizza. The infuser 186B is similar to that discussed in FIGS. 2 and 3 and resembles the mixer on a concrete truck. The infuser 186B is similar to that shown in FIG. 2 above in that in includes a first door 400 attached to the infuser 186 by an arm 402. The first door 400 is used when vacuum pressure is closed when vacuum pressure is being applied. Such devices are available from Challenge-RMF, Inc.

The embodiment of FIG. 13 is different than that of FIG. 2 because it includes a second door 404 which is attached to the infuser by an arm 406. The second door 404 is configured with a device for injecting cold gas (typically carbon dioxide or nitrogen) or some similar mechanism for rapidly cooling cheese curds. As noted in example 13 below, a carbon dioxide horn door 408 works well for rapidly cooling the cheese curds to enable the curds themselves to be used as Pizza cheese pellets, instead of the ground versions currently produced. A horn for injecting other cold gasses would also work.

The ability to rapidly cool the curd provides significant advantages. For example, rather than forming the curd into blocks, subjecting the curd to brine, cooling the curd and grinding it, as is commonly done with Pizza cheese, the present invention allows the cheese curd to be cooled and used in place of the ground Pizza cheese. By eliminating the additional steps, considerable cost reduction can be achieved. Additionally, the environmental concerns created by waste brine solution is also eliminated. Furthermore, the infuser allows the cheese curds to be enhanced to provide characteristics not readily available by using traditional techniques.

Figure 14:
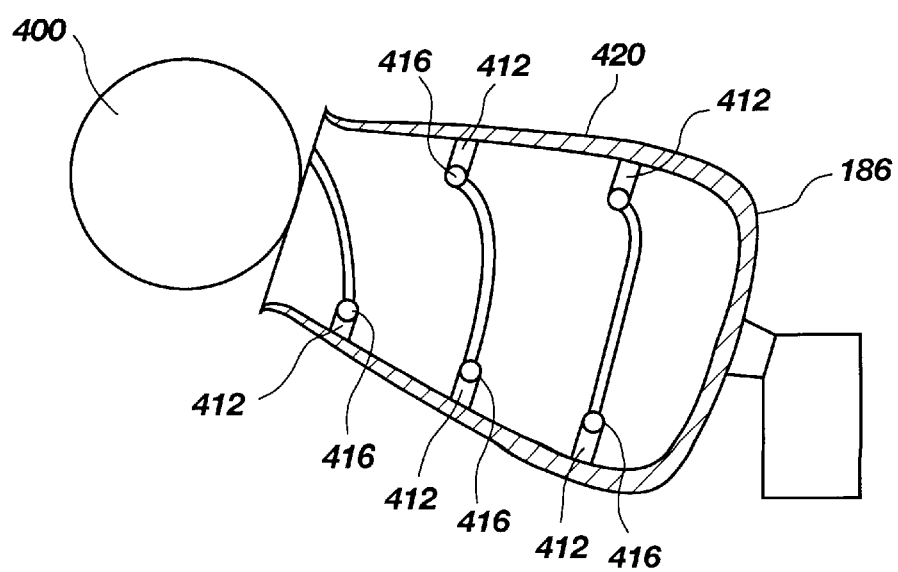
FIG. 14 shows a cross-sectional view of the infuser.

Turning now to FIG. 14, there is shown a cross-sectional view of an infuser 186 made by Challenge-RMF, Inc. The device includes flights 412 that provide a helical pattern within the infuser. The flights 412 help to keep the contents of the infuser from matting or clumping and can be used to remove the cheese curd from the infuser when finished. The flights preferably have channels 316 formed therein which allow solution to be passed therethrough to either heat or cool the contents of the infuser 186 in the manner discussed in the examples. The jacket 420 of the infuser 186 can also be configured to allow heating or cooling solutions to heat or cool the contents of the infuser 186.

Turning now to FIG. 15, there is shown a side view of a double belt de-whey belt, generally indicated at 430. The double de-whey belt 430 includes a first belt 434 which receives cheese curds and whey. A second belt 438 is disposed above the first belt 434 and is configures to squeeze whey from the curds. By changing the position of the second belt 438 with respect to the first belt 434, the user is able to control expulsion of the whey from the curds.

The various aspects of the present invention provide a number of significant improvements to the art of cheese making. The increase in yield alone is dramatic in an industry where a few cents per pound differentiate industry leaders and those who are unable to compete. However, the present invention provides multiple other advantages which may be obtained individually or in groups. The following examples are a few of the numerous advantages which may be achieved by utilization of the principles of the present invention.

EXAMPLE 1
(Enhanced Yield Mozzarella Cheese)

Eighteen thousand three hundred thirty five (18,335) pounds of standardized Jersey milk was HTST pasteurized at 163 degrees F. for 20 seconds and passed into a cheese vat. The milk had a fat content of 4.67%, a protein content of 4.99% and estimated casein content of 4.01%. The milk was fortified with MICRODAN 40 Calcium Caseinate from MD Foods of Denmark. The casein content was 88%. The caseinate was added to the milk silo the night before and allowed to fully hydrate for 8 hours or more.

The pasteurized cheese milk was filled into a standard open Damrow rectangular cheese vat at 90° F. When the vat had 2,000 pounds of cheese milk in it, Gist-brocades direct set culture M109 was inoculated into the milk. When the vat had 18,335 pounds of milk in it, the milk line was switched to another vat. Before the milk was set, the pH of the milk was lowered to 6.2 by the addition of 50% lactic acid mixed in water.

The agitators were placed on medium speed and 16 ounces of MAXI-REN (rennet coagulant product of Gist-brocades located in Deft, the Netherlands) was added to 3 gallons of water and then added slowly to the cheese vat in front of the agitators. The agitators were left running for five minutes and then the arms and blades were removed. The vat was allowed to set for 32 minutes and the curd was cut with ¼ inch knifes. The curd was allowed to heal for 5 minutes and the agitators were replaced and the cheese curd was cooked to 116° F. by raising the temperature two degrees every five minutes. The cook time was 66 minutes and then the curd and whey was pumped to finishing tables.

The whey was drained from the table and 1000 pounds of the curd was removed from the table and transferred to the infuser in a kitchen cart. The additional curd was processed in the normal manner and packed into drums. This was true for all of the additional examples. The mozzarella curd was added to the infuser while it was turning at 4 RPM. The infuser is preferably turning while the cheese is added as it will mat and clump if the infuser is stopped. The infusion process is dependent upon the surface area of the curd. If the size of the curd particle is small and the surface area is larger per pound of curd, the infusion process becomes faster and more efficient.

Prior to the addition of the curd to the infuser, 55 pounds of 88% protein Whey Protein Isolate was added to 130 pounds of water and the mixture was pasteurized and denatured by raising the temperature to 160° F. and holding for 15 minutes. The 88% protein Whey Protein Isolate is a product of Davisco Foods International of Eden Prairie, Minn. The mixture was subjected to high shear via the Scott Turbo Mixer at high speed. The RPM of the shaft was 6,000 RPM during the pasteurization and denaturization step. The denatured and pasteurized 80% Whey Protein Isolate was cooled to 110° F. The whey protein mixture was added to the infuser and the vacuum pump was energized and a vacuum of 26.5 inches was developed. The speed of the infuser was 4 RPM and the time required for the liquid Whey Protein Isolate to be infused into the curd was 25 minutes. The warm water (120 degrees F. to 130 degrees F.) was required to maintain a curd temperature of 115 degrees F., as the curd needed to continue to ripen. Thus, warm water was circulated through the jacket and flights. (discussed with respect to FIG. 14). If the warm water were not circulated through the jacket and the flights, then the curd would fail to reach the correct pH. The high vacuum evaporates water from the curd and lowers the curd temperature.

The cheese curd was allowed to ripen for an additional 23 minutes to a pH of 5.43 and then the water temperature was raised to 155° F. and circulated through the jacket and the flights. The RPM of the infuser was increased to 8.

The door was opened and 18 pounds of fine salt was added to the infuser. The door was closed and the vacuum pump was energized and a vacuum of 26 inches was developed. When the cheese curd temperature reached 128° F., the cheese began to form fibrous strands that stretched from the bottom to the top on each of the internal flights. At this point, an additional 40 pounds of hot water (140° F.) and 15 pounds of the lecithin phospholipid mixture as prepared in Example 5 was added to the infuser. The cheese then started to form a homogenous mass of kneaded and stretched "pasta filata" cheese. The RPM of the infuser was lowered to 6. The entire curd formed into a single mass of pasta filata Mozzarella at 130° F. There was distinct fibrous strands stretching from the bottom to the top of the infuser. There was no observable sticking of the cheese to the sidewalls of the infuser. This is generally a problem in pasta filata cookers in that the cheese will stick to a stainless steel surface if it is not coated with Teflon® or the like. This was not the case with this invention using the infuser to knead, fuse, and stretch the curd into a homogenous mass. The resulting fibrils were longer, firmer, and displayed more elasticity than curd stretched in the typical manner. Further, there was no fat or solids loss to the cooker. The use of this invention could mean a gain of 2% to 4% in yield.

The final mozzarella cheese had a final pH of 5.32, and a butterfat content of 20.48%, a moisture content of 50.04%, a FDB of 40.99%, a moisture on non-fat solids of 44.95%, and a salt content of 1.51%. The mozzarella cheese mass was unloaded from the infuser by reversing the motion and the flights then moved the cheese mass into kitchen carts. The Mozzarella cheese was then extruded and cooled via a brineless system described in U.S. Pat. No. 5,948,549 (U.S. patent application No. 08/919,556) and shown in FIG. 10. The cheese was packed in random bags for 90 days. Samples were taken at 5, 10, 20, 30, and 60-day intervals and analyzed for flavor, body, texture, meltability, stretch, oil formation, and apparent viscosity.

The stretch and string of the enhanced yield Mozzarella cheese at 10 days was typical of a 20-day-old Mozzarella cheese. The flavor could be compared to a typical Mozzarella cheese. The cheese grated and shredded very well for a cheese with a moisture content of over 50%. The cheese was taken to a pizzeria and melted on a 12-inch pizza. The apparent viscosity was softer than expected for a 10-day-old cheese. There was no free oil formation nor was there any sign of browning. The fibrils that stretched from the melted cheese were long and displayed distinct fibrils. The reason that the cheese aged quickly and developed the proper melt characteristics at a young age was that, it is believed, the salt penetrated the cheese immediately while the cheese curd was still hot. Thus, the ion exchange between the sodium and calcium occurred rapidly versus the cold brine salting process. The cold brine process not only serves to salt the cheese, but to cool the cheese as rapidly as possible to prevent defects. However, the cold process does not allow for the salt to penetrate the cheese and the ion exchange occurs slowly at the cold temperature.

The stretch and string of the enhanced yield Mozzarella cheese at 20 days was typical of a 30-day-old Mozzarella cheese. The flavor could be compared to a typical Mozzarella cheese. The cheese grated and shredded very well. The cheese was taken to a pizzeria and melted on a 12-inch pizza. The apparent viscosity was firm for a 20 day old cheese apparently due to the whey protein content. Whey protein binds water and the enzymes developed by the culture did not break down the whey protein in the same manner that it would a 100% casein cheese. There was no free oil formation nor was there any sign of browning. The fibrils that stretched from the melted cheese were long and displayed distinct fibrils. The mouth feel was firm and displayed the typical chew expected from a well made Mozzarella cheese.

The stretch and string of the enhanced yield Mozzarella cheese at 30 days was typical of a 30-day-old Mozzarella cheese. The flavor could be compared to a typical Mozzarella cheese. The cheese grated and shredded very well. The cheese was taken to a pizzeria and melted on a 12-inch pizza. The apparent viscosity was firmer than a typical 30-day-old cheese apparently due to the whey protein content. Whey protein binds water and the enzymes developed by the culture did not break down the whey protein in the same manner that it would a 100% casein cheese. There was no free oil formation nor was there any sign of browning. The fibrils that stretched from the melted cheese were long and displayed distinct fibrils. The mouth feel was firm and displayed the typical chew expected from a well made Mozzarella cheese.

The stretch and string of the enhanced yield Mozzarella cheese at 60 days became brittle and tough. The flavor could be compared to a typical Mozzarella cheese. The cheese grated and shredded on the crumbly side. The cheese was taken to a pizzeria and melted on a 12-inch pizza. The apparent viscosity was very firm for a 60-day-old cheese apparently due to the whey protein content. Whey protein binds water and the enzymes developed by the culture did not break down the whey protein in the same manner that it would a 100% casein cheese. There was no free oil formation nor was there any sign of browning. The fibrils that stretched from the melted cheese were short and broke easily. The mouth feel was too firm and displayed the tough chew expected that was not expected from a 60-day-old cheese. The defects at 60 days can be corrected by adding an enzyme to break down the whey protein or denature the whey protein in a different manner. However, most Mozzarella is sold and used by 60 days.

The advantages of this new system for making Mozzarella cheese is that the yield is increased by the addition of whey protein concentrate. The Whey Protein Isolate was added back to the cheese at the same rate of recovery from the whey. Under normal circumstances, 80% whey protein is recovered at the rate of 0.6% whey protein from high protein whey. The whey protein firmed the cheese so that the cheese resembled a cheese with moisture content of 47% to 48%. The yield was increased by 18.50% over a normal cheese made with the same fat and protein content in the milk. Part of this increase in yield was due to the whey protein infusion, part due to the additional moisture, and part was due to the lack of loss since the cooker water was eliminated, and part was due to the lack of brine process.

The infuser is equipped with load cells and if the moisture of the cheese is rapidly determined via CEM microwave or another rapid method, the moisture can be added back to the cheese mass to maximize yield. Most of the cheese standards have the maximum moisture content specified. If the cheese maker exceeds the maximum amount, the cheese is out of standard and results in a loss. Using the infuser to standardize moisture to the maximum allowable limit, the cheese manufacture can maximize his profit.

EXAMPLE 2
(Enhanced Yield Modified Pizza cheese)

Eighteen thousand three hundred thirty five (18,335) pounds of standardized Jersey milk was HTST pasteurized at 163° F. for 20 seconds and released into a cheese vat. The milk had a fat content of 4.67%, a protein content of 4.99% and estimated casein content of 4.01%. The milk was fortified with MICRODAN 40 Calcium Caseinate from MD Foods of Denmark. The casein content was 88%. The caseinate was added to the milk silo the night before and allowed to fully hydrate for 8 hours or more.

The pasteurized cheese milk was filled into a standard open Damrow rectangular cheese vat at 90° F. When the vat had 2,000 pounds of cheese milk in it, Gist-brocades direct set culture M109 was inoculated into the milk. When the vat had 18,335 pounds of milk in it, the milk line was switched to another vat. The agitators were placed on medium speed and 16 ounces of MAXI-REN® (rennet coagulant, Gist-brocades, Deft, the Netherlands) was added to 3 gallons of water and then added slowly to the cheese vat in front of the agitators. The agitators were left running for five minutes and then the arms and blades were removed. The vat was allowed to set for 28 minutes and the curd was cut with ¼ inch knifes. The curd was allowed to heal for 5 minutes and the agitators were replaced and the cheese curd was cooked to 116° F. by raising the temperature two degrees every five minutes. The cook time was 68 minutes and then the curd and whey was pumped to finishing tables. The whey was drained from the table and 1000 pounds of curd was removed from the table and transferred to the infuser in a kitchen cart.

The Pizza Curd was added to the infuser while it was turning at 4 RPM. It is preferred for the infuser to be turning while the cheese is added as it will mat and clump if the infuser is stopped. The efficiency of the infuser is dependent upon having a large amount of curd surface area so that the desired infusion material or ingredient can penetrate the surface of the curd. The infusion process is dependent upon the surface area of the curd. If the size of the curd particle is small and the surface area is larger per pound of curd, the infusion process becomes faster and more efficient.

Prior to the addition of the curd to the infuser, 55 pounds of 80% protein Whey Protein Isolate was added to 105 pounds of water and the mixture was pasteurized and denatured by raising the temperature to 160° F. and holding for 15 minutes. The 88% protein Whey Protein Isolate is a product of Davisco Foods International of Eden Prairie, Minn. The mixture was subjected to high shear via the Scott Turbo Mixer at high speed. The RPM of the shaft was 6,000 RPM during the pasteurization and denaturization step. The denatured and pasteurized 88% Whey Protein Isolate was cooled to 110 degrees F. The whey protein mixture was added to the infuser and the vacuum pump was energized and a vacuum of 26.5 inches was developed. The speed of the infuser was 4 RPM and the time required for the liquid Whey Protein Isolate to be infused into the curd was 21 minutes. The warm water (120° F. to 130° F.) was required to maintain a curd temperature of 115° F., as the curd needed to continue to ripen. If the warm water were not circulated through the jacket and the flights, then the curd would fail to reach the correct pH. The high vacuum evaporates water from the curd and lowers the curd temperature.

When it was determined that the Whey Protein Isolate mixture had been completely absorbed by the curd and the curd was reasonably dry, 10 pounds of OptaGrade® modified starch texturizer was pulled into the infuser by a vacuum via a wand. The infuser continued to rotate at 5 RPM with 26.5 inches of vacuum and the warm water circulating through the jacket and flights. The infusion process continued for 8 minutes until it was determined that the Pizza cheese curd absorbed the OptaGrade®. OptaGrade® is a modified starch texturizer produced by Opta Food Ingredients, Inc. of Bedford, Mass.

The infuser was opened and 4 pounds of KSAL (Sodium Aluminum Phosphate) acid form and 2 pounds of Sodium Citrate were added after they had been dissolved in 15 pounds of water. The door was closed and a vacuum of 26.5 inches was developed for 5 minutes until the curd had absorbed all of the KSAL. This form of KSAL was used, as it appears to enhance the stretch whereas other Sodium Phosphates replace the calcium ion, but they do not enhance the stretch of the Pizza cheese as well as KSAL.

The cheese curd was allowed to ripen for an additional 15 minutes to a pH of 5.38 and then the water temperature was raised to 155 degrees F. and circulated through the jacket and the flights. The RPM of the infuser was increased to 8.

The door was opened and 19 pounds of fine salt was added to the infuser. The door was closed and the vacuum pump was energized and a vacuum of 27 inches was developed. When the cheese curd temperature reached 128 degrees F., the cheese began to form fibrous strands that stretched from the bottom to the top on each on the internal flights. At this point, an additional 35 pounds of hot water (140 degrees F.) and 15 pounds of the lecithin phospholipid mixture as prepared in Example 5 was added to the infuser. The cheese then started to form a homogenous mass of kneaded and stretched "pasta filata" cheese. The RPM of the infuser was lowered to 6. The entire curd formed into a single mass of pasta filata Pizza at 128 degrees F. There was distinct fibrous strands stretching from the bottom to the top of the infuser. There was no observable sticking of the cheese to the sidewalls of the infuser. This is generally a problem in pasta filata cookers in that the cheese will stick to a stainless steel surface if it is not coated with Teflon® or the like. This was not the case with this invention using the infuser to knead, fuse, and stretch the curd into a homogenous mass. The resulting fibrils were longer, firmer, and displayed more elasticity than curd stretched in the typical manner. Further, there was no fat or solids loss to the cooker. The use of this invention could mean a gain of 2% to 4% in yield by not having to cook the cheese in a "pasta filata cooker". The final Pizza cheese had a final pH of 5.32, and a butterfat content of 20.07%, a moisture content of 49.81%, a FDB of 39.97%, a moisture on non-fat solids of 43.81%, and a salt content of 1.48%.

The Pizza cheese mass was unloaded from the infuser by reversing the motion and the flights then moved the cheese mass into kitchen carts. The Pizza cheese was then extruded and cooled via a brineless system described in U.S. Pat. No. 5,948,549 (U.S. patent application Ser. No. 08/919,556). The cheese was packed in random bags for 90 day. Samples were taken at 5, 10, 20, 30, and 60-day intervals and analyzed for flavor, body, texture, meltability, stretch, oil formation, and apparent viscosity.

The stretch and string of the enhanced yield Pizza cheese at 5 days was typical of a 15-day-old Pizza cheese. The flavor could be compared to a typical Pizza cheese. The cheese grated and shredded very well for a cheese with a moisture content of over 50%. The cheese was taken to a pizzeria and melted on a 12-inch pizza. The apparent viscosity was softer than expected for a 5-day-old cheese. There was no free oil formation nor was there any sign of browning. The fibrils that stretched from the melted cheese were long and displayed distinct fibrils. The reason that the cheese aged quickly and developed the proper melt characteristics at a young age was that, it is believed, the salt, the sodium citrate, and the KSAL penetrated the cheese immediately while the cheese curd was still hot. Thus, the ion exchange between the sodium and calcium occurred rapidly versus the cold brine salting process. The sodium citrate and the KSAL also have an effect upon the protein so that it performs very well with respect to the proper breakdown so that the meltability of cheese requires very little time to cure.

The cold brine process not only functions to salt the cheese, but to cool the cheese as rapidly as possible to prevent defects. However, the cold process does not allow for the salt to penetrate the cheese and the ion exchange occurs slowly at the cold temperature. The addition of citrate and phosphate salts while the cheese is still warm and infusing the salts throughout the cheese enables the ion exchange to occur rapidly. The proteolysis also occurs rapidly without having the cheese go through the aging process.

The stretch and string of the enhanced yield Pizza cheese at 10 days was typical of a 20-day-old Pizza cheese. The flavor could be compared to a typical Pizza cheese. The cheese grated and shredded very well. The cheese was taken to a pizzeria and melted on a 12-inch pizza. The apparent viscosity was firm for a 20 day old cheese apparently due to the whey protein content. Whey protein binds water and the enzymes developed by the culture did not break down the whey protein in the same manner that it would a 100% casein cheese. There was no free oil formation nor was there any sign of browning. The fibrils that stretched from the melted cheese were long and displayed distinct fibrils. The mouth feel was firm and displayed the typical chew expected from a well-made Pizza cheese.

The stretch and string of the enhanced yield Pizza cheese at 20 days was typical of a 30-day-old Pizza cheese. The flavor could be compared to a typical Pizza cheese. The cheese grated and shredded very well. The cheese was taken to a pizzeria and melted on a 12-inch pizza. The apparent viscosity was firm, yet the eat was very tender. The cheese did not display the toughness that was displayed in Example 8 and it appears that the citrate and the phosphate salts had an excellent effect upon the whey protein. There was no free oil formation nor was there any sign of browning. The fibrils that stretched from the melted cheese were long and displayed distinct fibrils. The mouth feel was firm and displayed the typical chew expected from a well-made Pizza cheese or any other pasta filata cheese.

The stretch and string of the enhanced yield Pizza cheese at 30 days was excellent. The flavor could be compared to a typical Pizza cheese. The cheese grated and shredded very well. The cheese was taken to a pizzeria and melted on a 12-inch pizza. The apparent viscosity was soft and displayed a pleasant mouth feel. There was no free oil formation nor was there any sign of browning. The fibrils that stretched from the melted cheese were long and tender.

The performance of the Pizza cheese at 40 and 60 days was excellent in all aspects. The string and stretch was long and tender and the eat was very firm, yet tender. The meltability was excellent in that the cheese knitted together and formed a homogenous layer of cheese that stood up to the high heat of the impeachment oven. The phosphate and citrate salts were a definite improvement in altering the cooking properties of the added whey protein.

The advantages of this new system for making Pizza cheese is that the yield is increased by the addition of whey protein concentrate. The Whey Protein Isolate was added back to the cheese at the same rate of recovery from the whey. Under normal circumstances, 88% whey protein is recovered at the rate of 0.6% whey protein from high protein whey. The whey protein firmed the cheese so that the cheese resembled a cheese with moisture content of 47% to 48%. The yield was increased by 22% over a normal cheese made with the same fat and protein content in the milk. Part of this increase in yield was due to the whey protein infusion, part due to the additional moisture, and part was due to the lack of loss since the cooker water was eliminated, and part was due to the lack of brine process.

EXAMPLE 3
(Enhanced Yield Long Shelf Life Fresh Cheese)

Twenty five thousand pounds (25,000) of standardized milk was HTST pasteurized at 163 degrees F. for 20 seconds and passed into a cheese vat with a fat content of 3.45%, a protein content of 3.12% and an estimated casein content of 2.34%. The pasteurized cheese milk was filled into a standard open Damrow rectangular cheese vat at 90 degrees F. When the vat had 4,000 pounds of cheese milk in it, Chr. Hansen direct set culture F123 was inoculated into the milk. In the case of fresh cheese, only a small amount of probotic culture is used since the pH of the cheese needs to remain above 6.0. The cheese would lose the performance characteristics if the pH of the cheese was allowed to lower to the range of normal varieties of cheese. Hence, the term fresh cheese which has a very short shelf life relative to other cheeses.

When the vat had 25,000 pounds of milk in it, the milk line was switched to another vat. The agitators were placed on medium speed and 26 ounces of Chymax® (rennet coagulant) was added to 3 gallons of water and then added slowly to the cheese vat in front of the agitators. Chymax® is a product of Chr. Hansen of Milwaukee, Wis. The agitators were left running for five minutes and then the arms and blades were removed. The vat was allowed to set for 28 minutes and the curd was cut with ¼ inch knifes. The curd was allowed to heal for 5 minutes and the agitators were replaced and the cheese curd was cooked to 108 degrees F. by raising the temperature two degrees every five minutes. The cook time was 42 minutes and then the curd and whey was pumped to finishing tables. The whey was drained from the table and curd was removed from the table. The cheese curd was pressed to knit the curd particles and remove moisture. The cheese then was diced in a Fitz® mill to reduce the size to approximately ½ inch by ½ inch by ½ inch long. While the cheese was being diced, it was immediately transferred to the infuser while it turned at 4 RPM. The weight of the curd transferred to the infuser was 225 pounds. The beginning moisture was 51.5% and the moisture after pressing was 48%.

The infuser is preferably turning while the diced cheese curd is added as the cheese curd will mat and clump if the infuser is stopped. The efficiency of the infuser is dependent upon having a large amount of cheese curd surface area so that the desired infusion material or ingredient can penetrate the surface of the curd. In this case, the most optimum size cheese curd particle was developed. In commercial practice, the curd would be pressed in a double belt de-whey belt, such as that shown in FIG. 15. The pressed curd would then be diced in a mill and added immediately to the infuser. The infusion process is dependent upon the surface area of the curd. If the size of the curd particle is small and the surface area is larger per pound of curd, the infusion process becomes faster and more efficient.

The infuser used in this example was a new model designed for smaller trial batches. The batch weight can vary from 150 pounds to 450 pounds. This infuser, shown in FIG. 13, is equipped with an additional door that has a snow horn so that carbon dioxide can be added to the product and reduce the temperature instantly. This door can also be equipped with a liquid nitrogen nozzle that will serve the same purpose.

Prior to the addition of the curd to the infuser, 1 pound of Microguard® 300 and 1 pound of Microguard® 100 were added to 6 pounds of water and the mixture was subjected to high shear via the Scott Turbo Mixer at high speed. The RPM of the shaft was 6,000 RPM and the temperature was raised to 160 degrees F. The mixture was then cooled to 100 degrees F. The final weight was 8 pounds.

The composition of the cheese before the moisture was pressed out was 24.34% butterfat, 17.97% protein, moisture of 52.61%, and an FDB of 51.36%. After the moisture was pressed out of the cheese, the composition was 26.75%, butterfat, 19.76% protein, 47.91% moisture, and a FDB of 51.36%.

Prior to the addition of the curd to the infuser, 13 pounds of 88% protein Whey Protein Concentrate was added to 30 pounds of water and the mixture was pasteurized and denatured by raising the temperature to 160 degrees F. and holding for 15 minutes. The 80% protein SDP 80 Whey Protein Concentrate is a product of Simplot Dairy Products of Lacey, WA. The mixture was subjected to high shear via the Scott Turbo Mixer at high speed. The RPM of the shaft was 6,000 RPM during the pasteurization and denaturization step. The denatured and pasteurized 88% Whey Protein Concentrate was cooled to 110 degrees F. The Whey Protein Concentrate mixture and the Microguard® mixture was added to the infuser and the vacuum pump was energized and a vacuum of 25 Thor was developed. The speed of the infuser was 4 RPM and the time required for the liquid Whey Protein Concentrate to be infused into the curd was 8 minutes. The warm water (110 degrees F. to 120 degrees F.) was required to maintain a curd temperature of 110 degrees F. If the warm water was not circulated through the jacket, the efficiency of the infusion process would decline. The high vacuum evaporates water from the curd and lowers the curd temperature.

Using the wand, 15.5 pounds of 38% butterfat pasteurized whey cream containing 42% total solids was mixed with 6.4 pounds of salt and 6 pounds of pasteurized water added to the infuser. The infuser continued to rotate at 4 RPM with a vacuum of 23 Thor and the warm water circulating through the jacket and flights (explained with respect to FIG. 14). The infusion process continued for 9 minutes until it was determined that the diced fresh cheese curd had absorbed the pasteurized whey cream and salt mixture.

A glycol solution at a temperature of 28 degrees F. was circulated through the jacket. The vacuum door was swung aside and the Carbon Dioxide Horn Door was put into place. The carbon dioxide was activated and the temperature of the diced curd particles was lowered to 40 degrees F. The removal of air containing oxygen and the introduction of carbon dioxide into the water phase of the cheese curd will prevent most of the spoilage microorganisms from growing. This is particularly true of the psychrophilic (cold loving) microorganisms that are primarily responsible for the spoilage of dairy products.

The diced fresh cheese particles were unloaded from the infuser by reversing the motion and then the flights moved the cheese particles into kitchen carts. The diced fresh cheese particles were ground and then formed into 12 ounce and 32 ounce portions. The fresh cheese portions were vacuum packed and analyzed for flavor, body, texture, whey off, cooking, and microbial counts. The trial batch was tested against the batch from which it was withdrawn and the next batch thereafter.

One set of samples was stored at 38 degrees F. and another set of samples was stored at 45 degrees F. The samples identified as A was the trial batch, B was the batch from which it was withdrawn, and C was the following batch. The results are summarized in Table 1.

At five days, the fresh cheese was analyzed for flavor that was very close to the other two batches. There was no whey off observable from the cheese. The body and texture was firmer with the trial batch and this can be explained by the addition of the Whey Protein Concentrate. Denatured Whey Protein Concentrate can bind up to 3 times its weight of water. Thus, the fresh cheese can tolerate a higher level of moisture without wheying off. This means an increase in yield and a corresponding increase in profit.

test showed less than 10 for all samples except the following batch stored at 45 degrees that had a count of less 100. The SPC Most Probable Number began to increase particularly at the higher stress temperature of 45 degrees F. Typically, the psychrophilic counts lag behind the SPC due to the nature and growth patterns of these microorganisms.

TABLE 1

| SAMPLE | FLAVOR | WHEY | COOK | COLI | SPC/MPN | CVC |
| --- | --- | --- | --- | --- | --- | --- |
| 5 Day A38 | Good | None | None | >10 | 6,000 | >10 |
| 5 Day B38 | Good | None | Free | >10 | 10,000 | >10 |
| 5 Day C38 | Good | None | Free | >10 | 12,000 | >10 |
| 5 Day A45 | Good | None | None | >10 | NA | >10 |
| 5 Day B45 | Good | None | Free | >10 | NA | >10 |
| 5 Day C45 | Good | None | Free | >10 | NA | >10 |
| 15 Day A38 | Good | None | None | >10 | 5,000 | >10 |
| 15 Day B38 | Good | None | Free | >10 | 15,000 | >10 |
| 15 Day C38 | Good | None | Free | >10 | 16,000 | >100 |
| 15 Day A45 | Good | None | None | >10 | 7,000 | >10 |
| 15 Day B45 | Good | None | Free | >10 | 20,000 | >10 |
| 15 Day C45 | Good | None | Free | >100 | 25,000 | >1,000 |
| 30 Day A38 | Good | None | None | >10 | 5,000 | >10 |
| 30 Day B38 | Good | None | Free | >10 | 15,000 | >10 |
| 30 Day C38 | Good | None | Free | >10 | 20,000 | >1,000 |
| 30 Day A45 | Good | None | None | >10 | 5,000 | >10 |
| 30 Day B45 | Good | Free | Free | >10 | 22,000 | >100 |
| 30 Day C45 | Stale | Free | Free | >1000 | 45,000 | >5,000 |
| 45 Day A38 | Good | None | None | >10 | 5,000 | >10 |
| 45 Day B38 | Good | Free | Free | >10 | 20,000 | >1,000 |
| 45 Day C38 | Stale | Free | Free | >10 | 30,000 | >5,000 |
| 45 Day A45 | Good | None | None | >10 | 6,000 | >10 |
| 45 Day B45 | Good | Free | Free | >10 | 25,000 | >10,000 |
| 45 Day C45 | BAD | Free | Free | >1,000 | 55,000 | >15,000 |
| 60 Day A38 | Good | Free | None | >10 | 5,000 | >10 |
| 60 Day B38 | Good | None | Free | >10 | 20,000 | >2,000 |
| 60 Day C38 | Stale | Free | Free | >10 | 40,000 | >20,000 |
| 60 Day A45 | Good | None | None | >10 | 6,000 | >10 |
| 60 Day B45 | Good | Free | Free | >10 | 45,000 | >15,000 |
| 60 Day C45 | BAD | Free | Free | >5,000 | TNTC | >40,000 |
| 90 Day A38 | Good | None | None | >10 | 5,000 | >100 |
| 90 Day B38 | Good | Free | Free | >10 | 25,000 | >10,000 |
| 90 Day C38 | BAD | Free | Free | >10 | 100,000 | >20,000 |
| 90 Day A45 | Stale | None | None | >10 | 12,000 | >1,000 |
| 90 Day B45 | BAD | Free | Free | NA | >5,000 | >40,000 |
| 90 Day C45 | BAD | Free | Free | NA | TNTC | TNTC |

The fresh cheese was molded into a 1-inch diameter tortilla and heated in a microwave to 140 degrees F. The fresh cheese from the original batch and the following batch both wheyed off whereas the fresh cheese with the Whey Protein Concentrate did not. The coli counts were negative on all three sample batches of fresh cheese. The CVC tests were less than 10 on all samples of cheese. The Crystal Violet Agar is a test for psychrophilic microorganisms that are the primary cause of spoilage in fresh dairy products. The Standard Plate Counts were 10,000 for the original batch, 12,000 for the following batch, and 6,000 for the trial batch.

After fifteen days, the three sets of samples were analyzed again. There was no apparent free whey from any of the samples. The flavor of all of the samples was very close. The cooking test showed the same results as the last test in that there was free whey from the fresh cheese samples that did not contain the Whey Protein Concentrate. The body and texture of the fresh cheese with the Whey Protein Concentrate had a firmer body and heavier texture. The coli test on the following batch stored at 45 degrees F. had less than 100. This can be explained as injured coli in the microorganisms will revive after pasteurization. The trial batch and the batch from which it was taken were both less than 10. The CVC At 30 days, the samples without the Whey Protein Concentrate stored at 45_F. began to show free whey in the packages. This is a common defect in high pH cheeses and apparently the Whey Protein Concentrate binds the moisture in the cheese so that it will not release from the curd. In a high pH cheese without proteolytic enzymes to breakdown the protein matrix, the coagulating enzyme will continue to cause the expulsion of whey. The following cheese batch stored at 45_F began to display off flavors due to the high microbial counts. There was also a slight odor in these samples. The SPC and CVC counts continued to climb in both of the sample batches that did not contain the Microguard. The performance characteristics of the sample with the Whey Protein Concentrate continued to excel in the whey off characteristics during cooking.

At 45 days, the microbial count numbers of the unprotected samples began to climb. This is the usual critical point in the growth pattern of psychrophilic microbes in extended life dairy products. The amount of free whey in the samples that did not contain the Whey Protein Concentrate continued to increase both in number and amount. The performance during the cook test showed that the samples that did not contain the Whey Protein Concentrate had more free whey and a curd-like texture upon heating.

The 60-day analysis showed that the samples that were stored at 38_F. began to show off flavors and high microbial counts and the samples stored at 45 F. could be described as unsaleable. Thus, the protection afforded by Microguard justifies its use. The microbial counts of the protected samples did not increase at the same rate as the unprotected samples. The free whey in the samples that did not contain the Whey Protein Concentrate increased both in number and amount. The cook test with the samples that contained the Whey Protein Concentrate was greatly improved versus the samples that did not contain WPC. Thus, denatured Whey Protein Concentrate not only increases the yield of the fresh cheese, but it enhances the critical performance characteristics.

The 90-day results showed that the Microguard protected samples far exceeded shelf life of the unprotected samples. The combination of removing the oxygen from the cheese during the vacuum infusion process and then placing carbon dioxide into the water phase of the cheese certainly reduced the potential for microbial growth. The Microguard added further protection as it is the metabolic product of probotic microorganisms. The free whey in the samples that did not contain Whey Protein Concentrate continued to increase in number and amount. The cook test definitely showed a difference in results that could also be due to the enzymes that are produced by the contaminating microorganisms.

The advantages of this new system for fresh enhanced yield cheese are that the cheese has longer shelf life and perhaps protection from the growth of pathogenic microorganisms. The instant cooling effect of the carbon dioxide coupled with the lack of oxygen provides an environment that is not conducive to the growth of psychrophilic spoilage microorganisms. The initial microbial count is reduced and most of the psychrophilic microorganisms require oxygen to grow and multiply. Thus, oxygen deprived environment in combination with the antagonistic Microguard® prevents the growth of microorganisms.

The final fresh Hispanic cheese had a final pH of 6.21, and a butterfat content of 21.64%, a moisture content of 52.35%, a FDB of 45.42%, a moisture on non-fat solids of 44.23%, and a salt content of 2.11%. The addition of the Whey Protein Concentrate not only increased the yield by 18.5%, but it increased the critical performance characteristics of the cheese. Most fresh cheese is used as an ingredient in cooking and the addition of heat to cheese that still has active rennet will cause the expulsion of whey as it does during the cooking process in normal cheese making. This is particularly true when the pH of the cheese is above 6.0. The shelf life of the cheese was improved, as there was not any significant free whey in the packages that contained the Whey Protein Concentrate. This improvement would significantly reduce the return rate of the cheese particularly during the warm months of the year. Thus, the improvements caused by addition of Whey Protein Concentrate to fresh cheese are three fold. First, it improves the yield by returning all of the recovered WPC back into the cheese. Second, it prevents the expulsion of whey during the cooking of the food in which the cheese is an ingredient. Third it prevents the free whey formation in the package on the shelf.

The whey cream that was recovered from the whey was also returned to the cheese after it was pasteurized. Since whey cream amounts to approximately 10% of the fat content in the cheese milk, this additional recovery of whey cream will increase the yield of the cheese by 4% to 6% depending upon the recovery rate and the moisture content of the cheese.

EXAMPLE 4
(Flavored String Cheese)

Twenty five thousand pounds (25,000) of standardized milk was HTST pasteurized at 163 F. for 20 seconds and released into a cheese vat. The milk had a fat content of 3.41%, a protein content of 3.23% and estimated casein content of 2.42%. The past eurized cheese milk was filled into a standard open Damrow rectangular cheese vat at 90 F. When the vat had 4,000 pounds of cheese milk in it, Chr. Hansen direct set culture CH234 was inoculated into the milk.

When the vat had 25,000 pounds of milk in it, the milk line was switched to another vat. The agitators were placed on medium speed and 26 ounces of Chymax® (rennet coagulant) was added to 3 gallons of water and then added slowly to the cheese vat in front of the agitators. Chymax® is a product of Chr. Hansen of Milwaukee, Wis. The agitators were left running for five minutes and then the arms and blades were removed. The vat was allowed to set for 28 minutes and the curd was cut with ¼ inch knifes. The curd was allowed to heal for 5 minutes and the agitators were replaced and the cheese curd was cooked to 112 F. by raising the temperature two degrees every five minutes. The cook time was 48 minutes and then the curd and whey was pumped to finishing tables. The whey was drained from the table and curd was removed from the table. The cheese curd was pressed to knit the curd particles and remove moisture. The cheese then was diced in a Fitz® mill to reduce the size to approximately ¼ inch by ¼ inch by ¼ inch long. While the cheese w as being diced, it was immediately transferred to the infuser while it turned at 4 RPM. The weight of the curd transferred to the infuser was 300 pounds.

The infuser must be turning while the diced cheese curd is added as it will mat and clump if the infuser is stopped. The efficiency of the infuser is dependent upon having a large amount of cheese curd surface area so that the desired infusion material or ingredient can penetrate the surface of the curd. In this case, the most optimum size cheese curd particle was developed. In commercial practice, the curd would be pressed in a double dewhey belt shown in FIG. 15. The pressed curd would then be diced in a mill and added immediately to the infuser. The infusion process is dependent upon the surface area of the curd. If the size of the curd particle is small and the surface area is larger per pound of curd, the infusion process becomes faster and more efficient.

The infuser used in this example was a new model designed for smaller trial batches. The batch weight can vary from 150 pounds to 450 pounds. This infuser is equipped with an additional door that has a snow horn so that carbon dioxide can be added to the product and reduce the temperature instantly. This door can also be equipped with a liquid nitrogen nozzle that will serve the same purpose.

Fifteen minutes before adding the enzyme to the infuser, 75 grams of a proteolytic enzyme termed AD52 that enhances the stretch and the string of Pizza cheese was added to one gallon of water and allowed to hydrate. The AD52 enzyme is available from Protein Technologies of St. Louis, Mo. The enzyme solution was added to the Whey Protein Concentrate solution and added to the Infuser in the following step.

When it was determined that the AD52-water mixture had been completely absorbed by the curd and the curd was reasonably dry, 1 pound of OptaGrade® modified starch texturizer was pulled into the infuser by a vacuum via a wand. The infuser continued to rotate at 5 RPM with a vacuum of 23 Thor and the warm water circulating through the jacket and flights. The infusion process continued for 6 minutes until it was determined that the diced Pizza cheese curd had absorbed the OptaGrade®. OptaGrade® is a modified starch texturizer produced by Opta Food Ingredients, Inc. of Bedford, Mass.

The infuser was opened and 1.0 pound of KSAL (Sodium Aluminum Phosphate) acid form and 0.6 pounds of Sodium Citrate were added after they had been dissolved in 8 pounds of water. The door was closed and a vacuum of 23 Thor was developed for 5 minutes until the curd had absorbed all of the KSAL. The acid form of KSAL was used, as it appears to enhance the stretch whereas other Sodium Phosphates replace the calcium ion, but they do not enhance the stretch of the Pizza cheese as well as KSAL.

At this point, 5 pounds of the lecithin phospholipid mixture at a temperature of 98F, as prepared in Example 5 was added to the infuser. Prior to the addition to the infuser, 11 pounds of Strawberry Drum dried Strawberry solids (Quest S140) was mixed with 14 pounds of water, 3.5 pounds of Strawberry Flavor (Quest 7p17956 Strawberry WONF), and 19.5 pounds of 55% High Fructose Corn Syrup (ADM HFCS 77). The mixture was mixed with the Scot Turbo Mixer at 3000 RPM until it was determined that a uniform mix was obtained. A vacuum of 23 Thor was developed and the diced cheese particles had absorbed the liquid in 28 minutes.

The cheese curd was allowed to ripen for an additional 11 minutes to a pH of 5.41 and then the water temperature was raised to 155F and circulated through the jacket and the flights. The RPM of the infuser was increased to 8. The cheese particles formed a uniform mass that stretched and formed long fibrils. The Mozzarella cheese mass was unloaded from the infuser by reversing the motion and the flights then moved the cheese mass into kitchen carts. The Mozzarella cheese was then extruded and cooled via a brineless system described in U.S. Pat. No. 5,948,549 (U.S. patent application Ser. No. 08/919,556) and shown in FIG. 10.

The final Mozzarella cheese had a final pH of 5.23, and a butterfat content of 21.53%, a moisture content of 48.14%, a FDB of 41.51%, and moisture on non-fat solids of 48.32%.

Samples were taken at 10, 20, 30, and 60-day intervals and analyzed for flavor, body, texture, string, and stretch. At 10 days, the Strawberry Natural Flavored String Cheese was analyzed for flavor, body, texture, and string. The cheese displayed an excellent Strawberry Flavor character with fresh notes of the berry. The string was excellent and displayed long fibrils that did not break when pulled. The chew was soft and the texture was very smooth with no grainy particles.

The Strawberry string cheese at 20 day s h ad better string than displayed at 10 days and the strawberry flavor was more pronounced. The body and texture were excellent as displayed at ten days.

The Strawberry string cheese at 60 days still had string character, although not as good as at 30 days. The body was beginning to become soft, although the chew was still very good and did not display a gummy or sticky texture in the mouth.

String cheese or stick mozzarella is very popular with small children. Hence, the desire to flavor the cheese with fruit to make it more appealing to children. Cheese is high in protein and calcium that children need for growth and health.

Thus, this invention has a new use in developing cheese varieties that cannot be made by any other known means. Numerous different flavors can be provided to cheese so as to make cheese competitive with candy and other sweets as snacks for children. As illustrations, the following examples are presented, but provide no limitation as to the variety of flavors which can be achieved.

Cheddar String Cheese

| Ingredient | Weight | Percent |
| --- | --- | --- |
| Cheese Curd | 300.0 | 89.59% |
| KSAL | 1.0 | 0.30% |
| Sodium Citrate | 0.6 | 0.18% |
| Cheddar EMC | 10.0 | 2.99% |
| Annatto Color | 1.0 | 0.30% |
| Liposome | 5.0 | 1.49% |
| Opta | 1.0 | 0.30% |
| Water | 16.0 | 4.78% |
| AD52 | 0.25 | 0.07% |

The cheddar string cheese follows the above Strawberry string cheese procedure as outlined above and as one skilled in the art would presume.

Jalapeno Pepper String Cheese

| Ingredient | Weight | Percent |
| --- | --- | --- |
| Cheese Curd | 300 | 89.59% |
| KSAL | 1.0 | 0.30% |
| Sodium Citrate | 0.6 | 0.18% |
| Red Jalapeno Peppers | 6.0 | 1.74% |
| Green Chile Peppers | 10.0 | 2.90% |
| Liposome | 5.0 | 1.49% |
| Opta | 1.0 | 0.30% |
| Water | 16.0 | 4.78% |
| AD52 | 0.25 | 0.07% |

Pineapple String Cheese

| Ingredient | Weight | Percent |
| --- | --- | --- |
| Cheese Curd | 300 | 86.18% |
| KSAL | 1.0 | 0.29% |
| Sodium Citrate | 0.6 | 0.17% |
| Pineapple Juice Conc. | 10.0 | 5.75% |
| Pineapple Flavor | 4.0 | 1.15% |
| Turmeric Color | 0.25 | 0.07% |
| Liposome | 5.0 | 1.44% |
| Opta | 1.0 | 0.29% |
| Water | 16.0 | 4.60% |
| AD52 | 0.25 | 0.07% |

As was mentioned above, it is important to understand that the flavorings provided as examples are not limiting. Cheese could be imparted with flavorings such as chocolate, vanilla, pepperoni, or other desirable flavors.

EXAMPLE 5
(Fat Free Instant Aged Cheddar Cheese)

Nine thousand (9,000) pounds of non fat milk was HTST pasteurized at 163 degrees F. for 20 seconds and transferred into a cheese vat. The milk had fat content of 0.12% and a protein content of 6.61% and estimated casein content of 5.6%. The milk was fortified with Calcium Caseinate from MD Foods of Denmark. The brand name was Microdan 40 and the casein content was 88%. The caseinate was added to the milk silo the night before and allowed to fully hydrate for 8 hours or more.

The pasteurized cheese milk was filled into a standard open Damrow rectangular cheese vat at 87 degrees F. When the vat had 2,000 pounds of cheese milk in it, Gist-brocades direct set culture CH109 was inoculated into the milk.

Additionally, 10 ounces of Gist-brocades Calcium Chloride was added to the vat dispersed in 2 gallons of water.

When the vat had 9,000 pounds of milk in it, the milk line was switched to another vat. The agitators were placed on medium speed and 8.5 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 32 minutes and the curd was cut with ¼ inch knifes. The curd was allowed to heal for 5 minutes and the agitators were replaced and the cheese curd was cooked to 104 degrees F. by raising the temperature two degrees every five minutes. The cook time was 52 minutes and then the curd and whey was pumped to finishing tables. The whey was drained from the table and 950 pounds of curd was removed from the table and transferred to the infuser in a kitchen cart.

The Cheddar Curd was added to the infuser while it was turning at 4 RPM. The infuser should be turning while the cheese is added as it will mat and clump if the infuser is stopped. The efficiency of the infuser is dependent upon having a large amount of curd surface area so that the desired enhancing agent can penetrate the surface of the curd. The greater the surface area, the faster and more efficient the infusion process becomes.

The first step of the infusion process was the addition of proteolytic enzymes to the cheese curd. The addition of these enzymes will round the flavor profile of the cheese. Typically, Cheddar cheese requires 6 to 8 months to fully develop the characteristic flavor. In this case, 150 grams of a proteolytic enzyme composition AD86 were mixed with 1.25-gallon water. AD86 enzymes are products of Imperial Biotech of London, England. The enzyme-water mixture was placed into the infuser and the door was closed. The vacuum pump was energized and a vacuum of 26 inches was developed. The curd and the mixture were subjected to the vacuum for 12 minutes while warm water was circulated in the jacket and the flights of the infuser. The warm water (110 degrees F. to 115 degrees F.) was required to maintain a curd temperature of 103 degrees F., as the curd needed to continue to ripen. If the warm water were not circulated through the jacket and the flights, then the curd would fail to reach the correct pH. The high vacuum evaporates water from the curd and lowers the curd temperature.

Prior to the addition of the curd to the infuser, a liposome was created using a special lecithin Epikuron135P that is a phospholipid compound. The liposomes were produced by adding 12 pounds of Epikuron 135P to 30 pounds of water and injecting steam while the Scott Turbo mixer was running at full speed. The final weight of the liposome mixture was 48 pounds. Epikuron is a product of Lucas Meyer of Decatur, Ill.

Prior to the addition of the curd to the infuser, 12 pounds Avicel RC591 microcrystalline cellulose and 120 pounds of Inulin IQ were mixed with 200 pounds of water and the mixture was subjected to high shear via the Scott Turbo Mixer at high speed. The RPM of the shaft was 6,000 RPM and the temperature of the mixture was raised to 180 degrees F. the pH of the mixture was adjusted to 5.5 with 50% lactic acid. The Inulin mixture was then homogenized at 2,000 pounds PSI first stage and 500 pounds PSI second stage and cooled to 60 degrees F. The next day, the Inulin microcrystalline cellulose mixture had the body and texture of butter.

The 332 pounds of Inulin-Microcrystalline cellulose mixture, 60 pounds of Jeneil CH-329 Accelerated Ripened Cheddar Cheese, and 10 pounds of the liposome mixture were then placed into the Infuser and the door was closed. The vacuum pump was energized and a vacuum of 26 inches was developed. The curd and the mixture were subjected to the vacuum for 35 minutes while warm water was circulated in the jacket and the flights of the Infuser. Jeneil R-127 Accelerated Ripened Cheese is an enzymatically ripened Cheddar cheese that has a very strong flavor that approximates 30 to 50 times the flavor of aged Cheddar cheese. Jeneil R-127 is a product of Jeneil Biotech of Saukville, Wis. The temperature of the cheddar curd was maintained above 85 degrees F. as the curd will not knit if the temperature falls below 80 degrees F. The cheese curd was allowed to develop a pH of 5.43.

The door was opened and 12 pounds of fine salt and 12 pounds of potassium chloride was added to the infuser. The door was closed and the vacuum pump was energized and a vacuum of 26 inches was developed. The curd and the salt was subjected to the vacuum for 10 minutes while warm (85 degrees F.) water was circulated in the jacket and the flights of the infuser. It was determined that the salt had penetrated the curd particle evenly. The curd particle was cut in half and the centers were analyzed as were the outside portions. The difference was less than 0.2%. The curd had a final pH of 5.38, and a butterfat content of 1.89%, moisture content of 45.97%, a FDB of 1.50%, moisture on non-fat solids of 28.50%, and a salt content of 1.73%. The fat content of 1.89% allows for 0.5 grams of fat per one ounce serving of cheese. Thus, the cheese can be termed fat free.

The cheese curd was packed in 500-pound drums and stored for 90 day. Samples were taken at 10, 30, 60 and 90-day intervals and analyzed for flavor, body, and texture. The texture of the fat free Cheddar cheese at 10 days displayed the classic cheddar body, but the texture was still rubbery. The flavor could be described as a mild Cheddar cheese. The cheese grated, shredded, and sliced very well.

The texture of the fat free Cheddar cheese at 30 days had the body and texture normally associated with cheddar cheese. The Inulin imparted the same mouth feel and lubricity as butterfat and the texture was not rubbery nor short that is normally associated with low fat and fat free cheese. This texture improvement of normal fat free cheddar was due to the microcrystalline cellulose crystals and the Inulin maintaining the protein matrix in its normal high fat form. Generally speaking, as the fat or moisture content is raised relative to the protein content, the cheese becomes soft and less firm. When the fat content is lowered relative to the protein content, the cheese becomes very firm and displays a rubbery texture. The incorporation of the Inulin-microcrystalline cellulose gel prevented the protein matrix from strengthening and thus, becoming very firm, elastic, rubbery, and tough. The flavor could be compared to a 6-month-old Cheddar cheese.

The texture of the fat free Cheddar cheese at 60 days had the same texture as the 30-day-old sample. Perhaps the cheese was less firm than it was at 30 days, but there was only a slight change in texture. The flavor now developed into well-rounded cheddar that could be compared to 10-month-old Cheddar cheese as a significant free amino acid breakdown was occurring. The cheese grated, shredded, and sliced very well. The melting properties of the fat free cheddar were not the same as regular cheddar as to be expected due to the elimination of fat. Fat requires a large quantity of calories to soften and melt whereas this fat free cheese had a large quantity of water relative to the protein content. The cheese melted without flowing or stretching and appeared "hot" in the mouth that is typical of fat free cheese versions or mimics.

EXAMPLE 6
(Low Fat Instant Aged Cheddar Cheese)

Nine thousand (9,000) pounds of non-fat milk was HTST pasteurized at 163 degrees F. and held for 20 seconds. The milk was then transferred into a cheese vat. The milk had fat content of 0.85% and a protein content of 5.98% and estimated casein content of 5.01%. The milk was fortified with Calcium Caseinate from MD Foods of Denmark. The brand name was Microdan 40 and the casein content was 88%. The caseiate was added to the milk silo the night before and allowed to fully hydrate for 8 hours or more.

The pasteurized cheese milk was filled into a standard open Damrow rectangular cheese vat at 87 degrees F. When the vat had 2,000 pounds of cheese milk in it, Gist-brocades direct set culture CH109 was inoculated into the milk. Additionally, 10 ounces of Gist-brocades Calcium Chloride was added to the vat dispersed in 2 gallons of water.

When the vat had 9,000 pounds of milk in it, the milk line was switched to another vat. The agitators were placed on medium speed and 8.5 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 29 minutes and the curd was cut with ¼ inch knifes. The curd was allowed to heal for 5 minutes and the agitators were replaced and the cheese curd was cooked to 104 degrees F. by raising the temperature two degrees every five minutes. The cook time was 54 minutes and then the curd and whey was pumped to finishing tables. The whey was drained from the table and 950 pounds of curd was removed from the table and transferred to the infuser in a kitchen cart.

The Cheddar Curd was added to the infuser while it was turning at 4 RPM. The infuser must be turning while the cheese is added as it will mat and clump if the infuser is stopped. The efficiency of the infuser is dependent upon having a large amount of curd surface area so that the desired infusion material or ingredient can penetrate the surface of the curd. The greater the surface area, the faster and more efficient the infusion process becomes.

The first step infusion process was the addition of proteolytic enzymes to the cheese curd. The addition of these enzymes will round the flavor profile of the cheese. Typically, Cheddar cheese requires 6 to 8 months to fully develop the characteristic flavor. In this case, 200 grams of a proteolytic enzyme composition Accelerase AD 87 were mixed with 1.25-gallon water. Accelerase AD 87 enzymes are products of Imperial Biotech of London, England. The enzyme-water mixture was placed into the infuser and the door was closed. The vacuum pump was energized and a vacuum of 26 inches was developed. The curd and the mixture were subjected to the vacuum for 10 minutes while warm water was circulated in the jacket and the flights of the infuser. The warm water (110 degrees F. to 115 degrees F.) was required to maintain a curd temperature of 103 degrees F., as the curd needed to continue to ripen. If the warm water were not circulated through the jacket and the flights, then the curd would fail to reach the correct pH. The high vacuum evaporates water from the curd and lowers the curd temperature.

Prior to the addition of the curd to the infuser, 12 pounds Avicel RC591 microcrystalline cellulose, 50 pounds of OptaGrade® modified starch, and 120 pounds of Inulin IQ were mixed with 250 pounds of water and the mixture was subjected to high shear via the Scott Turbo Mixer at high speed. The RPM of the shaft was 6,000 RPM and the temperature of the mixture was raised to 180 degrees F. The pH of the mixture was adjusted to 5.5 with 50% lactic acid. The Inulin mixture was then homogenized at 2,000 pounds PSI first stage and 500 pounds PSI second stage and cooled to 60 degrees F. The next day, the Inulin microcrystalline cellulose mixture had the body and texture of butter. Opta-Grade® is a modified starch texturizer produced by Opta Food Ingredients, Inc. of Bedford, Mass.

The 432 pounds of Inulin-Microcrystalline cellulose-Opta-Grade mixture, 100 pounds of Jeneil CH-329 Accelerated Ripened Cheddar Cheese, and 10 pounds of the liposome mixture prepared in Example 6 were then placed into the Infuser and the door was closed. The vacuum pump was energized and a vacuum of 26 inches was developed. The curd and the mixture were subjected to the vacuum for 35 minutes while warm water was circulated in the jacket and the flights of the Infuser. The temperature of the cheddar curd was maintained above 85 degrees F. as the curd will not knit if the temperature falls below 80 degrees F. The cheese curd was allowed to develop a pH of 5.43.

The door was opened and 12 pounds of fine salt and 12 pounds of potassium chloride was added to the infuser. The door was closed and the vacuum pump was energized and a vacuum of 26 inches was developed. The curd and the salt was subjected to the vacuum for 10 minutes while warm (85 degrees F.) water was circulated in the jacket and the flights of the infuser. It was determined that the salt had penetrated the curd particle evenly. The curd particle was cut in half and the centers were analyzed as were the outside portions. The difference was less than 0.2%. The curd had a final pH of 5.38, and a butterfat content of 6.16%, moisture content of 46.12%, a FDB of 8.39%, moisture on non-fat solids of 26.66%, and a salt content of 1.52%. The curd had a final pH of 5.38 and a salt content of 1.57% measured via chloride. The fat content was 6.16% that allows for 3.1 grams of fat per one ounce serving of cheese. Thus, the cheese can be termed low fat.

The cheese curd was packed in 500-pound drums and stored for 90 day. Samples were taken at 10, 30, 60 and 90-day intervals and analyzed for flavor, body, and texture. The texture of the low fat Cheddar cheese at 10 days displayed the classic cheddar body and texture. It did display a slight rubbery texture. The flavor could be described as a mild Cheddar cheese and the fat content carried the flavor of the accelerated cheddar cheese better than the low fat version in Example 6. The cheese grated, shredded, and sliced very well.

The texture of the low fat Cheddar cheese at 30 days had the body and texture normally associated with cheddar cheese. The texture was better than that displayed in Example 5 and it is unknown if the OptaGrade starch or the increased level of fat was responsible. The Inulin imparted the same mouth feel and lubricity as butterfat and the texture was not rubbery nor short that is normally associated with low fat and low fat cheese. This texture improvement of normal low fat cheddar was due to the microcrystalline cellulose crystals and the Inulin maintaining the protein matrix in its normal high fat form. Generally speaking, as the fat or moisture content is raised relative to the protein content, the cheese becomes soft and less firm. When the fat content is lowered relative to the protein content, the cheese becomes very firm and displays a rubbery texture. The incorporation of the Inulin-microcrystalline cellulose gel prevented the protein matrix from strengthening and thus, becoming very firm, elastic, rubbery, and tough. The flavor could be compared to a 6-month-old Cheddar cheese.

The texture of the low fat Cheddar cheese at 60 days had the same texture as the 30-day-old sample. Perhaps the cheese was less firm than it was at 30 days, but there was only a slight change in texture. The flavor now developed into well-rounded cheddar that could be compared to 10-month-old Cheddar cheese as a significant free amino acid breakdown was occurring. The cheese grated, shredded, and sliced very well. The melting properties of the low fat cheddar were not the same as regular cheddar as to be expected due to the elimination of fat. Fat requires a large quantity of calories to soften and melt whereas this low fat cheese had a large quantity of water relative to the protein content. The cheese melted without flowing or stretching and appeared "hot" in the mouth that is typical of low fat cheese versions or mimics.

The advantages of this new system for making a low fat or low fat Cheddar cheese are that the fat substitutes and mimics will not precipitate out with the casein in the cheese vat. This invention allows for the use of any fat substitute to be infused or incorporated into the protein matrix of the cheese. The fact is that the fat substitute will enhance the texture of the cheese and allow the protein matrix to remain in its natural state. Normally, the protein matrix without fat will become increasing rubbery and continue to develop a hard, brittle texture.

EXAMPLE 7
(Rapid Aged Parmesan for Drying—Probotics)

Eighteen thousand three hundred thirty five (18,335) pounds of standardized Jersey milk was HTST pasteurized at 163 degrees F. for 20 seconds. The milk had a fat content of 2.58% and a protein content of 4.98% and was fortified with MICRODAN 40 Calcium Caseinate from MD Foods of Denmark. The casein content was 88%. The caseinate was added to the milk silo the night before and allowed to fully hydrate for 8 hours. The pasteurized cheese milk was filled into a standard open Damrow cheese vat at 90 degrees F. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat was filled with 18,335 pounds of milk in it, the milk line was switched to another vat. The agitators were placed on medium speed and 16 ounces of MAXI-REN (rennet coagulant available Gist-brocades located in Deft, the Netherlands) was added to 3 gallons of water and then added slowly to the cheese vat in front of the agitators. The agitators were left on for five minutes and then the arms and blades were removed. The vat was allowed to set for 29 minutes and the curd was cut with ¼ inch knifes. The curd was allowed to heal for 5 minutes and the agitators were replaced and the cheese curd was cooked to 126 degrees F. by raising the temperature two degrees every five minutes. The cook time was 90 minutes and then the curd and whey was pumped to finishing tables. The whey was drained from the table and 1000 pounds of the curd was removed from the table and transferred to the infuser (similar to infuser 186) in a kitchen cart. As with the prior examples, the remaining curd was removed and was not weighed.

The Parmesan Curd was added to the infuser while it was turning at 4 RPM. The infuser is preferably turning while the cheese is added as the curd tends to it will mat and clump if the infuser is stopped. The efficiency of the infuser is dependent upon having a large amount of surface area so that the desired material for infusion can penetrate the surface of the curd.

The first step of the infusion was the addition of proteolytic and lipolytic enzymes to the cheese curd. The addition of these enzymes will accelerate the ripening of the finished cheese so that the cheese will mature very quickly. Typically, Parmesan cheese requires 10 to 14 months to fully develop the characteristic flavor. In this case, 1,000 grams of a proteolytic enzyme composition RST50 and 400 grams of a lipolytic enzyme composition CHP were mixed with 2 gallons water. Both of these enzymes were purchased from Imperial Biotech of London, England. The enzyme-water mixture was placed into the infuser and the door was closed. The vacuum pump was energized and a vacuum of 26 inches was developed. The curd and the mixture were subjected to the vacuum for 10 minutes while warm water was circulated in the jacket and the flights of the infuser. This warm water (130 degrees F.) was to maintain the curd temperature of 115 degrees F. as the curd needed to continue to ripen. If the warm water were not circulated through the jacket and the flights, then the curd would fail to reach the correct pH.

Prior to the addition of the curd to the infuser, 8 pounds of Microguard 300 and 8 pounds of Microguard 100 were added to 24 pounds of water and the mixture was subjected to high shear via the Scott Turbo Mixer at high speed. The RPM of the shaft was 6,000 RPM and steam was injected into the mixture until the temperature reached 160 degrees F. The mixture was then cooled to 100 degrees F. The final weight was 43 pounds. When the Microguard mixture was cooled, 22 grams of Natamax was added to the mixture and was allowed to hydrate for 15 minutes.

The cheese curd was allowed to ripen to a pH of 5.4 and then cold water was circulated through the jacket and the flights. The Microguard-Natamax mixture was then placed into the infuser and the door was closed. The vacuum pump was energized and a vacuum of 26 inches was developed. The curd and the mixture was subjected to the vacuum for 15 minutes while cold (45 degrees F.) water was circulated in the jacket and the flights of the infuser.

The door was opened and 18 pounds of fine salt was added to the infuser. The door was closed and the vacuum pump was energized and a vacuum of 26 inches was developed. The curd and the salt was subjected to the vacuum for 10 minutes while cold (45 degrees F.) water was circulated in the jacket and the flights of the infuser. It was determined that the salt had penetrated the curd particle evenly since when the curd particle was cut in half and the centers were analyzed as were the outside portions. The difference was less than 0.2%. The curd had a final pH of 5.42 and a butterfat content of 21.67%, a moisture content of 32.08%, a FDB of 31.90%, a moisture in non-fat of 36.20%, and a salt content of 1.49%.

The cheese curd was packed in 500-pound drums and stored for 90 day. Samples were taken at 30-day intervals and analyzed for flavor, body, and texture. The texture of the accelerated ripened Parmesan cheese at 30 days had the typical translucent color and smooth hard texture. The sweet nut-like flavor could be compared to 6-month-old Parmesan cheese. The cheese grated and shredded very well. The cheese was then grated and allowed to stand at room temperature for 10 days. There was no sign of bacterial degradation nor was there a sign of mold growth. The Microguard products prevent the growth of gram positive and gram negative bacteria. The Natamax® prevents the growth of mold spores.

The texture of the accelerated ripened Parmesan cheese at 60 days had the typical translucent color and smooth hard texture. The sweet nut-like flavor could be compared to 12-month-old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products continued to prevent the growth of gram positive and gram negative bacteria and the Natamax continued to prevent the growth of mold spores.

The texture of the accelerated ripened Parmesan cheese at 90 days had the typical translucent color and the texture now could be termed granular that is typical of high quality Parmesan cheese. The sweet nut-like flavor could be compared to 18 to 20 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products continued to prevent the growth of gram positive and gram negative bacteria. The Natamax prevented the growth of mold spores. Microguard is a product of Rhodia of Madison, Wis. and Natamax is a product of Cultor Food Science.

The advantages of this new system for making Parmesan cheese is that the yield is increased because normally Parmesan is dried to 16% moisture or below. This new process allows for the infusion of probotics such that the moisture of the cheese can remain at 32%. Thus, the yield of Parmesan is increased by 23.53% by not having to reduce the moisture to 16%. The cost of cheese is also reduced, as the cheese is not required to age for 14 to 20 months.

EXAMPLE 8
(RAPID AGED AND ENHANCED YIELD PARMESAN)

Eighteen thousand three hundred thirty five (18,335) pounds of standardized Jersey milk was HTST pasteurized at 163 degrees F. and held for 20 seconds. The milk was then passed into a cheese vat and had a fat content of 3.01%, a protein content of 5.08% and estimated casein content of 4.14%. The milk was fortified with Calcium Caseinate from MD Foods of Denmark. The brand name was Microdan 40 and the casein content was 88%. The caseinate was added to the milk silo the night before and allowed to fully hydrate for 8 hours.

The pasteurized cheese milk was filled into a standard open Damrow cheese vat at 90 degrees F. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat had 18,335 pounds of milk in it, the milk line was switched to another vat. The agitators were placed on medium speed and 16 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 31 minutes and the curd was cut with ¼ inch knifes. The curd was allowed to heal for 5 minutes and the agitators were replaced and the cheese curd was cooked to 124 degrees F. by raising the temperature two degrees every five minutes. The cook time was 88 minutes and then the curd and whey was pumped to finishing tables. The whey was drained from the table and 1000 pounds of curd was removed from the table and transferred to the infuser in a kitchen cart.

Parmesan Curd was added to the infuser while it was turning at 4 RPM. The infuser was tuning while the cheese was added, because the cheese curd will tend to mat and clump if the infuser is stopped. The efficiency of the infuser is dependent upon having a large amount of surface area so that the desired material for infusion can penetrate the surface of the curd.

The first step infusion was the addition of proteolytic and lipolytic enzymes to the cheese curd. The addition of these enzymes will accelerate the ripening of the finished cheese so that the cheese will mature very quickly. Typically, Parmesan cheese requires 10 to 14 months to fully develop the characteristic flavor. In this case, 1,000 grams of a proteolytic enzyme composition RST50 and 400 grams of a lipolytic enzyme composition CHP were mixed with 2 gallons water. Both of these enzymes are products of Imperial Biotech of London, England. The enzyme-water mixture was placed into the infuser and the door was closed. The vacuum pump was energized and a vacuum of 26 inches was developed. The curd and the mixture were subjected to the vacuum for 12 minutes while warm water was circulated in the jacket and the flights of the infuser. This warm water (130 degrees F.) was to maintain the curd temperature of 115 degrees F. as the curd needed to continue to ripen. If the warm water were not circulated through the jacket and the flights, then the curd would fail to reach the correct pH.

Prior to the addition of the curd to the infuser, 55 pounds of 88% protein Whey Protein Isolate was added to 82 pounds of water and the mixture was pasteurized and denatured by raising the temperature to 160 degrees F. and holding for 15 minutes. The 80% protein Whey Protein Isolate is a product of Davisco Foods International the mixture was subjected to high shear via the Scott Turbo Mixer at high speed. The RPM of the shaft was 6,000 RPM during the pasteurization and denaturization step. The denatured and pasteurized 88% Whey Protein Isolate was cooled to 110 degrees F. After the enzymes were infused into the curd, the whey protein solution was added to the infuser and the vacuum pump was energized and a vacuum of 26.5 inches was developed. The speed of the infuser was 4 RPM and the time required for the whey protein to be infused into the curd was 25 minutes.

Prior to the addition of the curd to the infuser, 8 pounds of Microguard 300 and 8 pounds of Microguard 100 were added to 24 pounds of water and the mixture was subjected to high shear via the Scott Turbo Mixer at high speed. The RPM of the shaft was 6,000 RPM and steam was injected into the mixture until the temperature reached 160 degrees F. The mixture was then cooled to 100 degrees F. The final weight was 43 pounds. When the Microguard mixture was cooled, 22 grams of Natamax was added to the mixture and was allowed to hydrate for 15 minutes.

The cheese curd was allowed to ripen for an additional 12 minutes to a pH of 5.35 and then cold water was circulated through the jacket and the flights. The Microguard-Natamax mixture was then placed into the infuser and the door was closed. The vacuum pump was energized and a vacuum of 26 inches was developed. The curd and the mixture was subjected to the vacuum for 15 minutes while cold (45 degrees F.) water was circulated in the jacket and the flights of the infuser.

The door was opened and 18 pounds of fine salt was added to the Infuser. The door was closed and the vacuum pump was energized and a vacuum of 26 inches was developed. The curd and the salt was subjected to the vacuum for 10 minutes while cold (45 degrees F.) water was circulated in the jacket and the flights of the Infuser. It was determined that the salt had penetrated the curd particle evenly. The curd particle was cut in half and the centers were analyzed as were the outside portions. The difference was less than 0.206. The curd had a final pH of 5.32, and a butterfat content of 21.38%, a moisture content of 33.26%, a FDB of 32.04%, a moisture on non-fat solids of 29.54%, and a salt content of 1.480%.

The cheese curd was packed in 500-pound drums and stored for 90 day. Samples were taken at 30-day intervals and analyzed for flavor, body, and texture. The texture of the accelerated ripened enhanced yield Parmesan cheese at 30 days had the typical translucent color and smooth hard texture. The sweet nut-like flavor could be compared to 6-month-old Parmesan cheese. The cheese grated and shredded very well. The cheese was then grated and allowed to stand at room temperature for 10 days. There was no sign of bacterial degradation nor was there a sign of mold growth. The Microguard products prevented the growth of gram positive and gram negative bacteria. The Natamax prevented the growth of mold spores.

The texture of the accelerated ripened Parmesan cheese at 60 days had the typical translucent color and smooth hard texture. The sweet nut-like flavor could be compared to 12-month-old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products prevented the growth of gram positive and gram negative bacteria. The Natamax prevented the growth of mold spores.

The texture of the accelerated ripened Parmesan cheese at 90 days had the typical translucent color and the texture now could be termed granular that is typical of high quality Parmesan cheese. The sweet nut-like flavor could be compared to 18 to 20 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products prevented the growth of gram positive and gram negative bacteria. The Natamax prevented the growth of mold spores. Microguard is a product of Rhodia of Madison, Wis. and Natamax is a product of Cultor Food Science located in Ardsley, N.Y.

The advantages of this new system for making Parmesan cheese is that the yield is increased by the addition of whey protein concentrate. The whey protein concentrate was added back to the cheese at the same rate of recovery from the whey. Under normal circumstances, 80% whey protein is recovered at the rate of 0.6% of the whey. Normally, cheese solids are lost when salt is added to the finishing tables and this process allows for complete recovery of all solids. Thus, the final weight of the cheese was 1215 pounds for an increase in yield of 19.65% over the 1000 pounds of Parmesan curd. The final moisture of the cheese was 33.26%. Normal grated Parmesan is dried to 16% moisture or below. The yield at 16% moisture would be 965 pounds whereas the yield at 32% moisture would be 1192 pounds. The increase in yield would be 23.53%. This new process allows for the infusion of probotics such that the moisture of the cheese can remain at 32% or just below. Thus, a combination of the two increases in yield would be over 56%. Further, the cost of cheese is reduced, as the cheese is not required to age for 14 to 20 months.

EXAMPLE 9
(Rapid Aged Romano Cheese)

Eighteen thousand three hundred thirty five (18,335) pounds of standardized Jersey milk was HTST pasteurized at 163 degrees F. and held for 20 seconds. The milk was then released into a cheese vat with a fat content of 3.70%, a protein content of 5.04% and estimated casein content of 4.11%. The milk was fortified with Calcium Caseinate from MD Foods of Denmark. The brand name was Microdan 40 and the casein content was 88%. The caseinate was added to the milk silo the night before and allowed to fully hydrate for 8 hours.

The pasteurized cheese milk was filled into a standard open Damrow cheese vat at 90 degrees F. Additionally, 25 pounds of Titanium Dioxide was added to 5 gallons of water and added to the balance tank while the milk was being pasteurized. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat had 18,335 pounds of milk in it, the milk line was switched to another vat. The agitators were placed on medium speed and 16 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left on for five minutes and then the arms and blades were removed. The vat was allowed to set for 29 minutes and the curd was cut with ¼ inch knifes. The curd was allowed to heal for 5 minutes and the agitators were replaced and the cheese curd was cooked to 113 degrees F. by raising the temperature two degrees every five minutes. The cook time was 70 minutes and then the curd and whey was pumped to finishing tables. The whey was drained from the table and 1000 pounds of the curd was removed from the table and transferred to the infuser in a kitchen cart. The remaining curd was used for other purposes.

The Romano curd was added to the infuser while it was turning at 4 RPM. The infuser should preferably be turning while the cheese is added as it will mat and clump if the infuser is stopped. The efficiency of the infuser is dependent upon having a large amount of surface area so that the desired material for infusion can penetrate the surface of the curd.

The first step infusion was the addition of proteolytic and lipolytic enzymes to the cheese curd. The addition of these enzymes will accelerate the ripening of the finished cheese so that the cheese will mature very quickly. Typically, Romano cheese requires 6 to 8 months to fully develop the characteristic flavor. In this case, 750 grams of a proteolytic enzyme composition RST30 and 425 grams of a lipolytic enzyme composition CHC were mixed with 2 gallons water. Both of these enzymes are products of Imperial Biotech of London, England. The enzyme-water mixture was placed into the infuser and the door was closed. The vacuum pump was energized and a vacuum of 26 inches was developed. The curd and the mixture were subjected to the vacuum for 10 minutes while warm water was circulated in the jacket and the flights of the infuser. This warm water (130 degrees F.) was to maintain the curd temperature of 115 degrees F. as the curd needed to continue to ripen. If the warm water were not circulated through the jacket and the flights, then the curd would fail to reach the correct pH.

Prior to the addition of the curd to the Infuser, 8 pounds of Microguard 300 and 8 pounds of Microguard 100 were added to 24 pounds of water and the mixture was subjected to high shear via the Scott Turbo Mixer at high speed. The RPM of the shaft was 6,000 RPM and steam was injected into the mixture until the temperature reached 160 degrees F. The mixture was then cooled to 100 degrees F. The final weight was 40 pounds. When the Microguard mixture was cooled, 22 grams of Natamax was added to the mixture and was allowed to hydrate for 15 minutes.

The cheese curd was allowed to ripen to a pH of 5.46 and then cold water was circulated through the jacket and the flights. The Microguard-Natamax mixture was then placed into the infuser and the door was closed. The vacuum pump was energized and a vacuum of 26 inches was developed. The curd and the mixture was subjected to the vacuum for 15 minutes while cold (45 degrees F.) water was circulated in the jacket and the flights of the infuser.

The door was opened and 32 pounds of fine salt was added to the infuser. The door was closed and the vacuum pump was energized and a vacuum of 26 inches was developed. The curd and the salt was subjected the vacuum for 12 minutes while cold (45 degrees F.) water was circulated in the jacket and the flights of the infuser. It was determined that the salt had penetrated the curd particle evenly. The curd particle was cut in half and the centers were analyzed as were the outside portions. The difference was less than 0.2%. The final rapid aged Romano cheese had a final pH of 5.32, and a butterfat content of 24.40%, a moisture content of 35.88%, a FDB of 38.05%, a moisture on non-fat solids of 42.62%, and a salt content of 3.02%.

The cheese curd was packed in 500-pound drums and stored for 90 day. Samples were taken at 30 day intervals and analyzed for flavor, body, and texture. The texture of the accelerated ripened Romano cheese at 30 days had the typical white opaque color and hard texture. The lipolytic flavor and odor could be compared to 5-month-old Romano cheese. The cheese grated and shredded very well. The cheese was then grated and allowed to stand at room temperature for 10 days. There was no sign of bacterial degradation nor was there a sign of mold growth. The Microguard products prevent the growth of gram positive and gram negative bacteria. The Natamax prevents the growth of mold spores.

The texture of the accelerated ripened Romano cheese at 60 days had the typical white opaque color and hard texture. The lipolytic flavor and odor could be compared to 8 month old Romano cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products prevented the growth of gram positive and gram negative bacteria. The Natamax prevented the growth of mold spores.

The texture of the accelerated ripened Romano cheese at 90 days had the typical white opaque color and the typical hard texture of a high quality Romano cheese. The lipolytic flavor and odor could be compared to 10 to 12 month old Romano cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The Microguard products continued to prevent the growth of gram positive and gram negative bacteria. The Natamax continued to prevent the growth of mold spores. Microguard is a product of Rhodia of Madison, Wis. and Natamax is a product of Cultor Food Science.

The advantages of this new system for making Romano cheese is that the yield is increased because normally Romano is dried to 16% moisture or below. This new process allows for the infusion of probotics such that the moisture of the cheese can remain at 36%. Thus, the yield of Romano is increased by 31.25% by not having to reduce the moisture to 16%. This significantly decreases the cost per pound of the cheese. Additionally, the cost of cheese is also reduced, as the cheese is not required to age for 6 months.

EXAMPLE 10

(Rapid Aged and Enhanced Yield Romano Cheese)

Eighteen thousand three hundred thirty five (18,335) pounds of standardized Jersey milk was HTST pasteurized at 163 degrees F. and held for 20 seconds. The milk was released into a cheese vat with a fat content of 4.17%, a protein content of 4.98% and estimated casein content of 4.07%. The milk was fortified with Calcium Caseinate from MD Foods of Denmark. The brand name was Microdan 40 and the casein content was 88%. The caseinate was added to the milk silo the night before and allowed to fully hydrate for 8 hours.

The pasteurized cheese milk was filled into a standard open Damrow cheese vat at 90 degrees F. Additionally, 25 pounds of Titanium Dioxide was added to 5 gallons of water and the mixture was added to the balance tank while the milk was being pasteurized. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat had 18,335 pounds of milk in it, the milk line was switched to another vat. The agitators were placed on medium speed and 16 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 31 minutes and the curd was cut with ¼ inch knifes. The curd was allowed to heal for 5 minutes and the agitators were replaced and the cheese curd was cooked to 115 degrees F. by raising the temperature two degrees every five minutes. The cook time was 75 minutes and then the curd and whey mixture was pumped to finishing tables. The whey was drained from the table and 1000 pounds of curd was removed from the table and transferred to the infuser in a kitchen cart.

The Romano curd was added to the infuser while it was turning at 4 RPM. The infuser is preferably turning while the cheese is added as it will mat and clump if the infuser is stopped. The efficiency of the infuser depends upon having a large amount of curd surface area so that the desired infusion material or ingredient can penetrate the surface of the curd.

The first step infusion was the addition of proteolytic and lipolytic enzymes to the cheese curd. The addition of these enzymes will accelerate the ripening of the finished cheese so that the cheese will mature very quickly. Typically, Romano cheese requires 6 to 8 months to fully develop the characteristic flavor. In this case, 750 grams of a proteolytic enzyme composition RST30 and 450 grams of a lipolytic enzyme composition CHC were mixed with 2 gallons water. Both of these enzymes are products of Imperial Biotech of London, England. The enzyme-water mixture was placed into the Infuser and the door was closed. The vacuum pump was energized and a vacuum of 26 inches was developed. The curd and the mixture were subjected to the vacuum for 12 minutes while warm water was circulated in the jacket and the flights of the infuser. This warm water (130 degrees F.) was to maintain the curd temperature of 112 degrees F. as the curd needed to continue to ripen. If the warm water were not circulated through the jacket and the flights, then the curd would fail to reach the correct pH.

Prior to the addition of the curd to the Infuser, 55 pounds of 80% protein Whey Protein Isolate was added to 85 pounds of water and the mixture was pasteurized and denatured by raising the temperature to 160 degrees F. and holding for 15 minutes. The 80% protein Whey Protein Isolate is a product of Davisco Foods International. The mixture was subjected to high shear via the Scott Turbo Mixer at high speed. The RPM of the shaft was 6,000 RPM during the pasteurization and denaturization step. The denatured and pasteurized 88% Whey Protein Isolate was cooled to 110 degrees F. After the enzymes were infused into the curd, the whey protein solution was added to the infuser and the vacuum pump was energized and a vacuum of 26.5 inches was developed. The speed of the infuser was 4 RPM and the time required for the whey protein to be infused into the curd was 25 minutes.

Prior to the addition of the curd to the Infuser, 8 pounds of Microguard 300 and 8 pounds of Microguard 100 were added to 24 pounds of water and the mixture was subjected to high shear via the Scott Turbo Mixer at high speed. The RPM of the shaft was 6,000 RPM and steam was injected into the mixture until the temperature reached 160 degrees F. The mixture was then cooled to 100 degrees F. The final weight was 40 pounds. When the Microguard mixture was cooled, 22 grams of Natamax was added to the mixture and was allowed to hydrate for 15 minutes.

The cheese curd was allowed to ripen for an additional 12 minutes to a pH of 5.35 and then cold water was circulated through the jacket and the flights. The Microguard-Natamax mixture was then placed into the infuser and the door was closed. The vacuum pump was energized and a vacuum of 26 inches was developed. The curd and the mixture was subjected to the vacuum for 15 minutes while cold (45 degrees F.) water was circulated in the jacket and the flights of the infuser.

The door was opened and 38 pounds of fine salt was added to the infuser. The door was closed and the vacuum pump was energized and a vacuum of 26 inches was developed. The curd and the salt was subjected to the vacuum for 10 minutes while cold (45 degrees F.) water was circulated in the jacket and the flights of the Infuser. It was determined that the salt had penetrated the curd particle evenly. The curd particle was cut in half and the centers were analyzed, as were the outside portions. The difference was less than 0.2%. Salt inhibits the knit of the curd particles into a solid mass of cheese. It was observed that the curd knit very well and this phenomenon was due to the high concentration of salt on the surface of the curd particle. The second reason is that the vacuum has eliminated gas pockets in the curd and thus, the curd displays greater density and is less difficult to knit under pressure. The curd had a final pH of 5.32, and a butterfat content of 24.06%, a moisture content of 36.28%, a FDB of 37.76%, a moisture on non-fat solids of 34.48%, and a salt content of 3.07%.

The cheese curd was packed in 500-pound drums and stored for 90 day. Samples were taken at 30 day intervals and analyzed for flavor, body, and texture. The texture of the accelerated ripened enhanced yield Romano cheese at 30 days had the white opaque color and hard texture. The lipolytic flavor and odor could be compared to 6-month-old Romano cheese. The cheese grated and shredded very well. The cheese was then grated and allowed to stand at room temperature for 10 days. There was no sign of bacterial degradation nor was there a sign of mold growth. The Microguard products prevented the growth of gram positive and gram negative bacteria. The Natamax prevented the growth of mold spores. The texture of the accelerated ripened Romano cheese at 60 days had the typical white opaque color and hard texture. The lipolytic flavor and odor could be compared to 12 month old Romano cheese and significant free amino acid breakdown was occurring since the cheese had developed a sharp, pungent flavor notes. The cheese grated and shredded very well. The cheese was then grated and allowed to stand at room temperature for 10 days. There was no sign of bacterial degradation nor was there a sign of mold growth. The Microguard products continued to prevent the growth of gram positive and gram negative bacteria. The Natamax continued to prevent the growth of mold spores.

The texture of the accelerated ripened Romano cheese at 90 days had the typical white opaque color and hard texture. The lipolytic flavor and odor could be compared to 10 to 12 month old Romano cheese and significant free amino acid breakdown was occurring since the cheese had developed a sharp, pungent flavor notes. The cheese grated and shredded very well. The cheese was then grated and allowed to stand at room temperature for 10 days. There was no sign of bacterial degradation nor was there a sign of mold growth. The Microguard products still prevented the growth of gram positive and gram negative bacteria. The Natamax still prevented the growth of mold spores.

The advantages of this new system for making Romano cheese is that the yield is increased by the addition of whey protein concentrate. The whey protein concentrate was added back to the cheese at the same rate of recovery from the whey. Under normal circumstances, 88% whey protein is recovered at the rate of 0.6% whey protein in the whey. Normally, cheese solids are lost when salt is added to the finishing tables and this process allows for complete recovery of all solids. Thus, the final weight of the cheese was 1232 pounds for an increase in yield of 31.25% over the 1000 pounds of Romano curd. The final moisture of the cheese was 36.28%. Normal grated Romano is dried to 16% moisture or below to prevent the growth of microorganisms that cause spoilage when the cheese is distributed without refrigeration. This new process allows for the infusion of probotics such that the moisture of the cheese can remain at 36% or just below. Thus, the addition of whey protein concentrate and probotics increases the yield of the Romano curd by 48% or more.

The normal method of incorporating enzymes that will accelerate the ripening of cheese is to mix the enzymes with salt and apply the mixture to the cheese on the finishing table. Typically, 40 percent of the enzyme is lost to the whey that is expressed from the curd. Salt has a dehydrating effect upon the curd. With this invention, the entire enzyme weight is infused into the curd very evenly. Another difficulty with the enzyme-salt method is that the curd does not absorb the enzyme mixture evenly. The proteolytic enzymes then break down the cheese protein and cause flavor and texture variation within the cheese mass. In some cases, free whey appears and the cheese is not saleable. With this invention, the cost of accelerated ripening is reduced by 40% or more and the results are very uniform.

The infuser is equipped with load cells and if the moisture of the cheese is rapidly determined via CEM microwave or another rapid method, the moisture can be added back to the cheese mass to maximize yield. Most of the cheese standards have the maximum moisture content specified. If the cheese maker exceeds the maximum amount, the cheese is out of standard and results in a loss. Using the infuser to standardize moisture to the maximum allowable limit, the cheese manufacture can maximize his profit.

EXAMPLE 11

(Instant Aged and Enhanced Yield Parmesan Cheese)

Eighteen thousand three hundred thirty five (18,335) pounds of standardized Jersey milk was HTST pasteurized at 163 degrees F. and held for 20 seconds. The milk was then passed into a cheese vat with a fat content of 3.16%, a protein content of 5.11% and estimated casein content of 4.16%. The milk was fortified with Calcium Caseinate from MD Foods of Denmark. The brand name was Microdan 40 and the casein content was 88%. The caseinate was added to the milk silo the night before and allowed to fully hydrate for 8 hours or more.

The pasteurized cheese milk was filled into a standard open Damrow rectangular cheese vat at 90 degrees F. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat had 18,385 pounds of milk in it, the milk line was switched to another vat. The agitators were placed on medium speed and 16 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 32 minutes and the curd was cut with ¼ inch knifes. The curd was allowed to heal for 5 minutes and the agitators were replaced and the cheese curd was cooked to 126 degrees F. by raising the temperature two degrees every five minutes. The cook time was 88 minutes and then the curd and whey was pumped to finishing tables. The whey was drained from the table and 1000 pounds of the curd was removed from the table and transferred to the infuser in a kitchen cart. The remaining curd was not used in the example.

The Parmesan curd was added to the infuser while it was turning at 4 RPM. The infuser is preferably be turning while the cheese is added as it will mat and clump if the infuser is stopped. (Of course, other mechanism could be used to prevent matting or clumping). The efficiency of the infuser depends in part on having a large amount of curd surface area so that the desired infusion material or ingredient can penetrate the surface of the curd. Greater surface area facilitates the speed and efficiency of the infusion process.

The first step infusion process was the addition of proteolytic and lipolytic enzymes to the cheese curd. The addition of these enzymes will round the flavor profile of the cheese. Typically, Parmesan cheese requires 12 to 18 months to fully develop the characteristic flavor. In this case, 250 grams of a proteolytic enzyme composition RST50 and 100 grams of a lipolytic enzyme composition CHP were mixed with 1.25-gallon water. Both of these enzymes are products of Imperial Biotech of London, England. The enzyme-water mixture was placed in to the Infuser and the door was closed. The vacuum pump was energized and a vacuum of 26 inches was developed. The curd and the mixture were subjected to the vacuum for 12 minutes while warm water was circulated in the jacket and the flights of the infuser. The warm water (120 degrees F. to 130 degrees F.) was required to maintain a curd temperature of 115 degrees F., as the curd needed to continue to ripen. If the warm water was not circulated through the jacket and the flights, then the curd would fail to reach the correct pH. The high vacuum evaporates water from the curd and lowers the curd temperature.

Prior to the addition of the curd to the infuser, 55 pounds of 80% protein Whey Protein Isolate was added to 85 pounds of water and the mixture was pasteurized and denatured by raising the temperature to 160 degrees F. and holding for 15 minutes. The 80% protein Whey Protein Isolate is a product of Davisco Foods International of Eden Prairie, Minn. The mixture was subjected to high shear via the Scott Turbo Mixer at high speed. The RPM of the shaft was 6,000 RPM during the pasteurization and denaturization step. The denatured and pasteurized 88% Whey Protein Isolate was cooled to 110 degrees F. After the enzymes were infused into the curd, the whey protein solution was added to the infuser and the vacuum pump was energized and a vacuum of 26.5 inches was developed. The speed of the infuser was 5 RPM and the time required for the liquid Whey Protein Isolate to be infused into the curd was 20 minutes.

Prior to the addition of the curd to the Infuser, 8 pounds of Microguard 300 and 8 pounds of Microguard 100 were added to 24 pounds of water and the mixture was subjected to high shear via the Scott Turbo mixer at high speed. The RPM of the shaft was 6,000 RPM and steam was injected into the mixture until the temperature reached 160 degrees F. The mixture was then cooled to 45 degrees F. The final weight was 40 pounds. When the Microguard mixture was cooled, 22 grams of Natamax was added to the mixture and was allowed to hydrate for 15 minutes.

The cheese curd was allowed to ripen for an additional 12 minutes to a pH of 5.41 and then cold water was circulated through the jacket and the flights. The Microguard-Natamax mixture and 75 pounds of Jeneil R-127 Accelerated Ripened Parmesan Cheese were then placed into the Infuser and the door was closed. The vacuum pump was energized and a vacuum of 26 inches was developed. The curd and the mixture was subjected to the vacuum for 15 minutes while cold (45 degrees F.) water was circulated in the jacket and the flights of the infuser. Jeneil R-127 Accelerated Ripened Cheese is an enzymatically ripened Parmesan cheese that has a very strong flavor that approximates 30 to 50 times the flavor of aged Parmesan cheese. Jeneil R-127 is a product of Jeneil Biotech of Saukville, Wis.

The door was opened and 23 pounds of fine salt was added to the infuser. The door was closed and the vacuum pump was energized and a vacuum of 26 inches was developed. The curd and the salt was subjected to the vacuum for 10 minutes while cold (45 degrees F.) water was circulated in the jacket and the flights of the infuser. It was determined that the salt had penetrated the curd particle evenly. The curd particle was cut in half and the centers were analyzed, as were the outside portions. The difference was less than 0.2%. The curd had a final pH of 5.38, and a butterfat content of 22.33%, a moisture content of 33.96%, a FDB of 31.61%, a moisture on non-fat solids of 27.72%, and a salt content of 1.63%.

The cheese curd was packed in 500-pound drums and stored for 90 day. Samples were taken at 10 day and 30 days intervals and analyzed for flavor, body, and texture. The color and texture of the accelerated ripened enhanced yield Parmesan cheese at 10 days was the typical Parmesan translucent color, but texture was still rubbery. The sweet nut-like flavor could b e compared to 12-month-old Parmesan cheese. The cheese grated and shredded very well. The cheese was then grated and allowed to stand at room temperature for 10 days. There was no sign of bacterial degradation nor was there a sign of mold growth. The Microguard products are bacteriocins that prevent the growth of gram positive and gram negative bacteria. The Natamax is an antimycotic agent and prevents the growth of mold spores. microguard is a product of Rhodia of Madison, Wis. and Natamax is a product of Cultor Food Science located in Ardsley, N.Y.

The texture of the accelerated ripened Parmesan cheese at 30 days had the typical translucent color and smooth hard texture. The sweet nut-like flavor could be compared to 15 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth. The texture of the accelerated ripened Parmesan cheese at 60 days had the typical translucent color and smooth hard texture. The sweet nut-like flavor could be compared to 24 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth.

The advantages of this new system for making Parmesan cheese is that the yield is increased by the addition of whey protein concentrate. The Whey Protein Isolate was added back to the cheese at the same rate of recovery from the whey. Under normal circumstances, 88% whey protein is recovered at the rate of 0.6% whey protein from the whey. Normally, cheese solids are lost when salt is added to the finishing tables and this process allows for complete recovery of all solids. Thus, the final weight of the cheese was 1285 pounds for an increase in yield of 26.45% over the 1000 pounds of Parmesan curd. The final moisture of the cheese was 33.96%. Normal grated Parmesan is dried to 16% moisture or below to prevent the growth of microorganisms that cause spoilage when the cheese is distributed without refrigeration. This new process allows for the infusion of probotics such that the moisture of the cheese can remain at 32% or just below. If this batch of Parmesan were dried to 16% moisture, the yield would be 1011 versus 1240 if the cheese were 32% moisture. The increase in yield would be 23.53%. Thus, the addition of whey protein concentrate and probotics increases the yield of the Parmesan curd by 50 to 60%.

The normal method of incorporating enzymes that will accelerate the ripening of cheese is to mix the enzymes with salt and apply the mixture to the cheese on the finishing table. Typically, 40 percent of the enzyme is lost to the whey that is expressed from the curd. Salt has a dehydrating effect upon the curd. With this invention, the entire enzyme weight is infused into the curd very evenly. Another difficulty with the enzyme-salt method is that the curd does not absorb the enzyme mixture evenly. The proteolytic enzymes then break down the cheese protein and cause flavor and texture variation within the cheese mass. In some cases, free whey appears and the cheese is not saleable. With this invention, the cost of accelerated ripening is reduced by 40% or more and the results are very uniform. The invention also insures that the flavor of the cheese remains uniform from day to day as the enzyme concentration is always uniform.

The infuser is equipped with load cells and if the moisture of the cheese is rapidly determined via CEM microwave or another rapid method, the moisture can be added back to the cheese mass to maximize yield. Most of the cheese standards have the maximum moisture content specified. If the cheese maker exceeds the maximum amount, the cheese is out of standard and results in a loss. Using the infuser to standardize moisture to the maximum allowable limit, the cheese manufacture can maximize his profit.

EXAMPLE 12

(Enhanced Yield via Whey Precipitate Parmesan Cheese)

Eighteen thousand three hundred thirty five (18,335) pounds of standardized Jersey milk was HTST pasteurized at 163 F. and held for 20 seconds. The milk was released into a cheese vat with a fat content of 3.19%, a protein content of 4.97% and estimated casein content of 4.06%. The milk was fortified with Calcium Caseinate from MD Foods of Denmark. The brand name was Microdan 40 and the casein content was 88%. The caseinate was added to the milk silo the night before and allowed to fully hydrate for 8 hours or more.

The pasteurized cheese milk was filled into a standard open Damrow rectangular cheese vat at 90 F. When the vat had 2,000 pounds of cheese milk in it, Gist-brocades direct set culture PS 240 was inoculated into the milk. Additionally, 25 ounces of Gist-brocades Calcium Chloride was added to the vat dispersed in 2 gallons of water.

When the vat had 18,385 pounds of milk in it, the milk line was switched to another vat. The agitators were placed on medium speed and 16 ounces of Maxi-Ren (rennet coagulant) was added to 3 gallons of water and then added slowly to the cheese vat in front of the agitators. Maxi-Ren is a product of Gist-brocades located in Deft, the Netherlands. The agitators were left running for five minutes and then the arms and blades were removed. The vat was allowed to set for 32 minutes and the curd was cut with ¼ inch knifes. The curd was allowed to heal for 5 minutes and the agitators were replaced and the cheese curd was cooked to 127 F. by raising the temperature two degrees every five minutes. The cook time was 90 minutes and then the curd and whey was pumped to finishing tables. The whey was drained from the table and 1000 pounds of the curd produced was removed from the table and transferred to the infuser in a kitchen cart.

The Parmesan curd was added to the infuser while it was turning at 4 RPM. The infuser should be turning while the cheese is added as it will mat and clump if the infuser is stopped. Of course, other mechanisms could be used to avoid matting and clumping.

The efficiency of the infuser is largely dependent upon having a large amount of curd surface area so that the desired infusion material or ingredient (i.e. enhancing agent) can penetrate the surface of the curd. Greater surface area determines the speed and efficiency of the infusion process.

The first step infusion process was the addition of proteolytic and lipolytic enzymes to the cheese curd. The addition of these enzymes will round the flavor profile of the cheese. Typically, Parmesan cheese requires 12 to 18 months to fully develop the characteristic flavor. In this case, 250 grams of a proteolytic enzyme composition RST50 and 100 grams of a lipolytic enzyme composition CHP were mixed with 1.25-gallon water. Both of these enzymes are products of Imperial Biotech of London, England. The enzyme-water mixture was placed into the infuser and the door was closed. The vacuum pump was energized and a vacuum of 26 inches was developed. The curd and the mixture were subjected to the vacuum for 12 minutes while warm water was circulated in the jacket and the flights of the infuser. The warm water (120F to 130F) was required to maintain a curd temperature of 115F, as the curd needed to continue to ripen. If the warm water was not circulated through the jacket and the flights, then the curd would fail to reach the correct pH. The high vacuum evaporates water from the curd and lowers the curd temperature.

Prior to the addition of the curd to the infuser, whey from a previous vat of Parmesan cheese was placed in a steam kettle. The whey was then injected with live steam until the temperature reached 194F. The pH was lowered to a pH of 5.40 with a 50% solution of citric acid. The whey protein precipitated and formed a mat on the surface of the whey. The hot whey was drained through the bottom of the steam kettle and the protein precipitate was recovered from the kettle by tilting it and filling standard cheese hoops. The whey protein precipitate was pressed until the moisture content was lowered to 60%. Fifteen pounds of the lecithin phospholipid mixture as prepared in Example 5 was added to the whey protein precipitate. The mixture was subjected to high shear via the Scott Turbo Mixer at high speed. The RPM of the shaft was 6,000 RPM and the process continued for fifteen minutes until the mixture was smooth indicating that the particle size was lowered to below 5 microns. The mixture was analyzed under a phase contrast microscope to determine the particle size. The denatured and particle reduced whey protein precipitate was cooled to 110F. After the enzymes were infused into the curd, the whey protein precipitate-liposome mixture was added to the infuser and the vacuum pump was energized and a vacuum of 26.5 inches was developed. The speed of the infuser was 5 RPM and the time required for the whey protein precipitate-liposome mixture to be infused into the curd was 22 minutes.

Prior to the addition of the curd to the infuser, 8 pounds of Microguard 300 and 8 pounds of Microguard 100 were added to 24 pounds of water and the mixture was subjected to high shear via the Scott Turbo Mixer at high speed. The RPM of the shaft was 6,000 RPM and steam was injected into the mixture until the temperature reached 160 F. The mixture was then cooled to 45 F. The final weight was 40 pounds. When the Microguard mixture was cooled, 22 grams of Natamax was added to the mixture and was allowed to hydrate for 15 minutes.

The cheese curd was allowed to ripen for an additional 12 minutes to a pH of 5.41 and then cold water was circulated through the jacket and the flights. The Microguard-Natamax mixture was added to the Infuser. The vacuum pump was energized and a vacuum of 26 inches was developed. The curd and the mixture was subjected to the vacuum for 15 minutes while cold (45F) water was circulated in the jacket and the flights of the infuser.

The door was opened and 21 pounds of fine salt was added to the infuser. The door was closed and the vacuum pump was energized and a vacuum of 26 inches was developed. The curd and the salt were subjected to the vacuum for 10 minutes while cold (45F) water was circulated in the jacket and the flights of the infuser. It was determined that the salt had penetrated the curd particle evenly. The curd particle was cut in half and the centers were analyzed, as were the outside portions. The difference was less than 0.2%. The curd had a final pH of 5.27, and a butterfat content of 20.74%, a moisture content of 36.44%, a FDB of 32.63%, a moisture on non-fat solids of 30.86%, and a salt content of 1.66%.

The cheese curd was packed in 500-pound drums and stored for 90 day. Samples were taken at 10 day and 30 days intervals and analyzed for flavor, body, and texture. The color and texture of the accelerated ripened enhanced yield Parmesan cheese at 30 days was the typical Parmesan translucent color, but texture was still rubbery. The sweet nut-like flavor could be compared to 6-month-old Parmesan cheese. The cheese grated and shredded very well. The cheese was then grated and allowed to stand at room temperature for 10 days. There was no sign of bacterial degradation nor was there a sign of mold growth. The Microguard products are bacteriocins that prevent the growth of gram positive and gram negative bacteria. The Natamax is an antimycotic agent and prevents the growth of mold spores. microguard is a product of Rhodia of Madison, Wis. and Natamax is a product of Cultor Food Science located in Ardsley, N.Y.

The texture of the accelerated ripened Parmesan cheese at 60 days had the typical translucent color and smooth hard texture. The sweet nut-like flavor could be compared to 10 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth.

The texture of the accelerated ripened Parmesan cheese at 90 days had the typical translucent color and smooth hard texture. The sweet nut-like flavor could be compared to 15 month old Parmesan cheese and significant free amino acid breakdown was occurring since the cheese had developed sharp, pungent flavor notes. The cheese grated and shredded very well. The cheese was then grated and allowed to stand at room temperature for 10 days. There was no sign of bacterial degradation nor was there a sign of mold growth.

The advantages of this new system for making Parmesan cheese is that the yield is increased by the addition of whey protein concentrate. The Whey Protein Isolate was added back to the cheese at the same rate of recovery from the whey. Under normal circumstances, 88% whey protein is recovered at the rate of 0.6% whey protein from the whey. Normally, cheese solids are lost when salt is added to the finishing tables and this process allows for complete recovery of all solids. Thus, the final weight of the cheese was 1,268 pounds for an increase in yield of 24.73% over the 1000 pounds of Parmesan curd. The final moisture of the cheese was 36.44%. Normal grated Parmesan is dried to 16% moisture or below to prevent the growth of microorganisms that cause spoilage when the cheese is distributed without refrigeration. This new process allows for the infusion of probotics such that the moisture of the cheese can remain at 32% or just below. If this batch of Parmesan were dried to 16% moisture, the yield would be 960 versus 1185 if the cheese were 32% moisture. The increase in yield would be 23.53%. Thus, the addition of whey protein concentrate and probotics increases the yield of the Parmesan curd by 50 to 60%.

The normal method of incorporating enzymes that will accelerate the ripening of cheese is to mix the enzymes with salt and apply the mixture to the cheese on the finishing table. Typically, 40 percent of the enzyme is lost to the whey that is expressed from the curd. Salt has a dehydrating effect upon the curd. With this invention, the entire enzyme weight is infused into the curd very evenly. Another difficulty with the enzyme-salt method is that the curd does not absorb the enzyme mixture evenly. The proteolytic enzymes then break down the cheese protein and cause flavor and texture variation within the cheese mass. In some cases, free whey appears and the cheese is not saleable. With this invention, the cost of accelerated ripening is reduced by 40% or more and the results are very uniform. The invention also insures that the flavor of the cheese remains uniform from day to day as the enzyme concentration is always uniform.

EXAMPLE 13

(Instant Quick Frozen Enhanced Yield Modified Pizza cheese)

Twenty five thousand pounds (25,000) of standardized milk was HTST pasteurized at 163 degrees F. and held for 20 seconds. The milk was then released into a cheese vat.

The milk had a fat content of 3.45%, a protein content of 3.25% and estimated casein content of 2.44%. The pasteurized cheese milk was filled into a standard open Damrow rectangular cheese vat at 90 degrees F. When the vat had 4,000 pounds of cheese milk in it, Chr. Hansen direct set culture CH234 was inoculated into the milk.

When the vat had 25,000 pounds of milk in it, the milk line was switched to another vat. The agitators were placed on medium speed and 26 ounces of Chymax® (rennet coagulant) was added to 3 gallons of water and then added slowly to the cheese vat in front of the agitators. Chymax® is a product of Chr. Hansen of Milwaukee, Wis. The agitators were left running for five minutes and then the arms and blades were removed. The vat was allowed to set for 28 minutes and the curd was cut with ¼ inch knifes. The curd was allowed to heal for 5 minutes and the agitators were replaced and the cheese curd was cooked to 112 degrees F. by raising the temperature two degrees every five minutes. The cook time was 48 minutes and then the curd and whey was pumped to finishing tables. The whey was drained from the table and curd was removed from the table. The Pizza cheese curd was pressed to knit the curd particles and remove moisture. The cheese then was diced in a Fitz® mill to reduce the size to approximately ⅜-inch by ⅜ inch by ½ inch long. While the cheese was being diced, it was immediately transferred to the Infuser while it turned at 4 RPM. The weight of the curd transferred to the infuser was 300 pounds.

The infuser should be turning while the diced cheese curd is added, or some other mechanism provided to prevent matting and clumping if the infuser is stopped. The efficiency of the infuser is dependent upon having a large amount of cheese curd surface area so that the desired infusion material or ingredient can penetrate the surface of the curd. In this case, the most optimum size cheese curd particle was developed. In commercial practice, the curd would be pressed in a double belt de-whey belt shown in FIG. 15. The pressed curd would then be diced in a mill and added immediately to the infuser. The infusion process is dependent upon the surface area of the curd. If the size of the curd particle is small and the surface area is larger per pound of curd, the infusion process becomes faster and more efficient.

The infuser used in this example was a new model designed for smaller trial batches. The batch weight can vary from 150 pounds to 450 pounds. This infuser is equipped with an additional door that has a snow horn so that carbon dioxide can be added to the product and reduce the temperature instantly. This door can also be equipped with a liquid nitrogen nozzle that will serve the same purpose.

Fifteen minutes before adding, 75 grams of a proteolytic enzyme termed AD52 that enhances the stretch and the string of Pizza cheese was added to one gallon of water and allowed to hydrate. The AD52 enzyme is available from Protein Technologies of St. Louis, Mo. The enzyme solution was added to the Whey Protein Concentrate solution and added to the Infuser in the following step.

Prior to the addition of the curd to the infuser, 16 pounds of 88% protein Whey Protein Concentrate was added to 29 pounds of water and the mixture was pasteurized and denatured by raising the temperature to 160 degrees F. and holding for 15 minutes. The 80% protein SDP 80 Whey Protein Concentrate is a product of Simplot Dairy Products of Lacey, Wash. The mixture was subjected to high shear via the Scott Turbo Mixer at high speed. The RPM of the shaft was 6,000 RPM during the pasteurization and denaturization step. The denatured and pasteurized 88% Whey Protein Concentrate was cooled to 110 degrees F. The Whey Protein Concentrate mixture was added to the Infuser and the vacuum pump was energized and a vacuum of 22 Thor was developed. The speed of the infuser was 4 RPM and the time required for the liquid Whey Protein Concentrate to be infused into the curd was 15 minutes. The warm water (115 degrees F. to 120 degrees F.) was required to maintain a curd temperature of 110 degrees F., as the diced cheese curd needed to continue to ripen. If the warm water were not circulated through the jacket and the flights, then the cheese curd would fail to reach the correct pH. The high vacuum evaporates water from the curd and lowers the curd temperature.

When it was determined that the Whey Protein Concentrate mixture had been completely absorbed by the curd and the curd was reasonably dry, 3 pounds of OptaGrade® modified starch texturizer was pulled into the Infuser by a vacuum via a wand. The infuser continued to rotate at 5 RPM with a vacuum of 23 Thor and the warm water circulating through the jacket and flights. The infusion process continued for 8 minutes until it was determined that the diced Pizza cheese curd had absorbed the OptaGrade®. OptaGrade® is a modified starch texturizer produced by Opta Food Ingredients, Inc. of Bedford, Mass.

The infuser was opened and 1.2 pounds of KSAL (Sodium Aluminum Phosphate) acid form and 0.6 pounds of Sodium Citrate were added after they had been dissolved in 16 pounds of water. The door was closed and a vacuum of 23 Thor was developed for 5 minutes until the curd had absorbed all of the KSAL. The acid form of KSAL was used, as it appears to enhance the stretch whereas other Sodium Phosphates replace the calcium ion, but they do not enhance the stretch of the Pizza cheese as well as KSAL. The cheese curd was allowed to ripen for an additional 15 minutes to a pH of 5.38 and then an 28 degrees F. glycol solution was circulated through the jacket and the flights.

At this point, 5.5 pounds of salt in 19.5 pounds of cold water (40 degrees F.) and 5 pounds of the lecithin phospholipid mixture at a temperature of 40 degrees F. as prepared in Example 5 was added to the Infuser. A vacuum of 23 Thor was developed and the diced cheese particles had absorbed the liquid in 20 minutes. The pH had dropped to 5.30 and the temperature of the curd was 65 degrees F. The vacuum was continued at 23 Thor for another 10 minutes.

The vacuum door was swung aside and the Carbon Dioxide Horn Door was attached. The carbon dioxide was activated and the temperature of the diced curd particles was lowered to 10 degrees F. The final IQF Pizza cheese had a final pH of 5.26, and a butterfat content of 20.63%, a moisture content of 51.98%, a FDB of 42.96%, a moisture on non-fat solids of 43.87%, and a salt content of 1.51%.

The diced Pizza cheese particles were unloaded from the infuser by reversing the motion and the flights then moved the cheese particles into kitchen carts. The diced IQF (Instant Quick Frozen) Pizza cheese particles were packed in random weight bags. The cheese was stored at −10 degrees F. to −20 degrees F. for 90 day.

At five days, the diced IQF Pizza cheese was allowed to thaw and then 10 ounces of the diced cheese placed upon a 12-inch pizza. The stretch and string of the enhanced yield diced Pizza cheese at 5 days was typical of a 15-day-old Pizza cheese. The flavor could be compared to a typical pasta filata Mozzarella or Pizza cheese. The apparent viscosity was very soft. There was no free oil formation nor was there any sign of browning. The fibrils that stretched from the melted cheese were long and displayed distinct fibrils. The reason that the cheese developed the proper melt characteristics without any aging is that the AD52 enzyme developed the correct proteolysis in the Infuser before the temperature was lowered via the carbon dioxide injection. Further, it is believed, the salt, the sodium citrate, and the KSAL penetrated the cheese immediately while the cheese curd was still hot. Thus, the ion exchange between the sodium and calcium occurred rapidly versus the cold brine salting process. The sodium citrate and the KSAL also have an effect upon the protein so that it performs very well with respect to the proper proteolysis. The meltability of cheese develops in the Infuser instead of during the process of aging. Samples were taken at 10, 20, 30, and 60-day intervals and analyzed for flavor, body, texture, meltability, stretch, oil formation, and apparent viscosity. The cheese was taken to a pizzeria and 8 ounces and 10 ounces was thawed and melted on a 12-inch pizza. The stretch and string of the enhanced yield Pizza cheese at 10 days was typical of a 15-day-old Pizza cheese. All of the performance characteristics remained the same as the 5-day trial. The apparent viscosity was firm, yet the eat was very tender. There was no free oil formation nor was there any sign of browning. The fibrils that stretched from the melted cheese were long and displayed distinct fibrils. The mouth feel was firm and displayed the typical chew expected from a well-made Pizza cheese or any other pasta filata cheese. The was no free water displayed on any of the samples of diced IQF Pizza cheese.

The advantages of this new system for making diced enhanced yield Pizza cheese is that the cheese requires no aging and the performance characteristics remain the same throughout the entire shelf life of the cheese. It is envisioned that the manufacturing process could be very uniform from day to day and that there would be very little deviation in the finished characteristics of the pasta filata cheese. The yield was increased by the addition of Whey Protein Concentrate. The Whey Protein Concentrate was added back to the cheese at the same rate of recovery from the whey. Under normal circumstances, 88% whey protein is recovered at the rate of 0.6% whey protein from high protein whey. The whey protein firmed the cheese so that the cheese resembled a cheese with moisture content of 47% to 48%. The yield was increased by 24% over a normal cheese made with the same fat and protein content in the milk. Part of this increase in yield was due to the whey protein infusion, part due to the additional moisture, and part was due to the lack of butterfat and protein loss since the cooker water was eliminated, and part was due to the lack of brine process.

An additional advantage of the invention is that further processing need not be applied after the cheese is pulled from the infuser. The cheese need not be formed, subjected to brine, cooled, and grated or shredded. Avoiding each of these steps provides substantial time and cost savings over the systems of the prior art.

While there are several different uses disclosed for the present invention, the present disclosure has been made to provide what is currently believed to be the best mode of the invention. Certain steps, such as pasteurization or cooling enhancing agent under a vacuum may not be required to practice the invention, and other steps may further improve the working of the invention. In light of the present disclosure, those skilled in the art will appreciate numerous variations which may be used without departing from the scope and spirit of the present invention. Additionally, it is likely that numerous other enhancing agents may be used in accordance with the principles of the present invention to produce enhanced cheese products. The appended claims are intended to cover such modifications.

What is claimed is:

1. A method for producing an enhanced cheese product, the method comprising:
   (a) processing milk to produce cheese curds;
   (b) mixing the cheese curds with an enhancing agent to form a mixture;
   (c) continuing to mix the cheese curds and enhancing agent while subjecting the mixture to a negative pressure to draw enhancing agent into the cheese curds and thereby enhance the amount of enhancing agent contained in the cheese curds.

2. The method for producing an enhanced cheese product according to claim 1, wherein the enhancing agent comprises whey protein.

3. The method for producing an enhanced cheese product according to claim 1, wherein the enhancing agent comprises at least one probotic.

4. The method for producing an enhanced cheese product according to claim 3, wherein the probotic is selected from the group consisting of at least one antimicrobial agent.

5. The method for producing an enhanced cheese product according to claim 1, wherein the enhancing agent is a fat substitute.

6. The method for producing an enhanced cheese product according to claim 5, wherein the fat substitute is selected from the group consisting of modified corn starch, chicory extract (Inulin), modified whey protein and combinations thereof.

7. The method for producing an enhanced cheese product according to claim 1, wherein the enhancing agent comprises a flavoring.

8. The method for producing an enhanced cheese product according to claim 1, wherein the enhancing agent comprises a coloring.

9. The method for producing an enhanced cheese product according to claim 1, wherein the enhancing agent comprises an enzyme selected for accelerated ripening or aging of cheese.

10. The method for producing an enhanced cheese product according to claim 1, wherein the enhancing agent comprises a cheese/enzyme concentrate.

11. The method for producing an enhanced cheese product according to claim 10, wherein the method comprises selecting an enhancing agent which comprises a cheese/enzyme concentrate in which the enzyme has been at least partially inactivated.

12. The method for producing an enhanced cheese product according to claim 1, wherein the method further comprises pasteurizing the enhancing agent prior to mixing the enhancing agent with the cheese curds.

13. The method for producing an enhanced cheese product according to claim 12, wherein the method further comprises cooling the enhancing agent prior to mixing the enhancing agent with the cheese curds.

14. The method for producing an enhanced cheese product according to claim 13, wherein the enhancing agent is under negative pressure prior to mixing the enhancing agent with the cheese curds.

15. The method for producing an enhanced cheese product according to claim 13, wherein the enhancing agent is cooled to a temperature lower than that of the cheese curds prior to mixing with the cheese curds.

16. The method for producing an enhanced cheese product according to claim 1, wherein the method further comprises tumbling the mixture of enhancing agent and cheese curds to continue mixing the enhancing agent and the cheese curds while the mixture of enhancing agent and cheese curds is subjected to negative pressure.

17. The method for producing an enhanced cheese product according to claim 1, wherein the method comprises repeatedly coating the cheese curds with the enhancing agent while subjecting the cheese curds to negative pressure.

18. The method for producing an enhanced cheese product according to claim 1, wherein the method further comprises heating the mixture of enhancing agent and cheese curds while said mixture is subjected to negative pressure.

19. The method for producing an enhanced cheese product according to claim 1, wherein the enhancing agent is whey protein, and wherein the method comprises forming a mixture having a ratio of cheese curds to whey protein between 10:1 and 1.5:1.

20. The method for producing an enhanced cheese product according to claim 1, wherein the method further comprises salting the cheese curds while the cheese curds are subjected to negative pressure.

21. The method for producing an enhanced cheese product according to claim 1, wherein the method comprises mixing the enhancing agent and the cheese curds while the enhancing agent has a lower temperature than the cheese curds.

22. The method for producing an enhanced cheese product according to claim 1, wherein the enhancing agent is a hydrocolloid.

23. The method for producing an enhanced cheese product according to claim 1, wherein the enhancing agent is a protein selected to facilitate an increase in water content in the enhanced cheese.

24. A method for enhancing yield of a dairy product, the method comprising:
   (a) processing milk to obtain cheese curds;
   (b) mixing the cheese curds with a filler material to form a mixture; and
   (c) continuing to mix the cheese curds and filler material while applying a negative pressure to the mixture to draw the filler material into the curds to form curds of increased mass.

25. The method for enhancing yield of a dairy product of claim 24, wherein the filler material is whey protein.

26. The method for enhancing yield of a dairy product of claim 25, wherein the method comprises forming a mixture with whey protein being between 10 and 40 percent by weight of the amount of milk solids in the cheese curds.

27. The method for enhancing yield of a dairy product of claim 24, wherein the method further comprises, heating the whey protein to between 160 and 190 degrees prior to mixing the whey protein with the cheese curds.

28. The method for enhancing yield of a dairy product of claim 27, wherein the method further comprises cooling the whey protein prior to mixing the whey protein with the cheese curds.

29. The method for enhancing yield of a dairy product of claim 28, wherein the method comprises cooling the whey protein while subjecting the whey protein to a negative pressure prior to mixing the whey protein with the cheese curds.

30. The method for enhancing yield of a dairy product of claim 24, wherein the method further comprises heating the mixture while subjecting it to negative pressure.

31. The method for enhancing yield of a dairy product of claim 24, wherein the method further comprises continuing to mix the mixture while subjecting it to a negative pressure.

32. The method for enhancing yield of a dairy product of claim 24, wherein the method further comprises heating the whey protein and cheese curd mixture as it is subjected to negative pressure.

33. The method for enhancing yield of a dairy product of claim 24, further comprising salting the cheese curds while they arere subjected to negative pressure.

34. The method for enhancing yield of a dairy product of claim 24, wherein the filler material is a hydrocolloid.

35. The method for enhancing yield of a dairy product of claim 24, wherein the filler material is a protein selected to cause increased water content in the dairy product.

36. The method for enhancing yield of a dairy product of claim 24, further comprising salting the cheese curds while they are subjected to negative pressure.

37. A method for disposing of whey protein produced as a byproduct of cheese production, the method comprising:
   (a) processing milk to form cheese curds;
   (b) mixing the cheese curds with whey protein produced as a byproduct of cheese production; and
   c) subjecting the cheese curds and whey protein to negative pressure to cause the cheese curds to absorb the whey protein.

38. The method for disposing of whey protein produced as a byproduct of milk production of claim 37, wherein the method comprises forming a whey protein concentrate and mixing said concentrate with the cheese curds.

39. The method for disposing of whey protein produced as a byproduct of cheese production of claim 38, wherein the method comprises forming a whey concentrate with at least 50 percent whey protein by weight.

40. A method for extending shelflife of a dairy product, the method comprising:
   (a) processing milk to obtain curds;
   (b) mixing the curds with a preserving agent to form a mixture;
   (c) continuing to mix the cheese curds and preserving while subjecting the mixture to negative pressure to draw the preserving agent into the curds.

41. The method for extending shelf-life of a dairy product of claim 40, wherein the preserving agent is a probotic.

42. The method for extending shelf-life of a dairy product of claim 41, wherein the probotic is selected from the group consisting of nisin, other antimicrobial agents and combinations thereof.

43. The method for extending shelf-life of a dairy product of claim 40, wherein the method further comprises pasteurizing the preserving agent prior to mixing with the curds.

44. The method for extending shelf-life of a dairy product of claim 43, wherein the method further comprises cooling the preserving agent.

45. The method for extending shelf-life of a dairy product of claim 44, wherein the preserving agent is cooled while subjecting the pre serving agent to a negative pressure.

46. The method for extending shelf-life of a dairy product of claim 40, wherein the method further comprises heating the mixture while subjecting the mixture to negative pressure.

47. The method for extending shelf-life of a dairy product of claim 40, wherein the method further comprises positioning the mixture in an infuser and rotating the infuser as the mixture is subjected to a negative pressure.

48. A method for making a shelf stable grated cheese having at least 20 percent water content, the method comprising:
   (a) selecting a probotic known to resist spoilage in cheese;
   (b) mixing the probotic with cheese curds; and
   (c) subjecting the probotic and cheese curds to negative pressure to cause the cheese curds to absorb the probotic.

49. The method according to claim 48, wherein step (a) comprises selecting at least one probotic of the group consisting of nisin, other probotics and combinations thereof.

50. The method according to claim 48, wherein method further comprises heating the probotic to between 160 and 190 degrees Fahrenheit prior to mixing with the cheese curds.

51. The method according to claim 50, wherein the method further comprises cooling the probotic prior to mixing with the cheese curds.

52. The method according to claim 51, wherein the method comprises cooling the probotic to a temperature below that of the cheese curds prior to mixing with the cheese curds.

53. The method according to claim 48, wherein the method further comprises heating the mixture while subjecting the mixture to negative pressure.

54. The method according to claim 48, wherein the mixture is placed in a infuser, and wherein the infuser rotates while the mixture is subjected to negative pressure.

55. A method for producing a reduced fat cheese, the method comprising:
    (a) supplying a fat substitute;
    (b) supplying cheese curds;
    (c) mixing the fat substitute and the cheese curds to form a mixture; and
    (d) subjecting then mixture to negative pressure.

56. The method for producing a reduced fat cheese of claim 55, wherein the method further comprises processing the cheese curds to create low fat curds prior to mixing the fat substitute with the cheese curds.

57. The method for producing a reduced fat cheese of claim 55, wherein the method further comprises pasteurizing the fat substitute prior to mixing with the cheese curds.

58. The method for producing a reduced fat cheese of claim 57, wherein the method further comprises cooling the fat substitute prior to mixing with the cheese curds.

59. The method for producing a reduced fat cheese of claim 55, wherein step (c) comprises, more specifically, applying a negative pressure to the mixture while tumbling the mixture and applying heat.

60. The method for producing a reduced fat cheese of claim 55, wherein the fat substitute is selected from the group consisting of modified corn starch, chicory extract, and modified whey protein, and combinations thereof.

61. A method for producing a low fat cheese, the method comprising:
    (a) supplying cheese curds having been processed to remove fat;
    (b) supplying a fat substitute;
    (c) mixing the cheese curds with the fat substitute; and
    (d) subjecting the cheese curds and fat substitute to negative pressure to cause the fat substitute to be absorbed by the cheese curds.

62. The method for producing a low fat cheese of claim 61, wherein the method further comprises mixing the fat substitute and the cheese curds in an infuser while applying negative pressure to the mixture.

63. The method according to claim 62, wherein the method further comprises heating the mixture while applying a negative pressure thereto.

64. A method for producing a flavored cheese product, the method comprising;
    (a) supplying a flavoring;
    (b) mixing the flavoring with cheese curds to form a mixture; and
    (c) subjecting the mixture to negative pressure to cause at least some of the flavoring to be absorbed by the cheese curds; and
    (d) continuing to mix the flavoring and the cheese curds while the mixture is subject to negative pressure.

65. The method for producing a flavored cheese product of claim 64, wherein step (a) comprises supplying a flavoring selected from the group consisting of natural fruit flavorings, artificial fruit flavorings, meat flavorings, condiment flavorings, sweeteners, condiments, cheese flavorings, chocolate flavoring and combinations thereof.

66. The method for producing a flavored cheese product of claim 64, wherein the method further comprises pasteurizing the flavoring prior to mixing the flavoring with the cheese curds.

67. The method for producing a flavored cheese product of claim 66, wherein the method further comprises cooling the flavoring prior to mixing the flavoring with the cheese curds.

68. The method for producing a flavored cheese product of claim 64, wherein the flavoring has a temperature below the temperature of the cheese curds when the cheese curds and flavoring are mixed.

69. The method for producing a flavored cheese product of claim 64, wherein the method comprises heating the mixture and tumbling the mixture in a infuser while applying negative pressure.

70. The method for producing a flavored cheese product of claim 64, wherein the method further comprises adding a coloring agent to the flavoring and the cheese curds to color the cheese.

71. A method for producing a flavored cheese, the method comprising:
    (a) processing milk to form cheese curds;
    (b) selecting a flavoring agent selected to impart a desired flavor the cheese curds;
    (c) mixing the cheese curds and the flavoring agent; and
    (d) applying a vacuum to the cheese curds and flavoring agent while they are mixing to cause at least some of the flavoring agent to be absorbed by the cheese curds; and
    (e) continuing to mix the flavoring and the cheese curds while the mixture is subject to negative pressure.

72. The method for producing a flavored cheese of claim 71, the method further comprising heating the flavoring agent to between 160 and 190 degrees Fahrenheit prior to mixing the flavoring agent with the cheese curds.

73. The method for producing a flavored cheese of claim 71, the method further comprising cooling the flavoring agent to between about 30 and 40 degrees Fahrenheit prior to mixing the flavoring agent with the cheese curds.

74. The method for producing a flavored cheese of claim 71, the method comprising tumbling the mixture of cheese curds and flavoring agent while subjecting the mixture to heat and negative pressure.

75. A method for accelerated ripening of cheese, the method comprising:
    (a) supplying an enzyme selected to provide accelerated aging or ripening of cheese;
    (b) mixing the enzyme with cheese curds to form a mixture; and
    (c) subjecting the mixture of enzyme and cheese curds to negative pressure to cause at least some of the enzyme to be absorbed by the cheese curds.

76. The method for accelerated ripening of cheese of claim 75, wherein the enzyme is pasturized prior to mixing with the cheese curds.

77. The method for accelerated ripening of cheese of claim 75, wherein the enzyme is cooled prior to mixing with the cheese curds so that the enzyme is cooler than the cheese curds when the enzyme is mixed with the cheese curds.

78. The method for accelerated ripening of cheese of claim 75, wherein the cheese curds and the enzyme are tumbled and heated while being subjected to negative pressure.

79. A method for forming cheese having the taste of an aged or ripened cheese, the method comprising:
 (a) supplying an enzyme selected to impart a desired flavor in cheese at an accelerated rate;
 (b) mixing the enzyme with cheese curd to form a cheese/enzyme concentrate;
 (c) mixing the cheese/enzyme concentrate with cheese curds to form a mixture; and
 (d) subjecting the mixture of cheese/enzyme concentrate and cheese curds to negative pressure to cause the cheese/enzyme concentrate to be absorbed by the cheese curds.

80. The method according to claim 79 for forming cheese having the taste of an aged or ripened cheese, wherein step (b) comprises, selectively heating the mixture to facilitate aging of the cheese curd and enzyme to form a cheese/enzyme concentrate having a desired flavor.

81. The method according to claim 79 for forming cheese having the taste of an aged or ripened cheese, wherein step (b) further comprises subjecting the cheese curd and enzyme to negative pressure so as to infuse enzyme into the cheese curd.

82. The method according to claim 79, wherein step (b) of the method further comprises maintaining the cheese curd and enzyme at between 55 and 60 degrees for between 15 and 21 days to form a cheese/enzyme concentrate having a concentrated flavor.

83. The method according to claim 79, wherein the method further comprises heating and tumbling the mixture of cheese/enzyme concentrate and cheese curds while subjecting the mixture to negative pressure.

84. The method according to claim 79, wherein the method further comprises inactivating the enzyme in the cheese/enzyme concentrate prior to forming the mixture of the cheese/enzyme concentrate and cheese curd.

85. The method according to claim 84, wherein the method comprises heating the cheese/enzyme concentrate to about 175 degrees Fahrenheit so as to inactivate the enzyme.

86. The method according to claim 79, wherein the method further comprises pasteurizing the cheese/enzyme concentrate prior to mixing with the cheese curds.

87. A method for forming an aged or ripened cheese having a highly stable flavor, the method comprising:
 (a) forming a cheese/enzyme concentrate having a concentrated flavor indicative of an aged cheese;
 (b) treating the cheese/enzyme concentrate so as to inactivate the majority of the enzyme;
 (c) mixing the treated cheese/enzyme concentrate with cheese curds to form a mixture; and
 (d) subjecting the mixture to negative pressure to cause the cheese/enzyme concentrate to be absorbed by the cheese curds.

88. The method according to claim 87, wherein step (a) comprises mixing cheese curd and enzyme and subjecting the mixture to negative pressure to infuse enzyme into the cheese curd.

89. The method according to claim 87, wherein the method further comprises pasteurizing the cheese/enzyme concentrate prior to mixing with the cheese curds.

90. The method according to claim 89, wherein the method further comprises cooling the cheese/enzyme concentrate under negative pressure.

91. The method according to claim 87, wherein the method further comprises heating the mixture while subjecting the mixture to negative pressure.

92. The method according to claim 87, wherein the method further comprises tumbling the mixture while subjecting the mixture to negative pressure.

93. A method for increasing moisture content of a dairy product, the method comprising:
 (a) processing milk to obtain cheese curds;
 (b) coating the cheese curds with a moisture content enhancing agent; and
 (c) continuing to coat the cheese curds with moisture content enhancing agent while applying a negative pressure to the moisture content enhancing agent coated cheese curds to draw the moisture content enhancing agent into the curds.

94. A method for increasing moisture content of a diary product, the method comprising;
 (a) processing milk to obtain cheese curds;
 (b) coating the cheese curds with a moisture content enhancing agent, and
 (c) applying a negative pressure to the moisture content enhancing agent coated cheese curds to draw the moisture content enhancing agent into the curds; and
 wherein the moisture content enhancing agent is a hydrocolloid.

95. A method for increasing moisture content of a dairy product, the method comprising:
 (a) processing milk to obtain cheese curds;
 (b) coating the cheese curds with a moisture content enhancing agent; and
 (c) applying a negative pressure to the moisture content enhancing agent coated cheese curds to draw the moisture content enhancing agent into the curds, and
 wherein the moisture content enhancing agent is a protein.

96. A method for making an instant quick frozen cheese pellet, the method comprising;
 (A) forming a plurality of cheese curds;
 (B) subjecting the cheese curds to negative pressure; and
 (C) rapidly cooling the cheese curds to a temperature below freezing.

97. The method according to claim 96, wherein the method further comprises mixing the cheese curds with salt and subjecting the cheese curds to negative pressure so as to cause at least some of the salt to be absorbed by the cheese curds prior to cooling the cheese curds.

98. The method according to claim 96, wherein the method further comprises mixing the cheese curds with an enhancing agent and subjecting the cheese curds to negative pressure so as to cause at least some of the enhancing agent is absorbed by the cheese curds prior to cooling the cheese curds.

99. The method according to claim 98 wherein the method comprises mixing the cheese curds with an enhancing agent selected from the group consisting of whey, flavoring, coloring, probotics, fat substitutes, melting enhancers, stretch enhancers, and combinations thereof.

100. The method according to claim 96, wherein the method further comprises slicing the cheese curds into smaller pieces prior to subjecting the cheese curds to negative pressure.

101. A method for enhancing the efficiency of an enzyme added to cheese products, the method comprising:

(A) mixing an enzyme with cheese curds; and (B) subjecting the enzyme and cheese curds to negative pressure.

102. A method for enhancing the absorption capacity of cheese curds, the method comprising:

(A) selecting a quantity of cheese curds; and (B) tumbling the cheese curds while subjecting the cheese curds to negative pressure.

103. A method for reducing the time required to produce cheese having the flavor of aged cheese, the method comprising:

(A) selecting cheese curds;

(B) selecting an enhancing agent selected for accelerating development of a flavor of aged cheese; and (C) subjecting the cheese curds and enhancing agent to negative pressure to facilitate absorption of the enhancing agent by the cheese curds.

104. The method according to claim 103, wherein the enhancing agent is an enzyme.

105. The method according to claim 103, wherein the enhancing agent is a cheese curd/enzyme concentrate.

106. A method for increasing the yield of a cheese product, the method comprising:

(A) selecting cheese curds;

(B) adding water to the cheese curds; and (C) subjecting the cheese curds and water to negative pressure to cause the water to be absorbed by the cheese curds.

107. The method according to claim 106, wherein the method further comprising adding whey protein to the cheese curds and water.

108. A method for increasing the yield of a cheese product, comprising:

(A) mixing cheese curds and whey protein; and (B) subjecting the cheese curds and whey protein to negative pressure to cause the whey protein to be absorbed by the cheese curds.

109. The method according to claim 108, wherein the whey protein comprises whey protein concentrate.

110. The method according to claim 108, wherein the whey protein comprises denatured whey protein.

111. The method according to claim 108, further comprising using whey protein which is produced by the formation of the cheese curds.

112. A method for enhancing absorption of enhancing agents into cheese, the method comprising:

(A) selecting cheese curds:

(B) mixing enzymes with the cheese curds, the enzymes being selected from the group consisting of proteolytic and lipolytic enzymes; and (C) subjecting the cheese curds and enzymes to negative pressure to cause the enzymes to be absorbed by the cheese curds.

113. A method for maintaining the protein matrix of a cheese product, the method comprising;

(A) mixing cheese curds with a fat substitute; and (B) subjecting the fat substitute and cheese curds to negative pressure to cause fat substitute to be absorbed by the cheese curds.

114. The method according to claim 113, wherein the fat substitutes are selected from the group consisting of starches, microcrystalline cellulose, inulin and combinations thereof.

115. A method for producing a pasta filata cheese, the method comprising:

(A) selecting cheese curds;

(B) subjecting the cheese curds to negative pressure;

(C) heating the cheese curds; and further comprising adding liquid to the cheese curds prior to subjecting the cheese curds to negative pressure to thereby increase moisture content.

116. A method for making a shelf stable cheese having a moisture content of at least 20 percent, the method comprising:

(A) selecting cheese curds;

(B) selecting a preserving agent; and (C) mixing the cheese curds and preserving agent while the cheese curds and preserving agent to negative pressure to cause the cheese curds to absorb at least some of the preserving agent.

117. A method for producing an enhanced cheese for use on a pizza, the method comprising:

(A) selecting cheese curds;

(B) selecting an enhancing agent; and (C) subjecting the cheese curds and enhancing agent to negative pressure while mixing the cheese curds and enhancing agent to cause the cheese curds to absorb the enhancing agent.

118. The method according to clam 117, wherein the enhancing agent is selected from the group comprising sodium chloride, citrates, phosphates, starch and combinations thereof.

119. The method according to claim 118, wherein the enhancing agent comprises starch, and wherein the level of citrates is between 0.25 and 5 percent.

120. The method according to claim 118, wherein the enhancing agent is selected from the group consisting of sodium chloride, citrates, phosphates, starch and combinations thereof comprises phosphates, and wherein the level of citrates is between 0.1 and 1.25 percent.

121. The method according to claim 118, wherein the enhancing agent is selected from the group consisting of sodium chloride, citrates, phosphates, starch and combinations thereof comprises starch, and wherein the level of citrates is between 0.25 and 5 percent.

122. The method according to claim 118, wherein the enhancing agent comprises citrates, and wherein the level of citrates is between 0.125 and 2.5 percent.

123. The method according to claim 118, wherein the enhancing agent comprises phosphates, and wherein the level of citrates is between 0.1 and 1.25 percent.

124. The method according to claim 117, wherein the enhancing agent comprises whey protein.

125. The method according to claim 124, wherein the whey protein comprises between 25 and 100 percent of the whey protein in whey produced in production of the cheese curds.

126. A method for producing Pizza cheese having a stable performance characteristics, the method comprising:

(A) selecting cheese curds formed for production of Pizza cheese;

(B) adding an enhancing agent to the cheese curds; and (C) subjecting the cheese curds and enhancing agent to negative pressure while tumbling the cheese curds and enhancing agent.

127. The method according to claim 126, wherein the enhancing agent is selected from the group consisting of sodium chloride, citrates, phosphates, starch, whey protein and combinations thereof.

128. The method according to claim 126, wherein the method further comprises cooling the cheese curds with cold gas after the cheese curds have been subjected to negative pressure.

129. A method for producing a fresh cheese with decreased free whey at high moisture levels, the method comprising:

(A) selecting cheese curds formed for production of fresh cheese;

(B) adding an enhancing agent to the cheese curds; and (C) subjecting the cheese curds and enhancing agent to negative pressure while mixing the cheese curds and enhancing agent.

130. The method according to claim 129, wherein the method comprises immediate cooling of the fresh cheese curds with a cold gas.

131. The method according to claim 130, wherein the cold gas is carbon dioxide.

132. The method according to claim 130, wherein the cold gas is nitrogen.

133. A method for producing novelty cheeses, comprising:

(A) selecting cheese curds;

(B) adding a flavoring to the cheese curds;

(C) subjecting the cheese curds and flavoring to negative pressure to cause the flavoring to be absorbed by the cheese curds, and (D) repeatedly mixing the flavoring and cheese curds together while the cheese curds and flavoring are subjected to negative pressure.

134. The method according to claim 133, wherein the flavoring is a cheese flavor other than that of the cheese curds selected.

135. The method according to claim 134, wherein the flavoring is selected from the group consisting of strawberry, chocolate, vanilla, jalapeno and pineapple.

136. A method for increasing yield in a cheese product, the method comprising:

(A) selecting cheese curds;

(B) adding whey protein to the cheese curds, the whey protein being recovered by precipitation; and (C) subjecting the cheese curds and the whey protein to negative pressure to cause the cheese curds to absorb the whey protein and thereby increase yield.

137. A method for producing an enhanced cheese product, the method comprising:

(a) processing milk to produce cheese curds;

(b) mixing the cheese curds with an whey protein to form a mixture having whey protein having a ratio of cheese curds to whey protein between 10:1 and 1.5:1.;

(c) subjecting the mixture to a negative pressure to draw enhancing agent into the cheese curds.

138. A method for enhancing yield of a dairy product, the method comprising:

(a) processing milk to obtain cheese curds;

(b) mixing the cheese curds with a whey protein to form a mixture with whey protein being between 10 and 40 percent by weight of the amount of milk solids in the cheese curds; and (c) applying a negative pressure to the mixture to draw mixture into the curds.

139. The method for enhancing yield of a dairy product of claim 138, wherein the method further comprises, heating the whey protein to between 160 and 190 degrees prior to mixing the whey protein with the cheese curds.

140. The method for enhancing yield of a dairy product of claim 139, wherein the method further comprises cooling the whey protein prior to mixing the whey protein with the cheese curds.

141. The method for enhancing yield of a dairy product of claim 140, wherein the method comprises cooling the whey protein while subjecting the whey protein to a negative pressure prior to mixing the whey protein with the cheese curds.

142. The method for enhancing yield of a dairy product of claim 138, wherein the method further comprises heating the whey protein and cheese curd mixture while subjecting it to negative pressure.

143. The method for enhancing yield of a dairy product of claim 138, wherein the method further comprises continuing to mix the whey protein and cheese curd mixture while subjecting it to a negative pressure.

144. The method for enhancing yield of a dairy product of claim 138, wherein the method further comprises heating the whey protein and cheese curd mixture as it is subjected to negative pressure.

145. A method for producing an enhanced cheese for use on a pizza, the method comprising:

(A) selecting cheese curds;

(B) selecting an enhancing agent, the enhancing agent comprising whey protein, wherein the whey protein comprises between 25 and 100 percent of the whey protein by weight produced in production of the cheese curds; and (C) subjecting the cheese curds and enhancing agent to negative pressure to cause the cheese curds to absorb the enhancing agent.

146. The method according to claim 145, wherein the method further comprises adding an enhancing agent selected from the group consisting of sodium chloride, citrates, phosphates, starch and combinations thereof.

147. The method according to claim 146, wherein the enhancing agent is selected from the group consisting of sodium chloride, citrates, phosphates, starch and combinations thereof comprises citrates, and wherein the level of citrates is between 0.125 and 2.5 percent.

* * * * *